(12) United States Patent
Schofield et al.

(10) Patent No.: US 9,948,904 B2
(45) Date of Patent: *Apr. 17, 2018

(54) VISION SYSTEM FOR VEHICLE

(71) Applicant: MAGNA ELECTRONICS INC., Auburn Hills, MI (US)

(72) Inventors: Kenneth Schofield, Holland, MI (US); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,921

(22) Filed: Aug. 14, 2017

(65) Prior Publication Data

US 2018/0020192 A1    Jan. 18, 2018

Related U.S. Application Data

(63) Continuation of application No. 15/463,296, filed on Mar. 20, 2017, now Pat. No. 9,736,435, which is a
(Continued)

(51) Int. Cl.
*H04N 5/232* (2006.01)
*G06K 9/00* (2006.01)
(Continued)

(52) U.S. Cl.
CPC ............... *H04N 7/183* (2013.01); *B60Q 1/08* (2013.01); *B60R 1/00* (2013.01); *B60R 1/12* (2013.01);
(Continued)

(58) Field of Classification Search
USPC ................. 382/100, 103–104, 106–107, 113, 382/121–123, 154, 162, 170, 172, 178,
(Continued)

(56) References Cited

U.S. PATENT DOCUMENTS 1,472,509 A   10/1923   Bitter
2,074,251 A    3/1937   Braun
(Continued)

FOREIGN PATENT DOCUMENTS

AT    519193      8/2011
BE   1008142      1/1996
(Continued)

OTHER PUBLICATIONS

"Generation of Vision Technology," published by VLSI Vision Limited, pub. date unknown.
(Continued)

*Primary Examiner* — Seyed Azarian
(74) *Attorney, Agent, or Firm* — Honigman Miller Schwartz and Cohn, LLP

(57) ABSTRACT

A vision system for a vehicle includes a forward viewing camera. Responsive at least in part to processing by an image processor of image data captured by the forward viewing camera, at least one road characteristic of a road along which the vehicle is traveling is detected. Responsive at least in part to processing by the image processor of image data captured by the forward viewing camera, other vehicles exterior the equipped vehicle are detected. Responsive at least in part to processing by the image processor of image data captured by the forward viewing camera, road curvature of the road along which the vehicle is traveling is determined. Data derived from image data captured by the forward viewing camera may be wirelessly communicated from the vehicle to a remote data receiver located remote from the vehicle.

33 Claims, 4 Drawing Sheets

Related U.S. Application Data continuation of application No. 15/249,557, filed on Aug. 29, 2016, now Pat. No. 9,609,289, which is a continuation of application No. 14/942,089, filed on Nov. 16, 2015, now Pat. No. 9,428,192, which is a continuation of application No. 14/678,146, filed on Apr. 3, 2015, now Pat. No. 9,191,634, which is a continuation of application No. 14/467,296, filed on Aug. 25, 2014, now Pat. No. 9,008,369, which is a continuation of application No. 14/082,577, filed on Nov. 18, 2013, now Pat. No. 8,818,042, which is a continuation of application No. 13/689,796, filed on Nov. 30, 2012, now Pat. No. 8,593,521, which is a continuation of application No. 13/335,125, filed on Dec. 22, 2011, now Pat. No. 8,325,986, which is a continuation of application No. 13/107,318, filed on May 13, 2011, now Pat. No. 8,090,153, which is a continuation of application No. 12/979,499, filed on Dec. 28, 2010, now Pat. No. 7,949,152, which is a continuation of application No. 12/856,737, filed on Aug. 16, 2010, now Pat. No. 7,873,187, which is a continuation of application No. 12/606,476, filed on Oct. 27, 2009, now Pat. No. 7,792,329, which is a continuation of application No. 12/429,605, filed on Apr. 24, 2009, now Pat. No. 7,616,781, which is a continuation of application No. 11/105,757, filed on Apr. 14, 2005, now Pat. No. 7,526,103.

(60) Provisional application No. 60/644,903, filed on Jan. 19, 2005, provisional application No. 60/642,227, filed on Jan. 7, 2005, provisional application No. 60/607,963, filed on Sep. 8, 2004, provisional application No. 60/562,480, filed on Apr. 15, 2004.

(51) Int. Cl.
| | |
|---|---|
| *H04N 7/18* | (2006.01) |
| *G08G 1/16* | (2006.01) |
| *G06T 7/20* | (2017.01) |
| *B60W 30/14* | (2006.01) |
| *B60R 11/04* | (2006.01) |
| *B60R 1/00* | (2006.01) |
| *B60Q 1/08* | (2006.01) |
| *B60W 50/14* | (2012.01) |
| *B60W 50/16* | (2012.01) |
| *B60R 11/00* | (2006.01) |
| *B60R 1/12* | (2006.01) |
| *B60R 1/04* | (2006.01) |

(52) U.S. Cl.
CPC ........... *B60R 11/04* (2013.01); *B60W 30/143* (2013.01); *B60W 50/14* (2013.01); *G06K 9/00798* (2013.01); *G06K 9/00805* (2013.01); *G06K 9/00825* (2013.01); *G06T 7/20* (2013.01); *G08G 1/166* (2013.01); *G08G 1/167* (2013.01); *B60K 2350/106* (2013.01); *B60K 2350/1024* (2013.01); *B60K 2350/1044* (2013.01); *B60K 2350/2013* (2013.01); *B60K 2350/2034* (2013.01); *B60K 2350/2039* (2013.01); *B60K 2350/2052* (2013.01); *B60K 2350/2095* (2013.01); *B60K 2350/352* (2013.01); *B60K 2350/357* (2013.01); *B60K 2350/927* (2013.01); *B60Q 2300/42* (2013.01); *B60R 1/04* (2013.01); *B60R 2001/1215* (2013.01); *B60R 2001/1253* (2013.01); *B60R 2011/0026* (2013.01); *B60R 2300/205* (2013.01); *B60R 2300/207* (2013.01); *B60R 2300/301* (2013.01); *B60R 2300/302* (2013.01); *B60R 2300/804* (2013.01); *B60R 2300/8093* (2013.01); *B60W 50/16* (2013.01); *B60W 2050/143* (2013.01); *B60W 2050/146* (2013.01)

(58) Field of Classification Search
USPC ....... 382/181, 190, 194, 199, 232, 254, 285, 382/295, 305, 312, 319, 274; 340/425.5, 340/435; 701/36; 348/148, 211.13; 359/601
See application file for complete search history.

(56) References Cited

U.S. PATENT DOCUMENTS

| | | |
|---|---|---|
| 2,148,119 A | 2/1939 | Grist |
| 2,240,843 A | 5/1941 | Gillespie |
| 2,317,400 A | 4/1943 | Paulus et al. |
| 2,331,144 A | 10/1943 | Sitter |
| 2,339,291 A | 1/1944 | Paulus et al. |
| 2,424,288 A | 7/1947 | Severy |
| 2,598,420 A | 5/1952 | Onksen, Jr. et al. |
| 2,632,040 A | 3/1953 | Rabinow |
| 2,827,594 A | 3/1953 | Rabinow |
| 2,750,583 A | 6/1956 | McCullough |
| 2,762,932 A | 9/1956 | Falge |
| 2,907,920 A | 10/1956 | McIlvane |
| 2,855,523 A | 10/1958 | Berger |
| 2,856,146 A | 10/1958 | Lehder |
| 2,863,064 A | 12/1958 | Rabinow |
| 2,892,094 A | 6/1959 | Lehovec |
| 2,912,593 A | 11/1959 | Deuth |
| 2,934,676 A | 4/1960 | Miller |
| 2,959,709 A | 11/1960 | Vanaman et al. |
| 3,008,532 A | 11/1961 | Reed |
| 3,011,580 A | 12/1961 | Reid |
| 3,069,654 A | 12/1962 | Hough |
| 3,085,646 A | 4/1963 | Paufve |
| 3,158,835 A | 11/1964 | Hipkins |
| 3,172,496 A | 3/1965 | Rabinow et al. |
| 3,179,845 A | 4/1965 | Kulwiec |
| 3,201,750 A | 8/1965 | Morin |
| 3,208,070 A | 9/1965 | Boicey |
| 3,249,761 A | 5/1966 | Baumanns |
| 3,271,577 A | 9/1966 | Miller et al. |
| 3,325,680 A | 6/1967 | Amacher |
| 3,367,616 A | 2/1968 | Bausch et al. |
| 3,411,843 A | 11/1968 | Moller |
| 3,486,066 A | 12/1969 | Jones et al. |
| 3,515,472 A | 6/1970 | Schwitzgebel |
| 3,572,428 A | 3/1971 | Monaco |
| 3,623,671 A | 11/1971 | Hargroves |
| 3,673,560 A | 6/1972 | Barsh et al. |
| 3,680,951 A | 8/1972 | Jordan et al. |
| 3,689,695 A | 9/1972 | Rosenfield et al. |
| 3,708,668 A | 1/1973 | Tilley |
| 3,751,711 A | 8/1973 | Schick |
| 3,845,572 A | 11/1974 | McCanney |
| 3,876,940 A | 4/1975 | Wickord et al. |
| 3,971,065 A | 7/1976 | Bayer |
| 3,985,424 A | 10/1976 | Steinacher |
| 3,986,022 A | 10/1976 | Hyatt |
| 4,003,445 A | 1/1977 | De Bruine |
| 4,037,134 A | 7/1977 | Loper |
| 4,044,853 A | 8/1977 | Melke |
| 4,049,961 A | 9/1977 | Marcy |
| 4,058,796 A | 11/1977 | Oishi et al. |
| 4,093,364 A | 6/1978 | Miller |
| 4,127,778 A | 11/1978 | Leitz |
| 4,139,801 A | 2/1979 | Linares |
| 4,143,264 A | 3/1979 | Gilbert et al. |
| 4,176,728 A | 12/1979 | Otteblad et al. |
| 4,200,361 A | 4/1980 | Malvano et al. |
| 4,209,853 A | 6/1980 | Hyatt |
| 4,214,266 A | 7/1980 | Myers |
| 4,218,698 A | 8/1980 | Bart et al. |

(56) References Cited

U.S. PATENT DOCUMENTS

| | | |
|---|---|---|
| 4,236,099 A | 11/1980 | Rosenblum |
| 4,238,778 A | 12/1980 | Ohsumi |
| 4,243,196 A | 1/1981 | Toda et al. |
| 4,247,870 A | 1/1981 | Gabel et al. |
| 4,249,160 A | 2/1981 | Chilvers |
| 4,254,931 A | 3/1981 | Aikens |
| 4,257,703 A | 3/1981 | Goodrich |
| 4,266,856 A | 5/1981 | Wainwright |
| 4,277,804 A | 7/1981 | Robison |
| 4,278,142 A | 7/1981 | Kono |
| 4,281,898 A | 8/1981 | Ochiai |
| 4,288,814 A | 9/1981 | Talley et al. |
| RE30,835 E | 12/1981 | Giglia |
| 4,348,652 A | 9/1982 | Barnes et al. |
| 4,348,653 A | 9/1982 | Tsuzuki et al. |
| 4,355,271 A | 10/1982 | Noack |
| 4,357,558 A | 11/1982 | Massoni et al. |
| 4,357,594 A | 11/1982 | Ehrlich et al. |
| 4,381,888 A | 5/1983 | Momiyama |
| 4,389,537 A | 6/1983 | Tsunoda et al. |
| 4,389,639 A | 6/1983 | Torii et al. |
| 4,390,742 A | 6/1983 | Wideman |
| 4,390,895 A | 6/1983 | Sato et al. |
| 4,401,181 A | 8/1983 | Schwarz |
| 4,403,208 A | 9/1983 | Hodgson et al. |
| 4,420,238 A | 12/1983 | Felix |
| 4,431,896 A | 2/1984 | Lodetti |
| 4,441,125 A | 4/1984 | Parkinson |
| 4,443,057 A | 4/1984 | Bauer et al. |
| 4,460,831 A | 7/1984 | Oettinger et al. |
| 4,464,789 A | 8/1984 | Sternberg |
| 4,471,228 A | 9/1984 | Nishizawa et al. |
| 4,481,450 A | 11/1984 | Watanabe et al. |
| 4,483,011 A | 11/1984 | Brown |
| 4,485,402 A | 11/1984 | Searby |
| 4,491,390 A | 1/1985 | Tong-Shen |
| 4,495,589 A | 1/1985 | Hirzel |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer et al. |
| 4,532,550 A | 7/1985 | Bendell et al. |
| 4,538,181 A | 8/1985 | Taylor |
| 4,546,551 A | 10/1985 | Franks |
| 4,549,208 A | 10/1985 | Kamejima et al. |
| 4,564,833 A | 1/1986 | Seko et al. |
| 4,566,032 A | 1/1986 | Hirooka et al. |
| 4,571,082 A | 2/1986 | Downs |
| 4,572,619 A | 2/1986 | Reininger et al. |
| 4,580,875 A | 4/1986 | Bechtel et al. |
| 4,587,522 A | 5/1986 | Warren |
| 4,588,041 A | 5/1986 | Tsuchuhashi |
| 4,599,544 A | 7/1986 | Martin |
| 4,600,913 A | 7/1986 | Caine |
| 4,601,053 A | 7/1986 | Grumet |
| 4,603,946 A | 8/1986 | Kato et al. |
| 4,614,415 A | 9/1986 | Hyatt |
| 4,620,141 A | 10/1986 | McCumber |
| 4,623,222 A | 11/1986 | Ito et al. |
| 4,625,329 A | 11/1986 | Ishikawa et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,645,320 A | 2/1987 | Muelling et al. |
| 4,645,975 A | 2/1987 | Meitzler et al. |
| 4,647,161 A | 3/1987 | Müller |
| 4,647,975 A | 3/1987 | Alston et al. |
| 4,653,316 A | 3/1987 | Fukuhara |
| 4,665,321 A | 5/1987 | Chang et al. |
| 4,669,825 A | 6/1987 | Itoh et al. |
| 4,671,614 A | 6/1987 | Catalano |
| 4,671,615 A | 6/1987 | Fukada et al. |
| 4,672,457 A | 6/1987 | Hyatt |
| 4,676,601 A | 6/1987 | Itoh et al. |
| 4,679,077 A | 7/1987 | Yuasa et al. |
| 4,681,431 A | 7/1987 | Sims et al. |
| 4,688,085 A | 8/1987 | Imaide |
| 4,690,508 A | 9/1987 | Jacob |
| 4,692,798 A | 9/1987 | Seko et al. |
| 4,693,788 A | 9/1987 | Berg et al. |
| 4,697,883 A | 10/1987 | Suzuki et al. |
| 4,699,484 A | 10/1987 | Howell et al. |
| 4,701,022 A | 10/1987 | Jacob |
| 4,701,613 A | 10/1987 | Watanbe et al. |
| 4,713,685 A | 12/1987 | Nishimura et al. |
| 4,717,830 A | 1/1988 | Botts |
| 4,727,290 A | 2/1988 | Smith et al. |
| 4,728,804 A | 3/1988 | Norsworthy |
| 4,731,669 A | 3/1988 | Hayashi et al. |
| 4,731,769 A | 3/1988 | Schaefer et al. |
| 4,741,603 A | 5/1988 | Miyagi et al. |
| 4,755,664 A | 7/1988 | Holmes et al. |
| 4,758,883 A | 7/1988 | Kawahara et al. |
| 4,768,135 A | 8/1988 | Kretschmer et al. |
| 4,772,942 A | 9/1988 | Tuck |
| 4,779,095 A | 10/1988 | Guerreri |
| 4,785,280 A | 11/1988 | Fubini et al. |
| 4,789,904 A | 12/1988 | Peterson |
| 4,793,690 A | 12/1988 | Gahan et al. |
| 4,799,267 A | 1/1989 | Kamejima et al. |
| 4,805,015 A | 2/1989 | Copeland |
| 4,816,828 A | 3/1989 | Feher |
| 4,817,948 A | 4/1989 | Simonelli |
| 4,820,933 A | 4/1989 | Hong |
| 4,825,232 A | 4/1989 | Howdle |
| 4,833,469 A | 5/1989 | David |
| 4,833,534 A | 5/1989 | Paff et al. |
| 4,838,650 A | 6/1989 | Stewart et al. |
| 4,839,749 A | 6/1989 | Franklin |
| 4,841,348 A | 6/1989 | Shizukuishi et al. |
| 4,843,463 A | 6/1989 | Michetti |
| 4,847,489 A | 7/1989 | Dietrich |
| 4,847,772 A | 7/1989 | Michalopoulos et al. |
| 4,849,731 A | 7/1989 | Melocik |
| 4,855,822 A | 8/1989 | Narendra et al. |
| 4,859,031 A | 8/1989 | Berman et al. |
| 4,862,037 A | 8/1989 | Farber et al. |
| 4,863,130 A | 9/1989 | Marks, Jr. |
| 4,867,561 A | 9/1989 | Makino et al. |
| 4,870,264 A | 9/1989 | Beha |
| 4,871,917 A | 10/1989 | O'Farrell et al. |
| 4,872,051 A | 10/1989 | Dye |
| 4,881,019 A | 11/1989 | Shiraishi et al. |
| 4,882,466 A | 11/1989 | Friel |
| 4,882,565 A | 11/1989 | Gallmeyer |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,892,345 A | 1/1990 | Rachael |
| 4,895,790 A | 1/1990 | Swanson et al. |
| 4,896,030 A | 1/1990 | Miyaji |
| 4,899,296 A | 2/1990 | Khattak |
| 4,900,133 A | 2/1990 | Berman |
| 4,905,151 A | 2/1990 | Weiman et al. |
| 4,906,940 A | 3/1990 | Green et al. |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,346 A | 5/1990 | Yokoyama |
| 4,930,742 A | 6/1990 | Schofield et al. |
| 4,931,937 A | 6/1990 | Kakinami et al. |
| 4,936,533 A | 6/1990 | Adams et al. |
| 4,937,796 A | 6/1990 | Tendler |
| 4,948,246 A | 8/1990 | Shigematsu |
| 4,949,186 A | 8/1990 | Peterson |
| 4,953,305 A | 9/1990 | Van Lente et al. |
| 4,954,962 A | 9/1990 | Evans et al. |
| 4,956,591 A | 9/1990 | Schierbeek et al. |
| 4,961,625 A | 10/1990 | Wood et al. |
| 4,963,788 A | 10/1990 | King et al. |

(56) References Cited

U.S. PATENT DOCUMENTS

| | | |
|---|---|---|
| 4,966,441 A | 10/1990 | Conner |
| 4,967,319 A | 10/1990 | Seko |
| 4,970,509 A | 11/1990 | Kissinger |
| 4,970,589 A | 11/1990 | Hanson |
| 4,970,653 A | 11/1990 | Kenue |
| 4,971,405 A | 11/1990 | Hwang |
| 4,971,430 A | 11/1990 | Lynas |
| 4,974,078 A | 11/1990 | Tsai |
| 4,975,703 A | 12/1990 | Delisle et al. |
| 4,985,847 A | 1/1991 | Shioya et al. |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,003,339 A | 3/1991 | Kikuchi et al. |
| 5,008,739 A | 4/1991 | D'Luna et al. |
| 5,008,946 A | 4/1991 | Ando |
| 5,012,082 A | 4/1991 | Watanabe |
| 5,012,092 A | 4/1991 | Kobayashi |
| 5,012,335 A | 4/1991 | Cohodar |
| 5,016,977 A | 5/1991 | Baude et al. |
| 5,020,114 A | 5/1991 | Fujioka et al. |
| 5,027,001 A | 6/1991 | Torbert |
| 5,027,104 A | 6/1991 | Reid |
| 5,027,200 A | 6/1991 | Petrossian et al. |
| 5,031,101 A | 7/1991 | Kamimura et al. |
| 5,036,437 A | 7/1991 | Macks |
| 5,044,706 A | 9/1991 | Chen |
| 5,044,956 A | 9/1991 | Behensky et al. |
| 5,050,966 A | 9/1991 | Berman |
| 5,051,906 A | 9/1991 | Evans, Jr. et al. |
| 5,055,668 A | 10/1991 | French |
| 5,059,877 A | 10/1991 | Teder |
| 5,059,947 A | 10/1991 | Chen |
| 5,063,603 A | 11/1991 | Burt |
| 5,064,274 A | 11/1991 | Alten |
| 5,072,154 A | 12/1991 | Chen |
| 5,075,768 A | 12/1991 | Wirtz et al. |
| 5,080,207 A | 1/1992 | Horneffer |
| 5,080,309 A | 1/1992 | Ivins |
| 5,081,585 A | 1/1992 | Kurami et al. |
| 5,086,253 A | 2/1992 | Lawler |
| 5,086,510 A | 2/1992 | Guenther et al. |
| 5,087,969 A | 2/1992 | Kamada et al. |
| 5,096,287 A | 3/1992 | Kakinami et al. |
| 5,097,362 A | 3/1992 | Lynas |
| 5,100,093 A | 3/1992 | Rawlinson |
| 5,101,351 A | 3/1992 | Hattori |
| 5,111,289 A | 5/1992 | Lucas et al. |
| 5,113,721 A | 5/1992 | Polly |
| 5,115,398 A | 5/1992 | De Jong |
| 5,121,200 A | 6/1992 | Choi |
| 5,122,957 A | 6/1992 | Hattori |
| 5,124,549 A | 6/1992 | Michaels et al. |
| 5,128,769 A | 7/1992 | Ari |
| 5,130,709 A | 7/1992 | Toyama et al. |
| 5,133,605 A | 7/1992 | Nakamura |
| 5,137,238 A | 8/1992 | Hutten |
| 5,139,327 A | 8/1992 | Tanaka |
| 5,144,685 A | 9/1992 | Nasar et al. |
| 5,146,340 A | 9/1992 | Dickerson |
| 5,148,014 A | 9/1992 | Lynam |
| 5,153,760 A | 10/1992 | Ahmed |
| 5,155,426 A | 10/1992 | Kurami |
| 5,155,775 A | 10/1992 | Brown |
| 5,159,557 A | 10/1992 | Ogawa |
| 5,160,780 A | 11/1992 | Ono et al. |
| 5,160,971 A | 11/1992 | Koshizawa et al. |
| 5,161,632 A | 11/1992 | Asayama et al. |
| 5,162,841 A | 11/1992 | Terashita |
| 5,162,861 A | 11/1992 | Tamburino |
| 5,163,002 A | 11/1992 | Kurami |
| 5,165,108 A | 11/1992 | Asayama |
| 5,166,681 A | 11/1992 | Bottesch et al. |
| 5,168,355 A | 12/1992 | Asayama |
| 5,168,378 A | 12/1992 | Black et al. |
| 5,170,374 A | 12/1992 | Shimohigashi et al. |
| 5,172,235 A | 12/1992 | Wilm et al. |
| 5,172,317 A | 12/1992 | Asanuma et al. |
| 5,173,881 A | 12/1992 | Sindle |
| 5,177,462 A | 1/1993 | Kajiwara |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,185,812 A | 2/1993 | Yamashita et al. |
| 5,187,383 A | 2/1993 | Taccetta et al. |
| 5,189,561 A | 2/1993 | Hong |
| 5,193,000 A | 3/1993 | Lipton et al. |
| 5,193,029 A | 3/1993 | Schofield et al. |
| 5,193,894 A | 3/1993 | Lietar et al. |
| 5,204,536 A | 4/1993 | Vardi |
| 5,204,778 A | 4/1993 | Bechtel |
| 5,208,701 A | 5/1993 | Maeda |
| 5,208,750 A | 5/1993 | Kurami et al. |
| 5,212,468 A | 5/1993 | Adell |
| 5,214,408 A | 5/1993 | Asayama |
| 5,216,408 A | 6/1993 | Shirakawa |
| 5,218,414 A | 6/1993 | Kajiwara et al. |
| 5,220,508 A | 6/1993 | Ninomiya et al. |
| 5,223,814 A | 6/1993 | Suman |
| 5,223,907 A | 6/1993 | Asayama |
| 5,225,827 A | 7/1993 | Persson |
| 5,229,941 A | 7/1993 | Hattori |
| 5,230,400 A | 7/1993 | Kakinami et al. |
| 5,231,379 A | 7/1993 | Wood et al. |
| 5,233,527 A | 8/1993 | Shinnosuke |
| 5,234,070 A | 8/1993 | Noah et al. |
| 5,235,178 A | 8/1993 | Hegyi |
| 5,237,249 A | 8/1993 | Levers |
| 5,243,524 A | 9/1993 | Ishida et al. |
| 5,245,422 A | 9/1993 | Borcherts et al. |
| 5,246,193 A | 9/1993 | Faidley |
| 5,249,126 A | 9/1993 | Hattori |
| 5,249,128 A | 9/1993 | Markandey et al. |
| 5,249,157 A | 9/1993 | Taylor |
| 5,251,680 A | 10/1993 | Miezawa et al. |
| 5,253,050 A | 10/1993 | Karasudani |
| 5,253,109 A | 10/1993 | O'Farrell et al. |
| 5,265,172 A | 11/1993 | Markandey et al. |
| 5,266,873 A | 11/1993 | Arditi et al. |
| 5,267,160 A | 11/1993 | Ito et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,291,424 A | 3/1994 | Asayama et al. |
| 5,293,162 A | 3/1994 | Bachalo |
| 5,298,732 A | 3/1994 | Chen |
| 5,301,115 A | 4/1994 | Nouso et al. |
| 5,302,956 A | 4/1994 | Asbury et al. |
| 5,304,980 A | 4/1994 | Maekawa |
| 5,305,012 A | 4/1994 | Faris |
| 5,307,136 A | 4/1994 | Saneyoshi |
| 5,307,419 A | 4/1994 | Tsujino et al. |
| 5,309,137 A | 5/1994 | Kajiwara |
| 5,313,072 A | 5/1994 | Vachss |
| 5,318,143 A | 6/1994 | Parker et al. |
| 5,321,556 A | 6/1994 | Joe |
| 5,325,096 A | 6/1994 | Pakett |
| 5,325,386 A | 6/1994 | Jewell et al. |
| 5,327,288 A | 7/1994 | Wellington et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,345,266 A | 9/1994 | Denyer |
| 5,347,456 A | 9/1994 | Zhang et al. |
| 5,351,044 A | 9/1994 | Mathur et al. |
| D351,370 S | 10/1994 | Lawlor et al. |
| 5,355,118 A | 10/1994 | Fukuhara |
| 5,359,666 A | 10/1994 | Nakayama et al. |

(56) References Cited

U.S. PATENT DOCUMENTS

| | | |
|---|---|---|
| 5,367,457 A | 11/1994 | Ishida et al. |
| 5,369,590 A | 11/1994 | Karasudani |
| 5,371,535 A | 12/1994 | Takizawa |
| 5,373,911 A | 12/1994 | Yasui |
| 5,374,852 A | 12/1994 | Parkes |
| 5,379,196 A | 1/1995 | Kobayashi et al. |
| 5,379,353 A | 1/1995 | Hasegawa et al. |
| 5,381,338 A | 1/1995 | Wysocki et al. |
| 5,386,285 A | 1/1995 | Asayama |
| 5,388,048 A | 2/1995 | Yavnayi et al. |
| 5,394,333 A | 2/1995 | Kao |
| 5,398,041 A | 3/1995 | Hyatt |
| 5,406,395 A | 4/1995 | Wilson et al. |
| 5,406,414 A | 4/1995 | O'Farrell et al. |
| 5,408,330 A | 4/1995 | Squicciarini |
| 5,408,346 A | 4/1995 | Trissel et al. |
| 5,410,346 A | 4/1995 | Saneyoshi et al. |
| 5,414,257 A | 5/1995 | Stanton |
| 5,414,439 A | 5/1995 | Groves et al. |
| 5,414,461 A | 5/1995 | Kishi et al. |
| 5,414,625 A | 5/1995 | Hattori |
| 5,416,313 A | 5/1995 | Larson et al. |
| 5,416,318 A | 5/1995 | Hegyi |
| 5,416,478 A | 5/1995 | Morinaga |
| 5,416,711 A | 5/1995 | Gran et al. |
| 5,424,952 A | 6/1995 | Asayama |
| 5,426,294 A | 6/1995 | Kobayashi et al. |
| 5,430,431 A | 7/1995 | Nelson |
| 5,430,450 A | 7/1995 | Holmes |
| 5,434,407 A | 7/1995 | Bauer et al. |
| 5,434,927 A | 7/1995 | Brady et al. |
| 5,436,839 A | 7/1995 | Dausch et al. |
| 5,440,428 A | 8/1995 | Hegg et al. |
| 5,444,478 A | 8/1995 | Lelong et al. |
| 5,448,180 A | 9/1995 | Kienzler et al. |
| 5,450,057 A | 9/1995 | Watanabe |
| 5,451,822 A | 9/1995 | Bechtel et al. |
| 5,457,493 A | 10/1995 | Leddy et al. |
| 5,459,660 A | 10/1995 | Berra |
| 5,461,357 A | 10/1995 | Yoshioka et al. |
| 5,461,361 A | 10/1995 | Moore |
| 5,465,079 A | 11/1995 | Bouchard et al. |
| 5,467,284 A | 11/1995 | Yoshioka et al. |
| 5,469,298 A | 11/1995 | Suman et al. |
| 5,471,515 A | 11/1995 | Fossum et al. |
| 5,473,515 A | 12/1995 | Liu |
| 5,475,366 A | 12/1995 | Van Lente et al. |
| 5,475,494 A | 12/1995 | Nishida et al. |
| 5,481,257 A | 1/1996 | Brubaker et al. |
| 5,482,133 A | 1/1996 | Iwata et al. |
| 5,483,060 A | 1/1996 | Sugiura et al. |
| 5,483,168 A | 1/1996 | Reid |
| 5,483,453 A | 1/1996 | Uemura et al. |
| 5,487,116 A | 1/1996 | Nakano et al. |
| 5,488,496 A | 1/1996 | Pine |
| 5,493,269 A | 2/1996 | Durley et al. |
| 5,493,392 A | 2/1996 | Blackmon et al. |
| 5,498,866 A | 3/1996 | Bendicks et al. |
| 5,500,766 A | 3/1996 | Stonecypher |
| 5,508,592 A | 4/1996 | Lapatovich et al. |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,330 A | 6/1996 | Baiden et al. |
| 5,530,420 A | 6/1996 | Tsuchiya et al. |
| 5,530,771 A | 6/1996 | Maekawa |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,545,960 A | 8/1996 | Ishikawa |
| 5,550,677 A | 8/1996 | Schofield et al. |
| 5,555,136 A | 9/1996 | Waldmann et al. |
| 5,555,312 A | 9/1996 | Shima et al. |
| 5,555,503 A | 9/1996 | Kyrtsos et al. |
| 5,555,555 A | 9/1996 | Sato et al. |
| 5,558,123 A | 9/1996 | Castel et al. |
| 5,559,695 A | 9/1996 | Daily |
| 5,562,336 A | 10/1996 | Gotou et al. |
| 5,566,224 A | 10/1996 | Ul Azam et al. |
| 5,568,027 A | 10/1996 | Teder |
| 5,568,316 A | 10/1996 | Schrenck et al. |
| 5,572,315 A | 11/1996 | Krell |
| 5,574,443 A | 11/1996 | Hsieh |
| 5,576,687 A | 11/1996 | Blank et al. |
| 5,581,464 A | 12/1996 | Woll et al. |
| 5,582,383 A | 12/1996 | Mertens et al. |
| 5,588,123 A | 12/1996 | Loibl |
| 5,594,222 A | 1/1997 | Caldwell |
| 5,596,319 A | 1/1997 | Spry et al. |
| 5,596,382 A | 1/1997 | Bamford |
| 5,598,164 A | 1/1997 | Reppas et al. |
| 5,602,457 A | 2/1997 | Anderson et al. |
| 5,612,686 A | 3/1997 | Takano et al. |
| 5,612,883 A | 3/1997 | Shaffer et al. |
| 5,614,788 A | 3/1997 | Mullins |
| 5,614,885 A | 3/1997 | Van Lente et al. |
| 5,615,857 A | 4/1997 | Hook |
| 5,619,370 A | 4/1997 | Guinosso |
| 5,627,586 A | 5/1997 | Yamasaki |
| 5,633,944 A | 5/1997 | Guibert et al. |
| 5,634,709 A | 6/1997 | Iwama |
| 5,638,116 A | 6/1997 | Shimoura et al. |
| 5,642,299 A | 6/1997 | Hardin et al. |
| 5,646,612 A | 7/1997 | Byon |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,667,896 A | 9/1997 | Carter et al. |
| 5,668,663 A | 9/1997 | Varaprasad et al. |
| 5,670,935 A | 9/1997 | Schofield et al. |
| 5,673,019 A | 9/1997 | Dantoni |
| 5,675,489 A | 10/1997 | Pomerleau |
| 5,676,484 A | 10/1997 | Chamberlin et al. |
| 5,677,851 A | 10/1997 | Kingdon et al. |
| 5,677,979 A | 10/1997 | Squicciarini et al. |
| 5,680,263 A | 10/1997 | Zimmermann et al. |
| D388,107 S | 12/1997 | Huckins |
| 5,699,044 A | 12/1997 | Van Lente et al. |
| 5,699,057 A | 12/1997 | Ikeda et al. |
| 5,699,149 A | 12/1997 | Kuroda et al. |
| 5,706,355 A | 1/1998 | Raboisson et al. |
| 5,707,129 A | 1/1998 | Kobayashi |
| 5,708,410 A | 1/1998 | Blank et al. |
| 5,710,633 A | 1/1998 | Klappenbach et al. |
| 5,715,093 A | 2/1998 | Schierbeek et al. |
| 5,719,551 A | 2/1998 | Flick |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,764,139 A | 6/1998 | Nojima et al. |
| 5,765,116 A | 6/1998 | Wilson-Jones et al. |
| 5,765,940 A | 6/1998 | Levy et al. |
| 5,781,105 A | 7/1998 | Bitar et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |

(56) References Cited

U.S. PATENT DOCUMENTS

| | | |
|---|---|---|
| 5,804,719 A | 9/1998 | Didelot et al. |
| 5,808,589 A | 9/1998 | Fergason |
| 5,811,888 A | 9/1998 | Hsieh |
| 5,820,097 A | 10/1998 | Spooner |
| 5,835,255 A | 11/1998 | Miles |
| 5,835,613 A | 11/1998 | Breed et al. |
| 5,835,614 A | 11/1998 | Aoyama et al. |
| 5,837,994 A | 11/1998 | Stam et al. |
| 5,841,126 A | 11/1998 | Fossum et al. |
| 5,844,505 A | 12/1998 | Van Ryzin |
| 5,844,682 A | 12/1998 | Kiyomoto et al. |
| 5,845,000 A | 12/1998 | Breed et al. |
| 5,847,755 A | 12/1998 | Wixson et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,193 A | 3/1999 | Karim |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,890,083 A | 3/1999 | Franke et al. |
| 5,896,085 A | 4/1999 | Mori et al. |
| 5,899,956 A | 5/1999 | Chan |
| 5,904,725 A | 5/1999 | Iisaka et al. |
| 5,905,457 A | 5/1999 | Rashid |
| 5,912,534 A | 6/1999 | Benedict |
| 5,914,815 A | 6/1999 | Bos |
| 5,920,367 A | 7/1999 | Kajimoto et al. |
| 5,922,036 A | 7/1999 | Yasui |
| 5,923,027 A | 7/1999 | Stam et al. |
| 5,929,784 A | 7/1999 | Kawaziri et al. |
| 5,929,786 A | 7/1999 | Schofield et al. |
| 5,938,320 A | 8/1999 | Crandall |
| 5,938,810 A | 8/1999 | DeVries, Jr. et al. |
| 5,940,120 A | 8/1999 | Frankhouse et al. |
| 5,942,853 A | 8/1999 | Piscart |
| 5,949,331 A | 9/1999 | Schofield et al. |
| 5,955,941 A | 9/1999 | Pruksch et al. |
| 5,956,181 A | 9/1999 | Lin |
| 5,959,367 A | 9/1999 | O'Farrell et al. |
| 5,959,555 A | 9/1999 | Furuta |
| 5,961,571 A | 10/1999 | Gorr |
| 5,963,247 A | 10/1999 | Banitt |
| 5,964,822 A | 10/1999 | Alland et al. |
| 5,971,552 A | 10/1999 | O'Farrell et al. |
| 5,982,288 A | 11/1999 | Sawatari et al. |
| 5,986,796 A | 11/1999 | Miles |
| 5,990,469 A | 11/1999 | Bechtel et al. |
| 5,990,649 A | 11/1999 | Nagao et al. |
| 5,991,427 A | 11/1999 | Kakinami et al. |
| 6,001,486 A | 12/1999 | Varaprasad et al. |
| 6,009,336 A | 12/1999 | Harris et al. |
| 6,020,704 A | 2/2000 | Buschur |
| 6,028,537 A | 2/2000 | Suman et al. |
| 6,031,484 A | 2/2000 | Bullinger |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |
| 6,057,754 A | 5/2000 | Kinoshita et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,094,198 A | 7/2000 | Shashua |
| 6,097,023 A | 8/2000 | Schofield et al. |
| 6,097,024 A | 8/2000 | Stam et al. |
| 6,100,811 A | 8/2000 | Hsu et al. |
| 6,107,939 A | 8/2000 | Sorden |
| 6,116,743 A | 9/2000 | Hoek |
| 6,122,597 A | 9/2000 | Saneyoshi et al. |
| 6,124,647 A | 9/2000 | Marcus et al. |
| 6,124,886 A | 9/2000 | DeLine et al. |
| 6,139,172 A | 10/2000 | Bos et al. |
| 6,140,980 A | 10/2000 | Spitzer et al. |
| 6,144,022 A | 11/2000 | Tenenbaum et al. |
| 6,144,158 A | 11/2000 | Beam |
| 6,150,014 A | 11/2000 | Chu et al. |
| 6,150,930 A | 11/2000 | Cooper |
| 6,151,065 A | 11/2000 | Steed et al. |
| 6,151,539 A | 11/2000 | Bergholz et al. |
| 6,158,655 A | 12/2000 | DeVries, Jr. et al. |
| 6,166,628 A | 12/2000 | Andreas |
| 6,170,955 B1 | 1/2001 | Campbell et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,590 B1 | 1/2001 | Prevost et al. |
| 6,188,939 B1 | 2/2001 | Morgan et al. |
| 6,198,409 B1 | 3/2001 | Schofield et al. |
| 6,201,642 B1 | 3/2001 | Bos |
| 6,211,907 B1 | 4/2001 | Scaman et al. |
| 6,218,934 B1 | 4/2001 | Regan |
| 6,219,444 B1 | 4/2001 | Shashua et al. |
| 6,222,447 B1 | 4/2001 | Schofield et al. |
| 6,222,460 B1 | 4/2001 | DeLine et al. |
| 6,226,061 B1 | 5/2001 | Tagusa |
| 6,229,319 B1 | 5/2001 | Johnson |
| 6,243,003 B1 | 6/2001 | DeLine et al. |
| 6,247,819 B1 | 6/2001 | Turnbull et al. |
| 6,250,148 B1 | 6/2001 | Lynam |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 * | 7/2001 | Laumeyer ......... G06K 9/00818 382/104 |
| 6,278,377 B1 | 8/2001 | DeLine et al. |
| 6,281,804 B1 | 8/2001 | Haller et al. |
| 6,285,393 B1 | 9/2001 | Shimoura et al. |
| 6,285,778 B1 | 9/2001 | Nakajima et al. |
| 6,291,905 B1 | 9/2001 | Drummond et al. |
| 6,291,906 B1 | 9/2001 | Marcus et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,313,454 B1 | 11/2001 | Bos et al. |
| 6,315,421 B1 | 11/2001 | Apfelbeck et al. |
| 6,317,057 B1 | 11/2001 | Lee |
| 6,318,870 B1 | 11/2001 | Spooner et al. |
| 6,320,176 B1 | 11/2001 | Schofield et al. |
| 6,320,282 B1 | 11/2001 | Caldwell |
| 6,324,450 B1 | 11/2001 | Iwama |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,359,392 B1 | 3/2002 | He |
| 6,362,729 B1 | 3/2002 | Hellmann et al. |
| 6,366,213 B2 | 4/2002 | DeLine et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham |
| 6,389,340 B1 | 5/2002 | Rayner |
| 6,392,218 B1 | 5/2002 | Kuehnle |
| 6,396,397 B1 | 5/2002 | Bos et al. |
| 6,396,408 B2 | 5/2002 | Drummond et al. |
| 6,411,204 B1 | 6/2002 | Bloomfield et al. |
| 6,411,328 B1 | 6/2002 | Franke et al. |
| 6,420,975 B1 * | 7/2002 | DeLine ............... B60R 1/12 340/425.5 |
| 6,424,273 B1 | 7/2002 | Gutta et al. |
| 6,428,172 B1 | 8/2002 | Hutzel et al. |
| 6,429,594 B1 | 8/2002 | Stam et al. |
| 6,430,303 B1 | 8/2002 | Naoi et al. |

(56) References Cited

U.S. PATENT DOCUMENTS

| | | |
|---|---|---|
| 6,433,676 B2 | 8/2002 | DeLine et al. |
| 6,433,817 B1 | 8/2002 | Guerra |
| 6,441,748 B1 | 8/2002 | Takagi et al. |
| 6,442,465 B2 | 8/2002 | Breed et al. |
| 6,445,287 B1 | 9/2002 | Schofield et al. |
| 6,445,809 B1 | 9/2002 | Sasaki et al. |
| 6,449,540 B1 | 9/2002 | Raynar |
| 6,452,148 B1 | 9/2002 | Bendicks et al. |
| 6,466,136 B2 | 10/2002 | DeLine et al. |
| 6,466,684 B1 | 10/2002 | Sasaki et al. |
| 6,469,739 B1 | 10/2002 | Bechtel et al. |
| 6,472,977 B1 | 10/2002 | Poechmueller |
| 6,472,979 B2 | 10/2002 | Schofield et al. |
| 6,477,260 B1 | 11/2002 | Shimomura |
| 6,477,464 B2 | 11/2002 | McCarthy et al. |
| 6,483,438 B2 | 11/2002 | DeLine et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,509,832 B1 | 1/2003 | Bauer et al. |
| 6,513,252 B1 | 2/2003 | Schierbeek et al. |
| 6,515,378 B2 | 2/2003 | Drummond et al. |
| 6,516,272 B2 | 2/2003 | Lin |
| 6,516,664 B2 | 2/2003 | Lynam |
| 6,523,964 B2 | 2/2003 | Schofield et al. |
| 6,534,884 B2 | 3/2003 | Marcus et al. |
| 6,535,242 B1 | 3/2003 | Strumolo et al. |
| 6,539,306 B2 | 3/2003 | Turnbull |
| 6,540,193 B1 | 4/2003 | DeLine |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,577,334 B1 | 6/2003 | Kawai et al. |
| 6,578,017 B1 | 6/2003 | Ebersole et al. |
| 6,587,573 B1 | 7/2003 | Stam et al. |
| 6,587,968 B1 | 7/2003 | Leyva |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,614,579 B2 | 9/2003 | Roberts et al. |
| 6,617,564 B2 | 9/2003 | Ockerse et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,653,614 B2 | 11/2003 | Stam et al. |
| 6,672,731 B2 | 1/2004 | Schnell et al. |
| 6,674,562 B1 | 1/2004 | Miles |
| 6,674,878 B2 | 1/2004 | Retterath et al. |
| 6,678,056 B2 | 1/2004 | Downs |
| 6,678,590 B1 | 1/2004 | Burchfiel |
| 6,678,614 B2 | 1/2004 | McCarthy et al. |
| 6,680,792 B2 | 1/2004 | Miles |
| 6,681,163 B2 | 1/2004 | Stam et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,524 B2 | 4/2004 | DeLine et al. |
| 6,717,610 B1 | 4/2004 | Bos et al. |
| 6,728,393 B2 | 4/2004 | Stam et al. |
| 6,728,623 B2 | 4/2004 | Takenaga et al. |
| 6,735,506 B2 | 5/2004 | Breed et al. |
| 6,738,088 B1 | 5/2004 | Uskolovsky et al. |
| 6,741,186 B2 | 5/2004 | Ross |
| 6,741,377 B2 | 5/2004 | Miles |
| 6,744,353 B2 | 6/2004 | Sjönell |
| 6,754,367 B1 | 6/2004 | Ito et al. |
| 6,757,109 B2 | 6/2004 | Bos |
| 6,762,867 B2 | 7/2004 | Lippert et al. |
| 6,764,210 B2 | 7/2004 | Akiyama |
| 6,765,480 B2 | 7/2004 | Tseng |
| 6,774,988 B2 | 8/2004 | Stam et al. |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa |
| 6,801,244 B2 | 10/2004 | Takeda et al. |
| 6,802,617 B2 | 10/2004 | Schofield et al. |
| 6,806,452 B2 | 10/2004 | Bos et al. |
| 6,807,287 B1 | 10/2004 | Hermans |
| 6,811,330 B1 | 11/2004 | Tozawa |
| 6,812,463 B2 | 11/2004 | Okada |
| 6,813,545 B2 | 11/2004 | Stromme |
| 6,819,231 B2 | 11/2004 | Berberich et al. |
| 6,819,779 B1 | 11/2004 | Nichani |
| 6,822,563 B2 | 11/2004 | Bos et al. |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,831,261 B2 | 12/2004 | Schofield et al. |
| 6,838,980 B2 | 1/2005 | Gloger et al. |
| 6,842,189 B2 | 1/2005 | Park |
| 6,847,487 B2 | 1/2005 | Burgner |
| 6,850,629 B2 | 2/2005 | Jeon |
| 6,853,738 B1 | 2/2005 | Nishigaki et al. |
| 6,859,148 B2 | 2/2005 | Miller et al. |
| 6,861,809 B2 | 3/2005 | Stam |
| 6,864,930 B2 | 3/2005 | Matsushita et al. |
| 6,873,253 B2 | 3/2005 | Veziris |
| 6,882,287 B2 | 4/2005 | Schofield |
| 6,888,447 B2 | 5/2005 | Hori et al. |
| 6,889,161 B2 | 5/2005 | Winner et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,928,180 B2 | 8/2005 | Stam et al. |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,956,469 B2 | 10/2005 | Hirvonen et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,661 B1 | 11/2005 | Hattori et al. |
| 6,967,569 B2 | 11/2005 | Weber et al. |
| 6,968,736 B2 | 11/2005 | Lynam |
| 6,975,775 B2 | 12/2005 | Rykowski et al. |
| 6,980,092 B2 | 12/2005 | Turnbull et al. |
| 6,989,736 B2 | 1/2006 | Berberich et al. |
| 6,990,397 B2 | 1/2006 | Albou et al. |
| 6,995,687 B2 | 2/2006 | Lang et al. |
| 7,004,593 B2 | 2/2006 | Weller et al. |
| 7,004,606 B2 | 2/2006 | Schofield |
| 7,005,974 B2 | 2/2006 | McMahon et al. |
| 7,012,507 B2 | 3/2006 | DeLine et al. |
| 7,012,727 B2 | 3/2006 | Hutzel et al. |
| 7,023,331 B2 | 4/2006 | Kodama |
| 7,027,387 B2 | 4/2006 | Reinold et al. |
| 7,027,615 B2 | 4/2006 | Chen |
| 7,030,738 B2 | 4/2006 | Ishii |
| 7,030,775 B2 | 4/2006 | Sekiguchi |
| 7,030,778 B2 | 4/2006 | Ra |
| 7,038,577 B2 | 5/2006 | Pawlicki et al. |
| 7,046,448 B2 | 5/2006 | Burgner |

(56) References Cited

U.S. PATENT DOCUMENTS

| | | | |
|---|---|---|---|
| 7,057,505 B2 | 6/2006 | Iwamoto |
| 7,057,681 B2 | 6/2006 | Hinata et al. |
| 7,062,300 B1 | 6/2006 | Kim |
| 7,065,432 B2 | 6/2006 | Moisel et al. |
| 7,068,289 B2 | 6/2006 | Satoh et al. |
| 7,068,844 B1 | 6/2006 | Javidi et al. |
| 7,085,633 B2 | 8/2006 | Nishira et al. |
| 7,085,637 B2 | 8/2006 | Breed et al. |
| 7,091,837 B2 | 8/2006 | Nakai et al. |
| 7,092,548 B2 | 8/2006 | Laumeyer et al. |
| 7,095,432 B2 | 8/2006 | Nakayama et al. |
| 7,106,213 B2 | 9/2006 | White |
| 7,110,021 B2 | 9/2006 | Nobori et al. |
| 7,110,156 B2 | 9/2006 | Lawlor et al. |
| 7,113,867 B1 | 9/2006 | Stein |
| 7,116,246 B2 | 10/2006 | Winter et al. |
| 7,121,028 B2 | 10/2006 | Shoen et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,171,027 B2 | 1/2007 | Satoh |
| 7,184,585 B2 | 2/2007 | Hamza et al. |
| 7,187,498 B2 | 3/2007 | Bengoechea et al. |
| 7,188,963 B2 | 3/2007 | Schofield et al. |
| 7,195,381 B2 | 3/2007 | Lynam et al. |
| 7,202,776 B2 * | 4/2007 | Breed | B60N 2/2863 340/435 |
| 7,202,987 B2 | 4/2007 | Varaprasad et al. |
| 7,205,904 B2 | 4/2007 | Schofield |
| 7,221,363 B2 | 5/2007 | Roberts et al. |
| 7,224,324 B2 | 5/2007 | Quist et al. |
| 7,227,459 B2 | 6/2007 | Bos et al. |
| 7,227,611 B2 | 6/2007 | Hull et al. |
| 7,235,918 B2 | 6/2007 | McCullough et al. |
| 7,248,283 B2 | 7/2007 | Takagi et al. |
| 7,248,344 B2 | 7/2007 | Morcom |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,271,951 B2 | 9/2007 | Weber et al. |
| 7,304,661 B2 | 12/2007 | Ishikura |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,337,055 B2 | 2/2008 | Matsumoto et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,360,932 B2 | 4/2008 | Uken et al. |
| 7,362,883 B2 | 4/2008 | Otsuka et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,403,659 B2 | 7/2008 | Das et al. |
| 7,420,756 B2 | 9/2008 | Lynam |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,429,998 B2 | 9/2008 | Kawauchi et al. |
| 7,432,248 B2 | 10/2008 | Roberts et al. |
| 7,432,967 B2 | 10/2008 | Bechtel et al. |
| 7,446,924 B2 | 11/2008 | Schofield et al. |
| 7,459,664 B2 | 12/2008 | Schofield et al. |
| 7,460,007 B2 | 12/2008 | Schofield et al. |
| 7,463,138 B2 | 12/2008 | Pawlicki et al. |
| 7,468,652 B2 | 12/2008 | DeLine et al. |
| 7,474,963 B2 | 1/2009 | Taylor et al. |
| 7,480,149 B2 | 1/2009 | DeWard et al. |
| 7,489,374 B2 | 2/2009 | Utsumi et al. |
| 7,495,719 B2 | 2/2009 | Adachi et al. |
| 7,525,604 B2 | 4/2009 | Xue |
| 7,526,103 B2 | 4/2009 | Schofield et al. |
| 7,533,998 B2 | 5/2009 | Schofield et al. |
| 7,541,743 B2 | 6/2009 | Salmeen et al. |
| 7,543,946 B2 | 6/2009 | Ockerse et al. |
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,566,639 B2 | 7/2009 | Kohda |
| 7,566,851 B2 | 7/2009 | Stein et al. |
| 7,567,291 B2 | 7/2009 | Bechtel et al. |
| 7,605,856 B2 | 10/2009 | Imoto |
| 7,613,327 B2 | 11/2009 | Stam et al. |
| 7,616,781 B2 | 11/2009 | Schofield et al. |
| 7,619,508 B2 | 11/2009 | Lynam et al. |
| 7,629,996 B2 | 12/2009 | Rademacher et al. |
| 7,633,383 B2 | 12/2009 | Dunsmoir et al. |
| 7,639,149 B2 | 12/2009 | Katoh |
| 7,650,030 B2 | 1/2010 | Shan et al. |
| 7,653,215 B2 | 1/2010 | Stam |
| 7,655,894 B2 | 2/2010 | Schofield et al. |
| 7,663,798 B2 | 2/2010 | Tonar et al. |
| 7,676,087 B2 | 3/2010 | Dhua et al. |
| 7,679,498 B2 | 3/2010 | Pawlicki et al. |
| 7,683,326 B2 | 3/2010 | Stam et al. |
| 7,702,133 B2 | 4/2010 | Muramatsu et al. |
| 7,719,408 B2 | 5/2010 | DeWard et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,786,898 B2 | 8/2010 | Stein et al. |
| 7,791,694 B2 | 9/2010 | Molsen et al. |
| 7,792,329 B2 | 9/2010 | Schofield et al. |
| 7,825,600 B2 | 11/2010 | Stam et al. |
| 7,842,154 B2 | 11/2010 | Lynam |
| 7,843,451 B2 | 11/2010 | Lafon |
| 7,854,514 B2 | 12/2010 | Conner et al. |
| 7,855,755 B2 | 12/2010 | Weller et al. |
| 7,855,778 B2 | 12/2010 | Yung et al. |
| 7,859,565 B2 | 12/2010 | Schofield et al. |
| 7,873,187 B2 | 1/2011 | Schofield et al. |
| 7,877,175 B2 | 1/2011 | Higgins-Luthman |
| 7,881,496 B2 | 2/2011 | Camilleri et al. |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,152 B2 | 5/2011 | Schofield et al. |
| 7,965,357 B2 | 6/2011 | Van De Witte et al. |
| 7,972,045 B2 | 7/2011 | Schofield |
| 7,991,522 B2 | 8/2011 | Higgins-Luthman |
| 7,994,462 B2 | 8/2011 | Schofield et al. |
| 7,995,067 B2 | 8/2011 | Navon |
| 8,004,392 B2 | 8/2011 | DeLine et al. |
| 8,017,898 B2 | 9/2011 | Lu et al. |
| 8,027,691 B2 | 9/2011 | Bernas et al. |
| 8,045,760 B2 | 10/2011 | Stam et al. |
| 8,063,759 B2 | 11/2011 | Bos et al. |
| 8,064,643 B2 | 11/2011 | Stein et al. |
| 8,082,101 B2 | 12/2011 | Stein et al. |
| 8,090,153 B2 | 1/2012 | Schofield et al. |
| 8,094,002 B2 | 1/2012 | Schofield et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,116,929 B2 | 2/2012 | Higgins-Luthman |
| 8,120,652 B2 | 2/2012 | Bechtel et al. |
| 8,162,518 B2 | 4/2012 | Schofield |
| 8,164,628 B2 | 4/2012 | Stein et al. |
| 8,179,437 B2 | 5/2012 | Schofield et al. |
| 8,184,159 B2 | 5/2012 | Luo |
| 8,203,440 B2 | 6/2012 | Schofield et al. |
| 8,203,443 B2 | 6/2012 | Bos et al. |
| 8,222,588 B2 | 7/2012 | Schofield et al. |
| 8,224,031 B2 | 7/2012 | Saito |

(56) References Cited

U.S. PATENT DOCUMENTS

| | | |
|---|---|---|
| 8,233,045 B2 | 7/2012 | Luo et al. |
| 8,254,635 B2 | 8/2012 | Stein et al. |
| 8,288,711 B2 | 10/2012 | Heslin et al. |
| 8,289,142 B2 | 10/2012 | Pawlicki et al. |
| 8,289,430 B2 | 10/2012 | Bechtel et al. |
| 8,300,058 B2 | 10/2012 | Navon et al. |
| 8,305,471 B2 | 11/2012 | Bechtel et al. |
| 8,308,325 B2 | 11/2012 | Takayanazi et al. |
| 8,314,689 B2 | 11/2012 | Schofield et al. |
| 8,324,552 B2 | 12/2012 | Schofield et al. |
| 8,325,028 B2 | 12/2012 | Schofield et al. |
| 8,325,986 B2 | 12/2012 | Schofield et al. |
| 8,339,526 B2 | 12/2012 | Minikey, Jr. et al. |
| 8,350,683 B2 | 1/2013 | DeLine et al. |
| 8,362,883 B2 | 1/2013 | Hale et al. |
| 8,378,851 B2 | 2/2013 | Stein et al. |
| 8,386,114 B2 | 2/2013 | Higgins-Luthman |
| 8,405,726 B2 | 3/2013 | Schofield et al. |
| 8,414,137 B2 | 4/2013 | Quinn et al. |
| 8,434,919 B2 | 5/2013 | Schofield |
| 8,452,055 B2 | 5/2013 | Stein et al. |
| 8,481,910 B2 | 7/2013 | Schofield et al. |
| 8,481,916 B2 | 7/2013 | Heslin et al. |
| 8,492,698 B2 | 7/2013 | Schofield et al. |
| 8,508,593 B1 | 8/2013 | Schofield et al. |
| 8,513,590 B2 | 8/2013 | Heslin et al. |
| 8,531,278 B2 | 9/2013 | DeWard et al. |
| 8,531,279 B2 | 9/2013 | DeLine et al. |
| 8,534,887 B2 | 9/2013 | DeLine et al. |
| 8,538,205 B2 | 9/2013 | Sixsou et al. |
| 8,543,330 B2 | 9/2013 | Taylor et al. |
| 8,553,088 B2 | 10/2013 | Stein et al. |
| 8,593,521 B2 | 11/2013 | Schofield et al. |
| 8,599,001 B2 | 12/2013 | Schofield et al. |
| 8,629,768 B2 | 1/2014 | Bos et al. |
| 8,636,393 B2 | 1/2014 | Schofield |
| 8,637,801 B2 | 1/2014 | Schofield et al. |
| 8,643,724 B2 | 2/2014 | Schofield et al. |
| 8,656,221 B2 | 2/2014 | Sixsou et al. |
| 8,665,079 B2 | 3/2014 | Pawlicki et al. |
| 8,676,491 B2 | 3/2014 | Taylor et al. |
| 8,686,840 B2 | 4/2014 | Drummond et al. |
| 8,692,659 B2 | 4/2014 | Schofield et al. |
| 8,818,042 B2 | 8/2014 | Schofield et al. |
| 9,008,369 B2 | 4/2015 | Schofield et al. |
| 9,171,217 B2 | 10/2015 | Pawlicki et al. |
| 9,191,634 B2 | 11/2015 | Schofield et al. |
| 9,428,192 B2 | 8/2016 | Schofield et al. |
| 9,609,289 B2 | 3/2017 | Schofield et al. |
| 9,736,435 B2 | 8/2017 | Schofield et al. |
| 2001/0002451 A1 | 5/2001 | Breed |
| 2002/0003571 A1 | 1/2002 | Schofield et al. |
| 2002/0005778 A1 | 1/2002 | Breed |
| 2002/0011611 A1 | 1/2002 | Huang et al. |
| 2002/0029103 A1 | 3/2002 | Breed et al. |
| 2002/0060522 A1 | 5/2002 | Stam et al. |
| 2002/0080235 A1 | 6/2002 | Jeon |
| 2002/0113873 A1 | 8/2002 | Williams |
| 2002/0116106 A1 | 8/2002 | Breed et al. |
| 2002/0126002 A1 | 9/2002 | Patchell |
| 2002/0126875 A1 | 9/2002 | Naoi et al. |
| 2002/0135468 A1 | 9/2002 | Bos et al. |
| 2003/0040864 A1 | 2/2003 | Stein |
| 2003/0070741 A1 | 4/2003 | Rosenberg et al. |
| 2003/0103142 A1 | 6/2003 | Hitomi et al. |
| 2003/0122930 A1* | 7/2003 | Schofield .............. B60R 1/00 348/148 |
| 2003/0125855 A1 | 7/2003 | Breed et al. |
| 2003/0128106 A1 | 7/2003 | Ross |
| 2003/0137586 A1 | 7/2003 | Lewellen |
| 2003/0191568 A1* | 10/2003 | Breed .............. B60W 40/06 701/36 |
| 2003/0202683 A1 | 10/2003 | Ma et al. |
| 2003/0209893 A1 | 11/2003 | Breed et al. |
| 2003/0222982 A1 | 12/2003 | Hamdan et al. |
| 2004/0016870 A1 | 1/2004 | Pawlicki et al. |
| 2004/0021947 A1* | 2/2004 | Schofield .............. B60N 2/002 359/601 |
| 2004/0022416 A1 | 2/2004 | Lemelson |
| 2004/0086153 A1 | 5/2004 | Tsai et al. |
| 2004/0096082 A1 | 5/2004 | Nakai et al. |
| 2004/0146184 A1 | 7/2004 | Hamza et al. |
| 2004/0148063 A1 | 7/2004 | Patchell |
| 2004/0164228 A1 | 8/2004 | Fogg et al. |
| 2004/0200948 A1 | 10/2004 | Bos et al. |
| 2005/0036325 A1 | 2/2005 | Furusawa et al. |
| 2005/0073853 A1 | 4/2005 | Stam |
| 2005/0131607 A1 | 6/2005 | Breed |
| 2005/0219852 A1 | 10/2005 | Stam et al. |
| 2005/0226490 A1 | 10/2005 | Phillips et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0095175 A1 | 5/2006 | deWaal et al. |
| 2006/0103727 A1 | 5/2006 | Tseng |
| 2006/0250224 A1 | 11/2006 | Steffel et al. |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0115357 A1 | 5/2007 | Stein et al. |
| 2007/0120657 A1 | 5/2007 | Schofield et al. |
| 2007/0154063 A1 | 7/2007 | Breed |
| 2007/0154068 A1 | 7/2007 | Stein et al. |
| 2007/0193811 A1 | 8/2007 | Breed et al. |
| 2007/0221822 A1 | 9/2007 | Stein et al. |
| 2007/0229238 A1 | 10/2007 | Boyles et al. |
| 2007/0230792 A1 | 10/2007 | Shashua et al. |
| 2007/0242339 A1 | 10/2007 | Bradley |
| 2008/0036576 A1 | 2/2008 | Stein et al. |
| 2008/0043099 A1 | 2/2008 | Stein et al. |
| 2008/0137908 A1 | 6/2008 | Stein |
| 2008/0147321 A1 | 6/2008 | Howard et al. |
| 2008/0231710 A1 | 9/2008 | Asari et al. |
| 2008/0234899 A1 | 9/2008 | Breed et al. |
| 2008/0239393 A1 | 10/2008 | Navon |
| 2008/0266396 A1 | 10/2008 | Stein |
| 2009/0052003 A1 | 2/2009 | Schofield et al. |
| 2009/0066065 A1 | 3/2009 | Breed et al. |
| 2009/0113509 A1 | 4/2009 | Tseng et al. |
| 2009/0143986 A1 | 6/2009 | Stein et al. |
| 2009/0182690 A1 | 7/2009 | Stein |
| 2009/0190015 A1 | 7/2009 | Bechtel et al. |
| 2009/0201137 A1 | 8/2009 | Weller et al. |
| 2009/0243824 A1 | 10/2009 | Peterson et al. |
| 2009/0256938 A1 | 10/2009 | Bechtel et al. |
| 2009/0300629 A1 | 12/2009 | Navon et al. |
| 2010/0125717 A1 | 5/2010 | Navon |
| 2010/0172547 A1 | 7/2010 | Akutsu |
| 2011/0018700 A1 | 1/2011 | Stein et al. |
| 2011/0219217 A1 | 9/2011 | Sixsou et al. |
| 2011/0280495 A1 | 11/2011 | Sixsou et al. |
| 2011/0307684 A1 | 12/2011 | Krenin et al. |
| 2012/0002053 A1 | 1/2012 | Stein et al. |
| 2012/0045112 A1 | 2/2012 | Lundblad et al. |
| 2012/0056735 A1 | 3/2012 | Stein et al. |
| 2012/0069185 A1 | 3/2012 | Stein |
| 2012/0105639 A1 | 5/2012 | Stein et al. |
| 2012/0140076 A1 | 6/2012 | Rosenbaum et al. |
| 2012/0200707 A1 | 8/2012 | Stein et al. |
| 2012/0212593 A1 | 8/2012 | Na'aman et al. |
| 2012/0233841 A1 | 9/2012 | Stein |
| 2012/0314071 A1 | 12/2012 | Rosenbaum et al. |
| 2013/0135444 A1 | 5/2013 | Stein et al. |
| 2013/0141580 A1 | 6/2013 | Stein et al. |
| 2013/0147957 A1 | 6/2013 | Stein |
| 2013/0169536 A1 | 7/2013 | Wexler et al. |
| 2013/0271584 A1 | 10/2013 | Wexler et al. |
| 2013/0308828 A1 | 11/2013 | Stein et al. |
| 2014/0015976 A1 | 1/2014 | DeLine et al. |
| 2014/0033203 A1 | 1/2014 | Dogon et al. |
| 2014/0049648 A1 | 2/2014 | Stein et al. |

(56) References Cited

U.S. PATENT DOCUMENTS

| | | |
|---|---|---|
| 2014/0082307 A1 | 3/2014 | Kreinin et al. |
| 2014/0093132 A1 | 4/2014 | Stein et al. |
| 2014/0122551 A1 | 5/2014 | Dogon et al. |
| 2014/0125799 A1 | 5/2014 | Bos et al. |
| 2014/0156140 A1 | 6/2014 | Stein et al. |
| 2014/0160244 A1 | 6/2014 | Berberian et al. |
| 2014/0161323 A1 | 6/2014 | Livyatan et al. |
| 2014/0198184 A1 | 7/2014 | Stein et al. |

FOREIGN PATENT DOCUMENTS

| | | |
|---|---|---|
| CA | 1101522 | 5/1981 |
| CA | 2392578 | 5/2001 |
| CA | 2392652 | 5/2001 |
| CH | 644315 | 7/1984 |
| CN | 2074262 | 4/1991 |
| CN | 2185701 | 12/1994 |
| CN | 1104741 | 7/1995 |
| CN | 2204254 | 8/1995 |
| CN | 1194056 | 9/1998 |
| CN | 1235913 | 11/1999 |
| CN | 1383032 | 12/2002 |
| CN | 102193852 | 9/2011 |
| CN | 102542256 | 7/2012 |
| DE | 1152627 | 8/1963 |
| DE | 1182971 | 12/1964 |
| DE | 1190413 | 4/1965 |
| DE | 1196598 | 7/1965 |
| DE | 1214174 | 4/1966 |
| DE | 2064839 | 7/1972 |
| DE | 3004247 | 8/1981 |
| DE | 3040555 | 5/1982 |
| DE | 3101855 | 8/1982 |
| DE | 3240498 | 5/1984 |
| DE | 3248511 | 7/1984 |
| DE | 3433671 | 3/1985 |
| DE | 3515116 | 10/1986 |
| DE | 3528220 | 2/1987 |
| DE | 3535588 | 4/1987 |
| DE | 3601388 | 7/1987 |
| DE | 3637165 | 5/1988 |
| DE | 3636946 | 6/1988 |
| DE | 3642196 | 6/1988 |
| DE | 3734066 | 4/1989 |
| DE | 3737395 | 5/1989 |
| DE | 3838365 | 6/1989 |
| DE | 3833022 | 4/1990 |
| DE | 3839512 | 5/1990 |
| DE | 3839513 | 5/1990 |
| DE | 3937576 | 5/1990 |
| DE | 3840425 | 6/1990 |
| DE | 3844364 | 7/1990 |
| DE | 9010196 | 10/1990 |
| DE | 4015927 | 11/1990 |
| DE | 3932216 | 4/1991 |
| DE | 4007646 | 9/1991 |
| DE | 4107965 | 9/1991 |
| DE | 4111993 | 10/1991 |
| DE | 4015959 | 11/1991 |
| DE | 4116255 | 12/1991 |
| DE | 4023952 | 2/1992 |
| DE | 4130010 | 3/1992 |
| DE | 4032927 | 4/1992 |
| DE | 4133882 | 4/1992 |
| DE | 4035956 | 5/1992 |
| DE | 4122531 | 1/1993 |
| DE | 4124654 | 1/1993 |
| DE | 4137551 | 3/1993 |
| DE | 4136427 | 5/1993 |
| DE | 4300941 | 7/1993 |
| DE | 4206142 | 9/1993 |
| DE | 4214223 | 11/1993 |
| DE | 4231137 | 2/1994 |
| DE | 4328304 | 3/1994 |
| DE | 4328902 | 3/1994 |
| DE | 4332612 | 4/1994 |
| DE | 4238599 | 6/1994 |
| DE | 4337756 | 6/1994 |
| DE | 4344485 | 6/1994 |
| DE | 4304005 | 8/1994 |
| DE | 4332836 | 9/1994 |
| DE | 4407082 | 9/1994 |
| DE | 4407757 | 9/1994 |
| DE | 4411179 | 10/1994 |
| DE | 4412669 | 10/1994 |
| DE | 4418122 | 12/1994 |
| DE | 4423966 | 1/1995 |
| DE | 4336288 | 3/1995 |
| DE | 4428069 | 3/1995 |
| DE | 4434698 | 3/1995 |
| DE | 4341409 | 6/1995 |
| DE | 4446452 | 6/1995 |
| DE | 69107283 | 7/1995 |
| DE | 4403937 | 8/1995 |
| DE | 19505487 | 9/1995 |
| DE | 19518978 | 11/1995 |
| DE | 4480341 | 3/1996 |
| DE | 069302975 | 12/1996 |
| DE | 29703084 | 6/1997 |
| DE | 29805142 | 6/1998 |
| DE | 19755008 | 7/1999 |
| DE | 19829162 | 1/2000 |
| DE | 10237554 | 3/2004 |
| DE | 000010251949 | 5/2004 |
| DE | 19530617 | 2/2009 |
| EP | 0048492 | 3/1982 |
| EP | 0049722 | 4/1982 |
| EP | 0072406 | 2/1983 |
| EP | 0176615 | 4/1986 |
| EP | 0202460 | 11/1986 |
| EP | 0169734 | 10/1989 |
| EP | 0340735 | 11/1989 |
| EP | 0341985 | 11/1989 |
| EP | 0348691 | 1/1990 |
| EP | 0353200 | 1/1990 |
| EP | 0354561 | 2/1990 |
| EP | 0360880 | 4/1990 |
| EP | 0361914 | 4/1990 |
| EP | 0387817 | 9/1990 |
| EP | 0527665 | 2/1991 |
| EP | 0426503 | 5/1991 |
| EP | 0433538 | 6/1991 |
| EP | 0450553 | 10/1991 |
| EP | 0454516 | 10/1991 |
| EP | 0455524 | 11/1991 |
| EP | 0459433 | 12/1991 |
| EP | 473866 | 3/1992 |
| EP | 0477986 | 4/1992 |
| EP | 0479271 | 4/1992 |
| EP | 0487100 | 5/1992 |
| EP | 0487465 | 5/1992 |
| EP | 0492591 | 7/1992 |
| EP | 0495508 | 7/1992 |
| EP | 0496411 | 7/1992 |
| EP | 0501345 | 9/1992 |
| EP | 0505237 | 9/1992 |
| EP | 0513476 | 11/1992 |
| EP | 0514343 | 11/1992 |
| EP | 529346 | 3/1993 |
| EP | 0532379 | 3/1993 |
| EP | 0533508 | 3/1993 |
| EP | 0550397 | 7/1993 |
| EP | 0558027 | 9/1993 |
| EP | 0564858 | 10/1993 |
| EP | 0567059 | 10/1993 |
| EP | 0582236 | 2/1994 |
| EP | 0586857 | 3/1994 |
| EP | 0588815 | 3/1994 |
| EP | 0590588 | 4/1994 |
| EP | 0591743 | 4/1994 |
| EP | 0602962 | 6/1994 |
| EP | 0605045 | 7/1994 |
| EP | 0606586 | 7/1994 |
| EP | 0617296 | 9/1994 |

(56) References Cited

FOREIGN PATENT DOCUMENTS

| | | |
|---|---|---|
| EP | 0626654 | 11/1994 |
| EP | 0640903 | 3/1995 |
| EP | 0642950 | 3/1995 |
| EP | 0654392 | 5/1995 |
| EP | 0667708 | 8/1995 |
| EP | 0677428 | 10/1995 |
| EP | 0686865 | 12/1995 |
| EP | 0687594 | 12/1995 |
| EP | 0697641 | 2/1996 |
| EP | 733252 | 9/1996 |
| EP | 0756968 | 2/1997 |
| EP | 0788947 | 8/1997 |
| EP | 0487332 | 10/1997 |
| EP | 0874331 | 10/1998 |
| EP | 0889801 | 1/1999 |
| EP | 0893308 | 1/1999 |
| EP | 0899157 | 3/1999 |
| EP | 0913751 | 5/1999 |
| EP | 0949818 | 10/1999 |
| EP | 1022903 | 7/2000 |
| EP | 1257971 | 11/2000 |
| EP | 1058220 | 12/2000 |
| EP | 1065642 | 1/2001 |
| EP | 1074430 | 2/2001 |
| EP | 1115250 | 7/2001 |
| EP | 0830267 | 12/2001 |
| EP | 1170173 | 1/2002 |
| EP | 1236126 | 9/2002 |
| EP | 0860325 | 11/2002 |
| EP | 1359557 | 11/2003 |
| EP | 1727089 | 11/2006 |
| EP | 1748644 | 1/2007 |
| EP | 1754179 | 2/2007 |
| EP | 1790541 | 5/2007 |
| EP | 1806595 | 7/2007 |
| EP | 1837803 | 9/2007 |
| EP | 1887492 | 2/2008 |
| EP | 1741079 | 5/2008 |
| EP | 1930863 | 6/2008 |
| EP | 1978484 | 10/2008 |
| EP | 2068269 | 6/2009 |
| EP | 2101258 | 9/2009 |
| EP | 2131278 | 12/2009 |
| EP | 2150437 | 2/2010 |
| EP | 2172873 | 4/2010 |
| EP | 2187316 | 5/2010 |
| EP | 2365441 | 9/2011 |
| EP | 2377094 | 10/2011 |
| EP | 2383679 | 11/2011 |
| EP | 2383713 | 11/2011 |
| EP | 2395472 | 12/2011 |
| EP | 2431917 | 3/2012 |
| EP | 2448251 | 5/2012 |
| EP | 2463843 | 6/2012 |
| EP | 2602741 | 6/2013 |
| EP | 2605185 | 6/2013 |
| EP | 2629242 | 8/2013 |
| EP | 2674323 | 12/2013 |
| EP | 2690548 | 1/2014 |
| EP | 2709020 | 3/2014 |
| EP | 2728462 | 5/2014 |
| ES | 2250218 | 4/2006 |
| FR | 2610401 | 8/1988 |
| FR | 2641237 | 7/1990 |
| FR | 2646383 | 11/1990 |
| FR | 2674201 | 9/1992 |
| FR | 2674354 | 9/1992 |
| FR | 2687000 | 8/1993 |
| FR | 2706211 | 12/1994 |
| FR | 2721872 | 1/1996 |
| GB | 914827 | 1/1963 |
| GB | 1000265 | 8/1965 |
| GB | 1008411 | 10/1965 |
| GB | 1054064 | 1/1967 |
| GB | 1098608 | 1/1968 |
| GB | 1098610 | 1/1968 |
| GB | 1106339 | 3/1968 |
| GB | 1178416 | 1/1970 |
| GB | 1197710 | 7/1970 |
| GB | 2210835 | 6/1989 |
| GB | 2233530 | 1/1991 |
| GB | 2255649 | 11/1992 |
| GB | 2261339 | 5/1993 |
| GB | 2262829 | 6/1993 |
| GB | 9310728 | 7/1993 |
| GB | 2267341 | 12/1993 |
| GB | 2271139 | 4/1994 |
| GB | 2275452 | 8/1994 |
| GB | 2280810 | 2/1995 |
| GB | 2289332 | 11/1995 |
| IE | 970014 | 7/1998 |
| JP | S5539843 | 3/1980 |
| JP | 55156901 | 12/1980 |
| JP | S5685110 | 7/1981 |
| JP | S5871230 | 4/1983 |
| JP | 58110334 | 6/1983 |
| JP | 58122421 | 7/1983 |
| JP | 59114139 | 7/1984 |
| JP | 59127200 | 7/1984 |
| JP | S6047737 | 3/1985 |
| JP | 6079889 | 5/1985 |
| JP | 6080953 | 5/1985 |
| JP | S6078312 | 5/1985 |
| JP | S60206746 | 10/1985 |
| JP | 60240545 | 11/1985 |
| JP | S60219133 | 11/1985 |
| JP | S60255537 | 12/1985 |
| JP | S6141929 | 2/1986 |
| JP | S6185238 | 4/1986 |
| JP | S61105245 | 5/1986 |
| JP | S61191937 | 8/1986 |
| JP | 61260217 | 11/1986 |
| JP | S61285151 | 12/1986 |
| JP | S61285152 | 12/1986 |
| JP | 62001652 | 1/1987 |
| JP | S6221010 | 1/1987 |
| JP | S6226141 | 2/1987 |
| JP | 62080143 | 4/1987 |
| JP | S6216073 | 4/1987 |
| JP | 6272245 | 5/1987 |
| JP | S62115600 | 5/1987 |
| JP | 62131837 | 6/1987 |
| JP | S62253543 | 11/1987 |
| JP | S62253546 | 11/1987 |
| JP | S62287164 | 12/1987 |
| JP | 63011446 | 1/1988 |
| JP | 63258236 | 10/1988 |
| JP | 63258237 | 10/1988 |
| JP | 63192788 U | 12/1988 |
| JP | 6414700 | 1/1989 |
| JP | 01123587 | 5/1989 |
| JP | H1168538 | 7/1989 |
| JP | 01242917 | 9/1989 |
| JP | H01233129 | 9/1989 |
| JP | H01265400 | 10/1989 |
| JP | H01275237 | 11/1989 |
| JP | H0268237 | 3/1990 |
| JP | 02190978 | 7/1990 |
| JP | H236417 | 8/1990 |
| JP | H02212232 | 8/1990 |
| JP | H2117935 | 9/1990 |
| JP | H0314739 | 1/1991 |
| JP | H0374231 | 3/1991 |
| JP | 03099952 | 4/1991 |
| JP | 03266739 | 5/1991 |
| JP | H03246413 | 11/1991 |
| JP | H05137144 | 11/1991 |
| JP | 03282707 | 12/1991 |
| JP | 03282709 | 12/1991 |
| JP | 03286399 | 12/1991 |
| JP | H03273953 | 12/1991 |
| JP | H042909 | 1/1992 |
| JP | H0410200 | 1/1992 |
| JP | 04114587 | 4/1992 |

(56) References Cited

FOREIGN PATENT DOCUMENTS

| | | |
|---|---|---|
| JP | 04127280 | 4/1992 |
| JP | 04137014 | 5/1992 |
| JP | H04137112 | 5/1992 |
| JP | H04194827 | 7/1992 |
| JP | 04239400 | 8/1992 |
| JP | 04242391 | 8/1992 |
| JP | H04238219 | 8/1992 |
| JP | 04250786 | 9/1992 |
| JP | 04291405 | 10/1992 |
| JP | H04303047 | 10/1992 |
| JP | H0516722 | 1/1993 |
| JP | H0538977 | 2/1993 |
| JP | H06229759 | 2/1993 |
| JP | 0577657 | 3/1993 |
| JP | 05050883 | 3/1993 |
| JP | H06332370 | 5/1993 |
| JP | H05155287 | 6/1993 |
| JP | 05189694 | 7/1993 |
| JP | H05172638 | 7/1993 |
| JP | 05213113 | 8/1993 |
| JP | H05201298 | 8/1993 |
| JP | 05244596 | 9/1993 |
| JP | H05229383 | 9/1993 |
| JP | 05298594 | 11/1993 |
| JP | 05313736 | 11/1993 |
| JP | H05297141 | 11/1993 |
| JP | 06048247 | 2/1994 |
| JP | H0640286 | 2/1994 |
| JP | 06076200 | 3/1994 |
| JP | H0672234 | 3/1994 |
| JP | 06107035 | 4/1994 |
| JP | 06113215 | 4/1994 |
| JP | 06117924 | 4/1994 |
| JP | 06150198 | 5/1994 |
| JP | H06162398 | 6/1994 |
| JP | H06174845 | 6/1994 |
| JP | H06191344 | 7/1994 |
| JP | 06215291 | 8/1994 |
| JP | 6227318 | 8/1994 |
| JP | 06230115 | 8/1994 |
| JP | H06229739 | 8/1994 |
| JP | 06247246 | 9/1994 |
| JP | 6266825 | 9/1994 |
| JP | 06267304 | 9/1994 |
| JP | 06270733 | 9/1994 |
| JP | 06274626 | 9/1994 |
| JP | 06276524 | 9/1994 |
| JP | H06262963 | 9/1994 |
| JP | H06267303 | 9/1994 |
| JP | H06275104 | 9/1994 |
| JP | 06295601 | 10/1994 |
| JP | H06289138 | 10/1994 |
| JP | H06293236 | 10/1994 |
| JP | 05093981 | 11/1994 |
| JP | 06310740 | 11/1994 |
| JP | 06321007 | 11/1994 |
| JP | H06321010 | 11/1994 |
| JP | H06324144 | 11/1994 |
| JP | 06337938 | 12/1994 |
| JP | 06341821 | 12/1994 |
| JP | 07002021 | 1/1995 |
| JP | 07004170 | 1/1995 |
| JP | 07025286 | 1/1995 |
| JP | H072022 A | 1/1995 |
| JP | 732936 | 2/1995 |
| JP | 07032935 | 2/1995 |
| JP | 07047878 | 2/1995 |
| JP | 07052706 | 2/1995 |
| JP | H0737180 | 2/1995 |
| JP | H0740782 | 2/1995 |
| JP | H0746460 | 2/1995 |
| JP | 07069125 | 3/1995 |
| JP | 07078240 | 3/1995 |
| JP | H0764632 | 3/1995 |
| JP | H0771916 | 3/1995 |
| JP | H07057200 | 3/1995 |
| JP | H07078258 | 3/1995 |
| JP | 07105496 | 4/1995 |
| JP | H07101291 | 4/1995 |
| JP | H07105487 | 4/1995 |
| JP | H07108873 | 4/1995 |
| JP | H07108874 | 4/1995 |
| JP | 07125571 | 5/1995 |
| JP | 07137574 | 5/1995 |
| JP | H07125570 | 5/1995 |
| JP | H730149 | 6/1995 |
| JP | H07141588 | 6/1995 |
| JP | H07144577 | 6/1995 |
| JP | 07186818 | 7/1995 |
| JP | 07192192 | 7/1995 |
| JP | 06000927 | 8/1995 |
| JP | 07242147 | 9/1995 |
| JP | H07239714 | 9/1995 |
| JP | H07249128 | 9/1995 |
| JP | H07280563 | 10/1995 |
| JP | H07315122 | 12/1995 |
| JP | H0840138 | 2/1996 |
| JP | H0840140 | 2/1996 |
| JP | H0843082 | 2/1996 |
| JP | H0844999 | 2/1996 |
| JP | H0850697 | 2/1996 |
| JP | H08138036 | 5/1996 |
| JP | 08166221 | 6/1996 |
| JP | 08235484 | 9/1996 |
| JP | H08320997 | 12/1996 |
| JP | 02630604 | 4/1997 |
| JP | H0991596 | 4/1997 |
| JP | 09330415 | 12/1997 |
| JP | 10038562 | 2/1998 |
| JP | 10063985 | 3/1998 |
| JP | H1090188 | 4/1998 |
| JP | 10134183 | 5/1998 |
| JP | 10171966 | 6/1998 |
| JP | H10222792 | 8/1998 |
| JP | 10261189 | 9/1998 |
| JP | 11069211 | 3/1999 |
| JP | 11078737 | 3/1999 |
| JP | H1178693 | 3/1999 |
| JP | H1178717 | 3/1999 |
| JP | H1123305 | 7/1999 |
| JP | 11250228 | 9/1999 |
| JP | H11259634 | 9/1999 |
| JP | 11345392 | 12/1999 |
| JP | 2000016352 | 1/2000 |
| JP | 2000085474 | 3/2000 |
| JP | 2000113374 | 4/2000 |
| JP | 2000127849 | 5/2000 |
| JP | 2000207575 | 7/2000 |
| JP | 2000215299 | 8/2000 |
| JP | 2000305136 | 11/2000 |
| JP | 2000311289 | 11/2000 |
| JP | 2001001832 | 1/2001 |
| JP | 2001092970 | 4/2001 |
| JP | 2001180401 | 7/2001 |
| JP | 2001188988 | 7/2001 |
| JP | 2001297397 | 10/2001 |
| JP | 2001351107 | 12/2001 |
| JP | 2002022439 | 1/2002 |
| JP | 2002046506 | 2/2002 |
| JP | 2002074339 | 3/2002 |
| JP | 2002079895 | 3/2002 |
| JP | 2002084533 | 3/2002 |
| JP | 2002099908 | 4/2002 |
| JP | 2002109699 | 4/2002 |
| JP | 2002175534 | 6/2002 |
| JP | 2002211428 | 7/2002 |
| JP | 2002341432 | 11/2002 |
| JP | 2003030665 | 1/2003 |
| JP | 2003076987 | 3/2003 |
| JP | 2003083742 | 3/2003 |
| JP | 3395289 | 4/2003 |
| JP | 2003123058 | 4/2003 |
| JP | 2003150938 | 5/2003 |
| JP | 2003168197 | 6/2003 |

(56) References Cited

FOREIGN PATENT DOCUMENTS

| JP | 2003178397 | 6/2003 |
|---|---|---|
| JP | 2003217099 | 7/2003 |
| JP | 2003248895 | 9/2003 |
| JP | 2003259361 | 9/2003 |
| JP | 2003281700 | 10/2003 |
| JP | 20041658 | 1/2004 |
| JP | 2004032460 | 1/2004 |
| JP | 2004146904 | 5/2004 |
| JP | 2004336613 | 11/2004 |
| JP | 2004355139 | 12/2004 |
| JP | 2005182158 | 7/2005 |
| KR | 2000883510000 | 3/1995 |
| KR | 1020010018981 | 10/2002 |
| KR | 1004124340000 | 3/2004 |
| SE | 336535 | 7/1971 |
| WO | WO1986005147 | 9/1986 |
| WO | WO1988009023 | 11/1988 |
| WO | WO1990004528 | 5/1990 |
| WO | WO1993000647 | 1/1993 |
| WO | WO1993004556 | 3/1993 |
| WO | WO1993010550 | 5/1993 |
| WO | WO1993011631 | 6/1993 |
| WO | WO1993021596 | 10/1993 |
| WO | WO1994019212 | 9/1994 |
| WO | WO1995018979 | 7/1995 |
| WO | WO1995023082 | 8/1995 |
| WO | WO1996002817 | 2/1996 |
| WO | WO1996015921 | 5/1996 |
| WO | WO1996018275 | 6/1996 |
| WO | WO1996021581 | 7/1996 |
| WO | WO1996034365 | 10/1996 |
| WO | WO1996038319 | 12/1996 |
| WO | WO1997001246 | 1/1997 |
| WO | WO1997029926 | 8/1997 |
| WO | WO1997035743 | 10/1997 |
| WO | WO1997048134 | 12/1997 |
| WO | WO1998010246 | 3/1998 |
| WO | WO1998014974 | 4/1998 |
| WO | WO1999043242 | 2/1999 |
| WO | WO1999023828 | 5/1999 |
| WO | WO1999059100 | 11/1999 |
| WO | WO2000015462 | 3/2000 |
| WO | WO2001026332 | 4/2001 |
| WO | WO2001039018 | 5/2001 |
| WO | WO2001039120 | 5/2001 |
| WO | WO2001064481 | 9/2001 |
| WO | WO2001070538 | 9/2001 |
| WO | WO2001077763 | 10/2001 |
| WO | WO2001080068 | 10/2001 |
| WO | WO2001080353 | 10/2001 |
| WO | WO2002071487 | 9/2002 |
| WO | WO2003065084 | 8/2003 |
| WO | WO2003093857 | 11/2003 |
| WO | WO2004004320 | 1/2004 |
| WO | WO2004005073 | 1/2004 |
| WO | WO2005098751 | 10/2005 |
| WO | WO2005098782 | 10/2005 |
| WO | WO2008134715 | 11/2008 |
| WO | WO2013121357 | 8/2013 |

OTHER PUBLICATIONS

"All-seeing screens for tomorrow's cars", Southend Evening Echo, Oct. 4, 1991.
"CCD vs. CMOS," Teledyne Dalsa Inc., accessed at https://www.teledynedalsa.com/imaging/knowledgecenter/appnotes/ccd-vs-cmos/.
"Final Report of the Working Group on Advanced Vehicle Control Systems (AVCS)" Mobility 2000, Mar. 1990.
"How an Image Intensifier Tube Works," Photonis Group, accessed at http://www.nightvision.nl/faq-reader/how-does-an-image-intensifier-work.html.
"How does an image intensifier work?" accessed at http://www.nightvision.nl/faq-reader/how-does-an-imageintensifier-work.html.
"Image intensified CCD high speed cameras," Stanford Computer Optics, Inc., accessed at http://www.stanfordcomputeroptics.com/technology/iccd-systemoverview.html.
"Magic Eye on safety", Western Daily Press, Oct. 10, 1991.
"On-screen technology aims at safer driving", Kent Evening Post Oct. 4, 1991.
"The Electromagnetic and Visible Spectra," Light Waves and Color—Lesson 2, accessed at http://www.physicsclassroom.com/class/light/Lesson-2/The-Electromagnetic-and-Visible-Spectra.
"Versatile LEDs Drive Machine vision in Automated Manufacture," http://www.digikey.ca/en/articles/techzone/2012/jan/versatileleds-drive-machine-vision-in-automated-manufacture.
"Vision Systems 101: An Introduction," Teledyne DALSA Inc., accessed at https://www.teledynedalsa.com/imaging/products/visionsystems/vs101/.
3M, "Automotive Rear View Mirror Button Repair System", Automotive Engineered Systems Division, Jun. 1996.
Abshire et al., "Confession Session: Learning from Others Mistakes," 2011 IEEE International Symposium on Circuits and Systems (ISCAS), 2011.
Achler et al., "Vehicle Wheel Detector using 2D Filter Banks," IEEE Intelligent Vehicles Symposium of Jun. 2004.
Ackland et al., "Camera on a chip", Digest of Technical Papers of the 42nd Solid-State Circuits Conference (ISSCC), Paper TA 1.2, 1996.
Alley, "Algorithms for automatic guided vehicle navigation and guidance based on Linear Image Array sensor data", Masters or PhD. Thesis, Dec. 31, 1988.
Altan, "LaneTrak: a vision-based automatic vehicle steering system", Applications in Optical Science and Engineering. International Society for Optics and Photonics, 1993, Abstract.
Amidi, "Integrated Mobile Robot Control", M.S. Thesis, Carnegie Mellon University, May 1990.
An et al., "Aspects of Neural Networks in Intelligent Collision Avoidance Systems for Prometheus", JFIT 93, pp. 129-135, Mar. 1993.
Arain et al., "Action planning for the collision avoidance system using neural networks", Intelligent Vehicle Symposium, Tokyo, Japan, Jul. 1993.
Arain et al., "Application of Neural Networks for Traffic Scenario Identification", 4th Prometheus Workshop, University of Compiegne, Paris, France, pp. 102-111, Sep. 1990.
Ashley, "Smart Cars and Automated Highways", Mechanical Engineering 120.5 (1998): 58, Abstract.
Aufrere et al., "A model-driven approach for real-time road recognition", Machine Vision and Applications 13, 2001, pp. 95-107.
Auty et al., "Image acquisition system for traffic monitoring applications" IS&T/SPIE's Symposium on Electronic Imaging: Science & Technology. International Society for Optics and Photonics, Mar. 14, 1995.
Aw et al., "A 128×128 Pixel Standard-CMOS Image Sensor with Electronic Shutter," IEEE Journal of Solid-State Circuits, vol. 31, No. 12, Dec. 1996.
Ballard et al., "Computer Vision", 1982, p. 88-89, sect. 3.4.1.
Barron et al., "The role of electronic controls for future automotive mechatronic systems", IEEE/ASME Transactions on mechatronics 1.1, Mar. 1996, pp. 80-88.
Batavia et al., "Overtaking vehicle detection using implicit optical flow", Proceedings of the IEEE Transportation Systems Conference, Nov. 1997, pp. 729-734.
Batavia, "Driver-Adaptive Lane Departure Warning Systems", The Robotics Institute Carnegie Mellon University Pittsburgh, Pennsylvania, 15213, Sep. 20, 1999.
Bederson, "A miniature Space-Variant Active Vision System: Cortex-I", Masters or Ph.D. Thesis, Jun. 10, 1992.
Begault, "Head-Up Auditory Displays for Traffic Collision Avoidance System Advisories: A Preliminary Investigation", Human Factors, 35(4), Dec. 1993, pp. 707-717.
Behringer et al., "Simultaneous Estimation of Pitch Angle and Lane Width from the Video Image of a Marked Road," pp. 966-973, Sep. 12-16, 1994.
Behringer, "Road recognition from multifocal vision", Intelligent Vehicles' 94 Symposium, Proceedings of the. IEEE, 1994, Abstract.

(56) References Cited

OTHER PUBLICATIONS

Belt et al., "See-Through Turret Visualization Program", No. NATICK/TR-02/005. Honeywell Inc., Minn, MN Sensors and Guidance Products, 2002.
Bensrhair et al., "A cooperative approach to vision-based vehicle detection" Intelligent Transportation Systems, IEEE, 2001.
Bertozzi et al., "Obstacle and lane detection on ARGO", IEEE Transactions on Image Processing, 7(1):62-81, Jan. 1998, pp. 62-81.
Bertozzi et al., "Performance analysis of a low-cost solution to vision-based obstacle detection", Intelligent Transportation Systems, 1999. Proc., Oct. 5-8, 1999, pp. 350-355.
Bertozzi et al., "Vision-based intelligent vehicles: State of the art and perspectives" Robotics and Autonomous Systems, 32, 2000 pp. 1-16.
Bertozzi et al., "GOLD: a parallel real-time stereo vision system for generic obstacle and lane detection", IEEE transactions on image processing 7.1 (1998): 62-81.
Betke et al., "Real-time multiple vehicle detection and tracking from a moving vehicle", Machine Vision and Applications, 2000.
Beucher et al., "Road Segmentation and Obstacle Detection by a Fast Watershed Transformation", Intelligent Vehicles' 94 Symposium, Proceedings of the. IEEE, 1994.
Blomberg et al., "NightRider Thermal Imaging Camera and HUD Development Program for Collision Avoidance Applications", Raytheon Commercial Infrared and ELCAN—Texas Optical Technologies, 2000, Abstract.
Borenstein et al., "Where am I? Sensors and Method for Mobile Robot Positioning", University of Michigan, Apr. 1996, pp. 2, 125-128.
Bosch, "CAN Specification", Version 2.0, Sep. 1991.
Bow, "Pattern Recognition and Image Preprocessing (Signal Processing and Communications)", CRC Press, Jan. 15, 2002, pp. 557-559.
Brackstone et al., "Dynamic Behavioral Data Collection Using an Instrumented Vehicle", Transportation Research Record: Journal of the Transportation Research Board, vol. 1689, Paper 99/2535, 1999.
Brandt, "A CRT Display System for a Concept Vehicle", SAE Paper No. 890283, published Feb. 1, 1989.
Brauckmann et al., "Towards all around automatic visual obstacle sensing for cars", Intelligent Vehicles' 94 Symposium, Proceedings of the. IEEE, 1994.
Britell et al., "Collision avoidance through improved communication between tractor and trailer" Proceedings: International Technical Conference on the Enhanced Safety of Vehicles. vol. 1998. National Highway Traffic Safety Administration, 1998.
Broggi et al., "ARGO and the MilleMiglia in Automatico Tour", IEEE Intelligent Systems, Jan.-Feb. 1999, pp. 55-64.
Broggi et al., "Architectural Issues on Vision-based automatic vehicle guidance: The experience of the ARGO Project", Academic Press, 2000.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 14-17, 2004.
Broggi et al., "Vision-based Road Detection in Automotive Systems: A real-time expectation-driven approach", Journal of Artificial Intelligence Research, 1995.
Broggi, "Robust Real-time Lane and Road Detection in Critical Shadow Conditions", International Symposium on Computer Vision, IEEE, 1995, pp. 21-23.
Brown, "A Survey of Image Registration Techniques", vol. 24, ACM Computing Surveys, pp. 325-376, Dec. 4, 1992.
Brown, "Scene Segmentation and Definition for Autonomous Robotic Navigation Using Structured Light Processing", Doctoral Dissertation, University of Delaware, Army Science Conference Proceedings, Jun. 22-25, 1992, vol. 1, Dec. 31, 1988, pp. 189-203, Abstract.
Brunelli et al., "Template Matching: Matched Spatial Filters and Beyond," Pattern Recognition, vol. 30, No. 5, 1997.

Bucher et al., "Image processing and behavior planning for intelligent vehicles", IEEE Transactions on Industrial electronics 50.1 (2003): 62-75.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Burt et al., "A Multiresolution Spline with Application to Image Mosaics", ACM Transactions on Graphics, vol. 2. No. 4, pp. 217-236, Oct. 1983.
Cardiles, "Implementation de la commande d'un vehicule electrique autonome grace a un capteur de distance et d'angle base sur une camera lineaire" IUP de Mathematiques Appliquees et Industrielles, May 8, 1998.
Carley et al., "Synthesis Tools for Mixed-Signal ICs: Progress on Frontend and Backend Strategies," Proceedings of the 33rd Design Automation Conference, 1996.
Cartledge, "Jaguar gives cat more lives", Birmingham Post, Oct. 10, 1991.
Cassiano et al., "Review of filtering methods in mobile vision from ground vehicles in low light conditions", Proc. SPIE 1613, Mobile Robots VI, 322, Feb. 14, 1992.
Chapuis et al., "Road Detection and Vehicles Tracking by Vision for an On-Board ACC System in the VELAC Vehicle", 2000.
Charkari et al., "A new approach for real time moving vehicle detection", Proceedings of the 1993 IEEE/RSJ International Conference on Intelligent Robots and Systems, Yokohama, JP, Jul. 26-30, 1993.
Chern et al., "The lane recognition and vehicle detection at night for a camera-assisted car on highway", Robotics and Automation, 2003. Proceedings. ICRA'03. IEEE International Conference on. vol. 2. IEEE, 2003, Abstract.
Chien et al., "Efficient moving object segmentation algorithm using background registration technique", IEEE Transactions on Circuits and Systems for Video Technology, vol. 12., No. 7, Jul. 2002.
Clune et al., "Implementation and performance of a complex vision system on a systolic array machine", Carnegie Mellon University, Jun. 15, 1987.
CMOS sensor page of University of Edinburgh, 2015.
Coghill, "Digital Imaging Technology 101", Albert Theuwissen, Dalsa Corp, 2003.
Coifman et al., "A real-time computer vision system for vehicle tracking and traffic surveillance", Transportation Research Part C 6, pp. 271-288, 1998.
Corsi, "Reconfigurable Displays Used as Primary Automotive Instrumentation", SAE Paper No. 890282, published Feb. 1, 1989.
Crisman et al., "Color Vision for Road Following", Robotics Institute at Carnegie Mellon University, Proceedings of SPIE Conference on Mobile Robots Nov. 11, 1988, pp. 1-10, Oct. 12, 1988.
Crisman et al., "UNSCARF, A Color Vision System for the Detection of Unstructured Roads" IEEE Paper 1991.
Crisman et al., "Vision and Navigation—The Carnegie Mellon Navlab" Carnegie Mellon University, edited by Charles E. Thorpe, 1990.
Crisman, "SCARF: Color vision system that tracks roads and intersections", IEEE, 1993.
Crossland, "Beyond Enforcement: In-Car Video Keeps Officers on the Streets", Traffic technology international. Annual review, 1998, Abstract.
Cucchiara et al., "Vehicle Detection under Day and Night Illumination", Proceedings of 3rd International ICSC Symposium on Intelligent Industrial Automation (IIA 99), 1999.
Cucchiara et al., "Detecting moving objects, ghosts, and shadows in video streams", IEEE Transactions on Pattern Analysis and Machine Intelligence, vol. 25, No. 10, 2003.
Cucchiara et al., "Improving Shadow Suppression in Moving Object Detection with HSV Color Information", Proceeding of IEEE International Conference on Intelligent Transportation Systems, 2001.
Curry et al., "The Lancashire telemedicine ambulance", Journal of Telemedicine and telecare 4.4 (1998): 231-238, Dec. 1, 1998, Abstract.
Dagan et al., "Forward collision warning with a single camera", IEEE Intelligent Vehicles Symposium, 2004.

(56) References Cited

OTHER PUBLICATIONS

Dally et al., "Digital Systems Engineering", The University of Cambridge, United Kingdom, 1998.
Davis et al., "Road Boundary Detection for Autonomous Vehicle Navigation", Optical Engineering, vol. 25, No. 3, Mar. 1986, pp. 409-414.
Davis, "Vision-Based Navigation for Autonomous Ground Vehicles" Defense Advanced Research Projects Agency, Jul. 18, 1988.
De la Escalera et al., "Neural traffic sign recognition for autonomous vehicles" IEEE, 1994.
De la Escalera et al., "Traffic sign recognition and analysis for intelligent vehicles", Division of Systems Engineering and Automation, Madrid, Spain, 2003.
Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Pat. No. 5,837,994, issued to Stam et al.
DeFauw, "A System for Small Target Detection, Tracking, and Classification, Intelligent Transportation System", Intelligent Transportation Systems, 1999. Proceedings. 1999 IEEE/IEEJ/JSAI International Conference on. IEEE, 1999, Abstract.
Denes et al., "Assessment of driver vision enhancement technologies," Proceedings of SPIE: Collision Avoidance and Automated Traffic Management Sensors, vol. 2592, Oct. 1995.
DeNuto et al., "LIN Bus and its Potential for use in Distributed Multiplex Applications", SAE Technical Paper 2001-01-0072, Mar. 5-8, 2001.
Denyer et al., "On-Chip CMOS Sensors for VLSI Imaging Systems", Dept. of Elect. Engineering, University of Edinburgh, pp. 4b1.1-4b1.5, 1991.
Dérutin et al., "Real-time collision avoidance at road-crossings on board the Prometheus-ProLab 2 vehicle", Intelligent Vehicles' 94 Symposium, Proceedings of the. IEEE, 1994, Abstract.
Devlin, "The Eyellipse and Considerations in the Driver's Forward Field of View," Society of Automotive Engineers, Inc., Detroit, MI, Jan. 8-12, 1968.
Dickinson et al., "CMOS Digital Camera with Parallel Analog-to-Digital Conversion Architecture", Apr. 1995.
Dickmanns et al., "A Curvature-based Scheme for Improving Road Vehicle Guidance by Computer Vision," University of Bundeswehr München, 1986.
Dickmanns et al., "Recursive 3-D road and relative ego-state recognition," IEEE Transactions on Pattern Analysis and Machine Intelligence, vol. 14, No. 2, Feb. 1992.
Dickmanns et al., "An integrated spatio-temporal approach to automatic visual guidance of autonomous vehicles," IEEE Transactions on Systems, Man, and Cybernetics, vol. 20, No. 6, Nov./Dec. 1990.
Dickmanns, "Vehicles Capable of Dynamic Vision", Aug. 23, 1997.
Dickmanns, "4-D dynamic vision for intelligent motion control", Universitat der Bundeswehr Munich, 1991.
Dickmanns et al., "The seeing passenger car 'VaMoRs-P'", Oct. 24, 1994.
Dingus et al., "TRAVTEK Evaluation Task C3—Camera Car Study" Final Report/ 9-92 to 5-94. Jun. 1995.
Donnelly Panoramic Vision™ on Renault Talisman Concept Car At Frankfort Motor Show, PR Newswire, Frankfort, Germany Sep. 10, 2001.
Doudoumopoulos et al., "CMOS Active Pixel Sensor Technology for High Performance Machine Vision Applications," SME Applied Machine Vision '96—Emerging Smart Vision Sensors, Jun. 1996.
Draves, "A Video Graphics Controller for Reconfigurable Automotive Displays", No. 970193. SAE Technical Paper Feb. 24, 1997, Abstract.
Dubrovin et al., "Application of real-time lighting simulation for intelligent front-lighting studies", 2000 pp. 333-343.
Dubuisson-Jolly, "Vehicle segmentation and classification using deformable templates", IEEE Transactions on Pattern Analysis and Machine Intelligence, Mar. 1996.

Easton, "Jaguar Adapts Pilot's Night Sights for safer driving", The Times, Sep. 28, 1991.
Eaton, "Video Incident Capture System", Technical Memorandum, OIC General Enforcement Branch, Sep. 1991.
Eaton, "An RS-170 Camera for the Military Environment", Proc. SPIE 0979, Airborne Reconnaissance XII, Feb. 23, 1989, Abstract.
Eid et al., "A 256×256 CMOS Active Pixel Image Sensor," Proceedings of SPIE: Charge-Coupled Devices and Solid State Optical Sensors V, vol. 2415, 1995.
Elwell et al., "Near Infrared Spectroscopy," accessed at http://www.ucl.ac.uk/medphys/research/borl/intro/nirs, Jan. 6, 1999.
Ernst et al., "Camera calibration for lane and obstacle detection" Intelligent Transportation Systems, 1999 pp. 356-361.
Fancher et al. "Intelligent Cruise Control Field Operational Test (Final Report)", Final Report, vol. I: Technical Report, May 1998.
Fancher et al., "Fostering Development, Evaluation, and Deployment of Forward Crash Avoidance Systems (FOCAS)" Annual Research Report DOT HS 808 437, May 1995.
Ferryman et al., "Visual Surveillance for Moving Vehicles", SECURE Project, 2000.
Fletcher, "CMOS light-sensor process makes possible low-cost smart machine-vision systems" Penton Media, Inc. et al., 1993.
Forsyth, "A System for Finding Changes in Colour", Oxford University, Jul. 23, 1987.
Fossum, "Active Pixel Sensors: Are CCD's dinosaurs?" Proceedings of SPIE, Charge-Coupled Devices and Solid-State Optical Sensors III, vol. 1900, 1993.
Fossum, "CMOS Active Pixel Sensor (APS) Technology for Multimedia Image Capture," 1997 Multimedia Technology & Applications Conference (MTAC97), 1997.
Fossum, "Low power camera-on-a-chip using CMOS active pixel sensor technology", 1995 Symposium on Low Power Electronics, San Jose, CA, Oct. 9-10, 1995.
Fowler et al., "A CMOS Area Image Sensor With Pixel-Level A/D Conversion," Digest of Technical Papers of the 41st Solid-State Circuits Conference (ISSCC), 2001.
Franke et al., "Autonomous driving approaches downtown", IEEE Intelligent Systems, vol. 13, Nr. 6, 1999.
French et al., "A comparison of IVHS progress in the United States, Europe, and Japan", IVHA America, Dec. 31, 1993.
Fujimori, "CMOS Passive Pixel Imager Design Techniques", Massachusetts Institute of Technology, Ph.D. Dissertation for Electrical Engineering and Computer Science, Feb. 2002.
Fung et al., "Effective moving cast shadow detection for monocular color image sequences", The 11th International Conference on Image Analysis and Processing Proceedings, Palermo, Italy, Sep. 26-28, 2001,p. 404-409.
Gat et al., "A Monocular Vision Advance Warning System for the Automotive Aftermarket", Aftermarket SAE World Congress & Exhibition, No. 2005-01-1470. SAE Technical Paper, Jan. 1, 2005.
Gavrila et al., "Real-Time Vision for Intelligent Vehicles" IEEE Instrumentation & Measurement Magazine, Jun. 2001, pp. 22-27.
Gavrila, et al., "Real-time object detection for "smart" vehicles", 1999.
Geary et al., "Passive Optical Lane Position Monitor" Idea Project Final Report Contract ITS-24, Jan. 15, 1996.
Gehrig, "Design, simulation, and implementation of a vision-based vehicle-following system" Doctoral Dissertation, Jul. 31, 2000.
GEM Muon Review Meeting—SSCL Abstract; GEM TN-03-433, Jun. 30, 1993.
Goesch et al., "The First Head Up Display Introduced by General Motors", SAE Paper No. 890288, published Feb. 1, 1989.
Goldbeck et al., "Lane detection and tracking by video sensors" Intelligent Transportation Systems, 1999. Proc., Oct. 5-8, 1999.
Graefe et al., "Dynamic Vision for Precise Depth Measurement and Robot Control", Computer Vision for Industry, Jun. 1993.
Graefe, "Vision for Intelligent Road Vehicles", Universität de Bundeswehr Müchen, 1993, pp. 135-140.
Greene et al., "Creating Raster Omnimax Images from Multiple Perspective Views Using the Elliptical Weighted Average Filter", IEEE Computer Graphics and Applications, vol. 6, No. 6, pp. 21-27, Jun. 1986.

(56) References Cited

OTHER PUBLICATIONS

Gruss et al., "Integrated sensor and range-finding analog signal processor", IEEE Journal of Solid-State Circuits, vol. 26, No. 3, Mar. 1991.
Gumkowski et al., "Reconfigurable Automotive Display System", SAE Paper No. 930456 to Gumkowski, published Mar. 1, 1993.
Hall, "Why I Dislike auto-Dimming Rearview Mirrors," accessed at http://blog.consumerguide.com/why-i-dislike-autodimming-rear-view-mirrors/, Dec. 21, 2012.
Hamit, "360-Degree Interactivity: New Video and Still Cameras Provide a Global Roaming Viewpoint", Advanced Imaging, Mar. 1997, p. 50.
Haritaoglu et al., "W4: Real-Time Surveillance of People and Their Activities", IEEE Transactions Patter Analysis and Machine Intelligence, vol. 22, No. 8, Aug. 2000.
Hebert et al., "3-D Vision Techniques for Autonomous Vehicles", Defense Advanced Research Projects Agency, Carnegie Mellon University, Feb. 1, 1988.
Hebert et al., "Local Perception for Mobile Robot Navigation in Natural Terrain: Two Approaches", The Robotics Institute, Carnegie Mellon University, Abstract; Workshop on Computer Vision for Space Applications, Antibes, Sep. 22,24, 1993, pp. 24-31.
Hebert, "Intelligent unmanned ground vehicles: autonomous navigation research", Carnegie Mellon (Kluwer Academic Publishers), Boston, 1997, Excerpt.
Herbert et al., "3-D Vision Techniques for Autonomous Vehicles", Technical Report, Carnegie Mellon University, Aug. 1988.
Hess et al., "A Control Theoretic Model of Driver Steering Behavior," IEEE Control Systems Magazine, vol. 10, No. 5, Aug. 1990, pp. 3-8.
Hessburg et al., "An Experimental Study on Lateral Control of a Vehicle," California Partners for Advanced Transit and Highways (PATH), Jan. 1, 1991.
Hillebrand et al., "High speed camera system using a CMOS image sensor", IEEE Intelligent Vehicles Symposium., Oct. 3-5, 1999, pp. 656-661, Abstract.
Ho et al., "Automatic spacecraft docking using computer vision-based guidance and control techniques", Journal of Guidance, Control, and Dynamics, vol. 16, No. 2 Mar.-Apr. 1993.
Hock et al., "Intelligent Navigation for Autonomous Robots Using Dynamic Vision", XVIIth ISPRS Congress, pp. 900-915, Aug. 14, 1992.
Hoist, "CCD Arrays, Cameras, and Displays", Second Edition, Bellingham, WA: SPIE Optical Engineering Press, 1998; pp. v-xxiii, 7-12, 45-101, and 176-179, excerpts.
Honda Worldwide, "Honda Announces a Full Model Change for the Inspire." Jun. 18, 2003.
Horprasert et al., "A Statistical Approach for Real-Time Robust Background Subtraction and Shadow Detection", Proceeding of IEEE International Conference on Computer vision Frame-Rate Workshop, 1999.
Hsieh et al., "Shadow elimination for effective moving object detection by Gaussian shadow modeling", Image and Vision Computing, vol. 21, No. 6, 505-516, 2003.
Hsieh et al., "A shadow elimination method for vehicle analysis", Proceeding of IEEE International Conference on Pattern Recognition, vol. 4, 2004.
Hu et al., "Action-based Road Horizontal Shape Recognition", SBA Controle & Automacao, vol. 10, No. 2, May 1999.
Huertgen et al., "Vehicle Environment Sensing by Video Sensors", No. 1999-01-0932. SAE Technical Paper, 1999, Abstract.
Huijsing, "Integrated smart sensors", Sensors and Actuators A, vol. 30, Issues 1-2, pp. 167-174, Jan. 1992.
Hutber et al., "Multi-sensor multi-target tracking strategies for events that become invisible" BMVC '95 Proc. of the 6th British conference on Machine vision, V2, 1995, pp. 463-472.
IEEE 100—The Authoritative Dictionary of IEEE Standards Terms, $7^{th}$ Ed. (2000).

Ientilucci, "Synthetic Simulation and Modeling of Image Intensified CCDs (IICCD)", Master Thesis for Rochester Inst. of Tech., Mar. 31, 2000.
Ishida et al., "Development of a Driver Assistance System", No. 2003-01-0279. SAE Technical Paper, 2002, Abstract.
Ishihara et al., "Interline CCD Image Sensor with an Anti Blooming Structure," IEEE International Solid-State Circuits Conference, Session XIII: Optoelectronic Circuits, THPM 13.6, Feb. 11, 1982.
Ishikawa et al., "Visual Navigation of an Autonomous Vehicle Using White Line Recognition", IEEE Transactions on Pattern Analysis and Machine Intelligence, 1988, Abst.
Jaguar Press Releases Autumn 1991 "Jaguar Displays 21st Century Car Technologies", Jaguar Communications & Public Affairs Dept.
Janssen et al., "Hybrid Approach for Traffic Sign Recognition", Program for a European Traffic with Highest Efficiency and Unprecendented Safety, Nov. 28, 1993.
Japanese Article "Television Image Engineering Handbook, The Institute of Television Engineers of Japan", Jan. 17, 1981.
Jochem et al., "PANS: a portable navigation platform", 1995 IEEE Symposium on Intelligent Vehicles, Detroit, MI, Sep. 25-26, 1995.
Jochem et al., "Life in the Fast Lane", AI Magazine, vol. 17, No. 2, pp. 11-50, Summer 1996.
Johannes, "A New Microchip Ushers in Cheaper Digital Cameras", The Wall Street Journal, Aug. 21, 1998, p. B1.
Johnson, "Georgia State Patrol's In-Car Video System", Council of State Governments, 1992, Abstract.
Juberts et al., "Development and Test Results for a Vision-Based Approach to AVCS." in Proceedings of the 26th International Symposium on Automotive Technology and Automation, Aachen, Germany, Sep. 1993, pp. 1-9.
Kakinami et al., "Autonomous Vehicle Control System Using an Image Processing Sensor", No. 950470. SAE Technical Paper, Feb. 1, 1995, Abstract.
Kan et al., "Model-based vehicle tracking from image sequences with an application to road surveillance," Purdue University, XP000630885, vol. 35, No. 6, Jun. 1996.
Kang et al., "High Dynamic Range Video", ACM Transactions on Graphics, vol. 22, No. 3, 2003.
Kassel, "Lunokhod-1 Soviet Lunar Surface Vehicle", Advanced Research Projects Agency, ARPA Order No. 189-1, Dec. 9, 1971.
Kastrinaki et al., "A survey of video processing techniques for traffic applications", Image and Computing 21, 2003.
Kehtarnavaz et al., "Traffic sign recognition in noisy outdoor scenes", 1995.
Kehtarnavaz, "Visual control of an autonomous vehicle (BART)—the vehicle-following problem", IEEE Transactions on Vehicular Technology, Aug. 31, 1991, Abstract.
Kemeny et al., "Multiresolution Image Sensor," IEEE Transactions on Circuits and Systems for Video Technology, vol. 7, No. 4, Aug. 1997.
Kenue et al., "LaneLok: Robust Line and Curve Fitting of Lane Boundaries", Applications in Optical Science and Engineering, International Society for Optics and Photonics, 1993, Abstract.
Kenue, "Lanelok: Detection of Lane Boundaries and Vehicle Tracking Using Image-Processing Techniques," SPIE Conference on Mobile Robots IV, 1989.
Kidd et al., "Speed Over Ground Measurement", SAE Technical Paper Series, No. 910272, pp. 29-36, Feb.-Mar. 1991.
Kiencke et al., "Automotive Serial controller Area Network," SAE Technical Paper 860391, 1986, retrieved from http://papers.sae.org/860391/, accessed Mar. 20, 2015.
Klassen et al., "Sensor Development for Agricultural Vehicle Guidance", No. 932427. SAE Technical Paper, 1993, Abstract.
Kluge et al., "Representation and Recovery of Road Geometry in YARF," Carnegie Mellon University, Proceedings of the IEEE, pp. 114-119, 1992.
Knipling, "IVHS Technologies Applied to Collision Avoidance: Perspectives on Six Target Crash Types and Countermeasures," Technical Paper presented at Safety & Human Factors session of 1993 IVHS America Annual Meeting, Apr. 14-17, 1993, pp. 1-22.
Knipling et al., "Vehicle-Based Drowsy Driver Detection: Current Status and Future Prospects," IVHS America Fourth Annual Meeting, Atlanta, GA, Apr. 17-20, 1994, pp. 1-24.

(56) References Cited

OTHER PUBLICATIONS

Koller et al., "Binocular Stereopsis and Lane Marker Flow for Vehicle Navigation: Lateral and Longitudinal Control," University of California, Mar. 24, 1994.
Kowalick, "Proactive use of highway recorded data via an event data recorder (EDR) to achieve nationwide seat belt usage in the 90th percentile by 2002" "Seat belt event data recorder (SB-EDR)"Transportation Recording: 2000 and Beyond., May 3-5, 1999, pp. 173-198, 369.
Kozlowski et al., "Comparison of Passive and Active Pixel Schemes for CMOS Visible Imagers," Proceedings of SPIE Conference on Infrared Readout Electronics IV, vol. 3360, Apr. 1998.
Krotkov, "An agile stereo camera system for flexible image acquisition", IEEE Journal on Robotics and Automation, Feb. 18, 1988.
Kuan et al., "Autonomous Robotic Vehicle Road Following", IEEE Transactions on Pattern Analysis and Machine Intelligence, vol. 10, No. 5, Sep. 1988, pp. 648-658, Abstract.
Kuehnle, "Symmetry-based recognition of vehicle rears", Pattern Recognition Letters 12, North-Holland, 1991.
Kuhnert, "A vision system for real time road and object recognition for vehicle guidance," in Proc. SPIE Mobile Robot Conf., Cambridge, MA, Oct. 1986, pp. 267-272.
Kweon et al., "Behavior-Based Intelligent Robot in Dynamic Indoor Environments", Proceedings of the 1992 IEEE/RSJ International Conference on Intelligent Robots and Systems, Jul. 7-10, 1992.
Lasky et al., "Automated Highway Systems (AHS) Classification by Vehicle and Infrastructure", AHMT Research Report, Jan. 25, 1994.
Leachtenauer, "Resolution requirements and the Johnson criteria revisited," Proceedings of SPIE, Infrared Imaging Systems: Design, Analysis, Modeling and Testing XIV, vol. 5076, 2003.
LeBlanc et al., "CAPC: A Road-Departure Prevention System", IEEE, Dec. 1996, pp. 61-71.
Lee et al., "Automatic recognition of a car license plate using color image processing", IEEE, Nov. 16, 1994.
Lee, "How to Select a Heat Sink", Electronics Cooling Magazine, Jun. 1, 1995.
Leen et al., "Digital networks in the automotive vehicle", Dec. 1999.
Lezin, "Video Gear in Police Cruisers Gets Mixed Reviews Critics Say It Violates Privacy Rights and Inhibits Officers From Doing Their Jobs Well", Mar. 17, 1997.
Linkwitz, "High Precision Navigation: Integration of Navigational and Geodetic Methods," Springer-Verlag, Jul. 5, 1989, Excerpt.
Lisowski et al., "Specification of a small electric vehicle: modular and distributed approach," IEEE 1997, pp. 919-924.
Litkouhi et al., "Estimator and Controller Design for LaneTrak, a Vision-Based Automatic Vehicle Steering System," Proceedings of the 32nd Conference on Decision and Control, San Antonio, Texas, Dec. 1993, pp. 1868-1873.
Litwiller, "CCD vs. CMOS: Facts and Fiction," Photonics Spectra, Jan. 2001.
Liu Xianghong, "Development of a vision-based object detection and recognition system for intelligent vehicle", 2000.
Lockwood, "Design of an obstacle avoidance system for automated guided vehicles", Doctoral thesis, University of Huddersfield, Oct. 1991.
Lowenau et al., "Adaptive light control a new light concept controlled by vehicle dynamics and navigation", SAE Technical Paper Series, Feb. 23-26, 1998.
Lu et al., "On-chip Automatic Exposure Control Technique, Solid-State Circuits Conference", ESSCIRC '91. Proceedings—17th European (vol. 1) Abst. Sep. 11-13, 1991.
Lucas Demonstrates Intelligent Cruise Control, Detroit Feb. 27, 1995 available at http://www.thefreelibrary.com/LUCAS+DEMONSTRATES+INTELLIGENT+CUISE+CONTROL=a016602459.
Luebbers et al., "Video-image-based neural network guidance system with adaptive view-angles for autonomous vehicles", Applications of Artificial Neural Networks II. International Society for Optics and Photonics, 1991, Abstract.
Lumia, "Mobile system for measuring retroreflectance of traffic signs", Optics, Illumination, and Image Sensing for Machine Vision, Mar. 1, 1991, Abstract.
Mackey et al., "Digital Eye-Witness Systems", Transportation Recording: 2000 and Beyond, May 3-5, 1999, 271-284.
Malik et al., "A Machine Vision Based System for Guiding Lane-change Maneuvers", California Path Program, Institute of Transportation Studies, University of California, Berkeley, Sep. 1995.
Manigel et al., "Computer control of an autonomous road vehicle by computer vision" Industrial Electronics, Control and Instrumentation, Proceedings. IECON '91, 1991 International Conference on, p. 19-24 vol. 1, 1991.
Manigel et al., "Vehicle control by computer vision," Industrial Electronics, IEEE Transactions on, vol. 39, Issue 3, 181-188, Jun 1992.
Martel-Brisson et al., "Moving cast shadow detection from a Gaussian mixture shadow model", Proceeding of IEEE Computer Society Conference on Computer Vision and Pattern Recognition, vol. 2, 2005.
Masaki, "Vision-based vehicle guidance", Industrial Electronics, Control, Instrumentation, and Automation, 1992. Power Electronics and Motion Control, Proceedings of the 1992 International Conference on. IEEE, 1992.
Mason et al., "The Golem Group I UCLA Autonomous Ground Vehicle in the DARPA Grand Challenge", Jun. 12, 2006.
Matthews, "Visual Collision Avoidance," Oct. 1994, University of Southampton, PhD submission.
Maurer et al., "VaMoRs-P: an advanced platform for visual autonomous road vehicle guidance", 1995.
Maurer, "Flexible Automatisierung von StraBenfahrzeugen mit Rechnersehen" Universitat der Buneswehr Milnchen Dissertation, Jul. 27, 2000.
MC68331 User's Manual, "Freescale Semiconductor", Inc., 1994.
McKenna et al., "Tracking Groups of People", Computer Vision and Image Understanding, vol. 80, p. 42-56, 2000.
McTamaney, "Mobile Robots Real-Time Intelligent Control", FMC Corporation, Winter 1987.
Mei Chen et al., "AURORA: A Vision-Based Roadway Departure Warning System, The Robotics Institute", Carnegie Mellon University, published, Aug. 5-9, 1995.
Mendis et al., "A 128×128 CMOS active pixel image sensor for highly integrated imaging systems", Dec. 8, 1993.
Mendis et al., "CMOS Active Pixel Image Sensor," IEEE Transactions on Electron Devices, vol. 41, No. 3, Mar. 1994.
Metzler, "Computer Vision Applied to Vehicle Operation", Paper from Society of Automotive Engineers, Inc., 1988.
Mikic et al., "Moving shadow and object detection in traffic scenes", Proceeding of IEEE International Conference on Pattern Recognition, vol. 1, 2000.
Miller, "Evaluation of vision systems for teleoperated land vehicles," IEEE Control Systems Magazine, Jun. 28, 1988.
Mimuro et al., "Functions and Devices of Mitsubishi Active Safety ASV" Proceedings of the 1996 IEEE Intelligent Vehicles Symposium, Sep. 19-20, 1996, Abstract.
Mironer et al., "Examination of Single Vehicle Roadway Departure Crashes and Potential IVHS Countermeasures," U.S. Department of Transportation, Aug. 1994.
Miura et al., "Towards Vision-Based Intelligent Navigator: Its Concept and Prototype", IEEE Transactions on Intelligent Transportation Systems, Jun. 2002.
Miura et al., "Towards intelligent navigator that can provide timely advice on safe and efficient driving" Intelligent Transportation Systems Proceedings, Oct. 5-8, 1999, pp. 981-986.
Mobileye N.V. Introduces EyeQ™ Vision System-On-A-Chip High Performance, Low Cost Breakthrough for Driver Assistance Systems, Detroit, Michigan, Mar. 8, 2004.
Moini, "Vision Chips or Seeing Silicon," Third Revision, Mar. 1997.
Moravec, "Obstacle Avoidance and Navigation in the Real World by a Seeing Robot Rover", Computer Science Department, Stanford University, Ph.D. Thesis, Sep. 1980.
Morgan et al., "Road edge tracking for robot road following: a real-time implementation," vol. 8, No. 3, Aug. 1990.

(56) References Cited

OTHER PUBLICATIONS

Mori et al., "Shadow and Rhythm as Sign patterns of Obstacle Detection", Industrial Electronics, 1993. Conference Proceedings, ISIE'93-Budapest, IEEE International Symposium on. IEEE, 1993, Abstract.
Morris, "E-Z-Pass and transmit using electronic toll tags for traffic monitoring" National Traffic Data Acquisition Conference, PDF pp. 54-63, 1996, 289-298, Abstract.
Motorola Installation Guide, MVE162, Embedded Controller.
Muirhead, "Developments in CMOS Camera Technology," The Institution of Electrical Engineers, Dec. 5, 1994.
Nadimi et al., "Physical models for moving shadow and object detection in video", IEEE Transactions on Pattern Analysis and Machine Intelligence, vol. 26, No. 8, Aug. 2004.
Najm, "Comparison of alternative crash-avoidance sensor technologies", Jan. 6, 1995, Abstract.
Nashman et al., "Real-time Visual Processing for Autonomous Driving," in Proceedings of the IEEE Intelligent Vehicles, vol. 93, Jun. 1993, pp. 14-16.
Nathan, "Digital Video Data Handling," NASA JPL Tech Report 32-877, Pasadena, CA, Jan. 5, 1966.
National Museum of Scotland archives regarding VVL's imputer photos.
Navon, "SoC IP Qualification & Emulation Environment", Dec. 8-9, 2004.
Nguyen et al., "Obstacle detection using bi-spectrum CCD camera and image processing", Proceedings of the Intelligent Vehicles '92 Symposium, Jun. 29-Jul. 1, 1992, p. 42-50.
Nixon et al., "128×128 CMOS Photodiode-Type Active Pixel Sensor With On-Chip Timing, Control and Signal Chain Electronics" 1995.
Nixon et al., "256×256 CMOS Active Pixel Sensor Camera-on-a-Chip," IEEE Journal of Solid-State Circuits, vol. 31, No. 12, Paper FA 11.1, 1996.
No Hands Across America Journal, web page at http://www.cs.cmu.edu/~tjochem/nhaa/Journal.html.
No Hands Across American Official Press Release web page at http://www.cs.cmu.edu/~tjochem/nhaa/official_press_release.html.
Nolan, "Survey of Electronic Displays", SAE Paper No. 750364, published Feb. 1, 1975.
Oldenburg, "Comments on the Autronic Eye", 2002.
Ortega et al., "An Interactive, Reconfigurable Display System for Automotive Instrumentation", SAE Paper No. 860173, published Mar. 1, 1986.
Otsuka, "Flat Dot Matrix Display Module for Vehicle Instrumentation", SAE Paper No. 871288, published Nov. 8, 1987.
Pacaud et al., "Ground Speed Sensing," Lucas International Symposium, Paris, France 1989.
Paetzold, "Interpretation of visually sensed urban environment for a self-driving car" Ruhr-Universitat Bochum, Dissertation, Sep. 2000.
Page et al., "Advanced technologies for collision avoidance," Eureka on Campus (Summer 1992).
Paradiso et al., "Wide-Range Precision Alignment for the Gem Muon System," Oct. 1993.
Paradiso, "Application of miniature cameras in video straightness monitor systems", Draper Laboratory, Jun. 1994.
Paradiso, "Electronics for precision alignment of the Gem Muon System", Proceedings of the 1994 LeCroy Electronics for Future Colliders Conference, May 1994.
Parent, "Automatic Driving for Small Public Urban Vehicles," Intelligent Vehicles Symposium, Tokyo, Jul. 14-16, 1993.
Parker (ed.), McGraw-Hill Dictionary of Scientific and Technical Terms Fifth Edition. (1993).
Parnell, "Reconfigurable Vehicle". No. 2002-01-0144. SAE Technical Paper, 2002. Xilinx WPI 53, Nov. 19, 2001.
Pelco Fixed Focal Length Lenses Product Specification, Apr. 1996.
Peng et al., "Experimental Automatic Lateral Control System for an Automobile," California Partners for Advanced Transit and Highways (PATH), Jan. 1, 1992.

Peng, "Vehicle Lateral Control for Highway Automation," Ph.D. Thesis—University of California Berkeley, 1992.
Philips Components, PCA82C200, Stand-alone CAN-controller, Jan. 22, 1991.
Philomin et al., "Pedestrain Tracking from a Moving Vehicle", Proceedings of the IEEE, Intelligent Vehicles Symposium, IV, 2000.
Photographs evidencing a Watec WAT-660D camera and photographs evidencing the mounting bracket used for attaching the WatecWAT-660D, the model of camera which was used as the forward facing camera on Navlab 6.
Piccioli et al., "Robust road sign detection and recognition from image sequences", 1994.
Pollard, "Evaluation of the Vehicle Radar Safety Systems' Rashid Radar Safety Brake Collision Warning System", U.S. Dept. of Transportation, National Highway Traffic Safety Administration, Feb. 29, 1988.
Pomerleau, "Alvinn: An Autonomous Land Vehicle in a Neural Network", Technical Report AIP-77 Department of Psychology, Carnegie Mellon University, Mar. 13, 1990.
Pomerleau, "RALPH: Rapidly Adapting Lateral Position Handler", The Robotics Institute, Carnegie Mellon University, Pittsburgh, PA, pp. 506-511., 1995.
Pomerleau et al., "Run-Off-Road Collision Avoidance Countermeasures Using IVHS Countermeasures TASK 3-vol. 1", U.S. Dept. of Transportation, National Highway Traffic Safety Administration, Final Report, Aug. 23, 1995.
Pomerleau et al., "Rapidly Adapting Machine Vision for Automated Vehicle Steering", pp. 19-27, Apr. 30, 1996.
Pomerleau, "Run-Off-Road Collision Avoidance Using Ivhs Countermeasures", Robotics Institute, Task 6 Interim Report, Sep. 10, 1996.
Porter et al., "Compositing Digital Images," Computer Graphics (Proc. Siggraph), vol. 18, No. 3, pp. 253-259, Jul. 1984.
Prasad, "Performance of Selected Event Data Recorders", National Highway Traffic Safety Administration. Washington, DC, Sep. 2001.
Prati et al., "Detecting moving shadows: algorithms and evaluation", IEEE Transactions on Pattern Analysis and Machine Intelligence, vol. 25, Jul. 1, 2003.
Pratt, "Digital Image Processing, Passage—ED.3", John Wiley & Sons, US, Jan. 1, 2001, pp. 657-659, XP002529771.
Priese et al., "New Results on Traffic Sign Recognition", IEEE Proceedings of the Intelligent Vehicles 1994 Symposium.
Priese et al., "Traffic Sign Recognition Based on Color Image", Universität Koblenz-Landau, 1993, pp. 95-100.
Proceedings of the 1992 International Conference on Industrial Electronics, Control, Instrumentation, and Automation, 1992. Power Electronics and Motion Control, Date of Conference Nov. 9-13, 1992.
Proceedings of the Intelligent Vehicles Symposium, 1992-present.
Proceedings of the Intelligent Vehicles Symposium, Tokyo, Jul. 14-16, 1993.
Pynn et al., "Automatic identification of cracks in road surfaces" 7th International Conference on Image Processing and its Application, CP465, Jan. 1999, pp. 671-675, Abstract.
Raboisson et al., "Obstacle Detection in Highway Environment by Colour CCD Camera and Image Processing Prototype Installed in a Vehicle", Proceedings of the IEEE Intelligent Symposium 1994.
Radatz, "The IEEE Standard Dictionary of Electrical and Electronics Terms," Sixth Edition, Standards Coordinating Committee 10, Terms and Definitions, 1996.
Raglan Tribe Video-1994; 1994; Raglan Tribe; "Robot Car Raglan Tribe" http://www.youtube.com/watch?v=AILZhcnpXYI.
Ramesh et al., "Real-Time Video Surveillance and Monitoring for Automotive Applications", SAE Technical Paper 2000-01-0347, Mar. 6, 2000, Abstract.
Ran et al., "Development of Vision-based Vehicle Detection and Recognition System for Intelligent Vehicles", Department of Civil and Environmental Engineering, University of Wisconsin at Madison, 1999 TRB Annual Meeting, Nov. 16, 1998.
Raphael et al., "Development of a Camera-Based Forward Collision Alert System", SAE International, Apr. 12, 2011.

(56) References Cited

OTHER PUBLICATIONS

Rayner et al., "I-Witness Black Box Recorder" Intelligent Transportation Systems Program, Final Report for ITS-IDEA Project 84, Nov. 2001.
Redmill, "The OSU Autonomous Vehicle", 1997.
Regensburger et al., "Visual Recognition of Obstacles on Roads", Intelligent Robots and Systems, Elsevier, 1994.
Reichardt, "Kontinuierliche Verhaltenssteuerung eines autonomen Fahrzeugs in dynamischer Umgebung" Universitat Kaisserslautern Dissertation, Transation: Continuous behavior control of an autonomous vehicle in a dynamic environment, Jan. 1996.
Reid, "Vision-based guidance of an agriculture tractor", IEEE Control Systems Magazine, Apr. 30, 1987, Abstract.
Reisman et al., "Crowd Detection in Video Sequences", IEEE, Intelligent Vehicles Symposium, Jan. 1, 2004.
Reexamination Control No. 90/007,519, dated Jun. 9, 2005, Reexamination of U.S. Pat. No. 6,222,447, issued to Schofield et al.
Reexamination Control No. 90/011,478, dated Mar. 28, 2011, Reexamination of U.S. Pat. No. 6,222,447, issued to Schofield et al.
Reexamination Control No. 90/007,520, dated Jun. 9, 2005, Reexamination of U.S. Pat. No. 5,949,331, issued to Schofield et al.
Reexamination Control No. 90/011,477, dated Mar. 14, 2011, Reexamination of U.S. Pat. No. 5,949,331, issued to Schofield et al.
Ritter et al., "Traffic sign recognition using colour information", Math, Computing, Modelling, vol. 22, No. 4-7, pp. 149-161, Oct. 1995.
Ritter, "Traffic Sign Recognition in Color Image Sequences", Institute for Information Technology, 1992, pp. 12-17.
Roberts, "Attentive Visual Tracking and Trajectory Estimation for Dynamic Scene Segmentation", University of Southampton, PhD submission, Dec. 1994.
Rombaut et al., "Dynamic data temporal multisensory fusion in the Prometheus ProLab2 demonstrator", IEEE Paper, 1994.
Ross, "A Practical Stereo Vision System", The Robotics Institute, Carnegie Mellon University, Aug. 25, 1993.
Rowell, "Applying Map Databases to Advanced Navigation and Driver Assistance Systems", The Journal of Navigation 54.03 (2001): 355-363.
Sahli et al., "A Kalman Filter-Based Update Scheme for Road Following," IAPR Workshop on Machine Vision Applications, pp. 5-9, Nov. 12-14, 1996.
Salvador et al., "Cast shadow segmentation using invariant color features", Computer Vision and Image Understanding, vol. 95, 2004.
Sanders, "Speed Racers: Study to monitor driver behavior to determine the role of speed in crashes", Georgia Research Tech News, Aug. 2002.
Sayer et al., "The Effect of Lead-Vehicle Size on Driver Following Behavior", University of Michigan Transportation Research Institute, 2000-15, Jun. 2000.
Schneiderman et al., "Visual Processing for Autonomous Driving," IEEE Workshop on Applications of Computer Vision, Palm Springs, CA, Nov. 30-Dec. 2, 1992.
Schönfeld et al., Compact Hardware Realization for Hough Based Extraction of Line Segments in Image Sequences for Vehicle Guidance, IEEE Paper, 1993, Abstract.
Schumann et al., "An Exploratory Simulator Study on the Use of Active Control Devices in Car Driving," No. IZF-1992-B-2. Institute for Perception RVO-TNO Soesterber (Netherlands), May 1992.
Schwarzinger et al., "Vision-based car-following: detection, tracking, and identification", Jul. 1, 1992.
Scott, "Video Image on a Chip", Popular Science, vol. 237, No. 3, Sep. 1991, pp. 50.
Seelen et al., "Image Processing for Driver Assistance", 1998.
Seger et al., "Vision Assistance in Scenes with Extreme Contrast," IEEE Micro, vol. 13, No. 1, Feb. 1993.
Shafer, "Automation and Calibration for Robot Vision Systems", National Science Foundation, Carnegie Mellon University Research Showcase, May 12, 1988.
Shashua et al., "Two-body Segmentation from Two Perspective Views", IEEE Conference on Computer Vision and Pattern Recognition (CVPR), Hawaii, pp. 263-270, Dec. 2001, Abstract.
Shashua et al., "Direct Estimation of Motion and Extended Scene Structure from a Moving Stereo Rig", IEEE Conference on Computer Vision and Pattern Recognition (CVPR), Jun. 1998, pp. 211-218.
Shashua et al., "Illumination and View Position in 3D Visual Recognition", Advances in Neural Information Processing Systems, Morgan Kauffman Publishers, CA 1992 (Proc. Of NIPS '91), pp. 404-411.
Shashua et al., "Image-Based View Synthesis by Combining Trilinear Tensors and Learning Techniques", ACM Conference on Virtual Reality and Systems (VRST), Sep. 1997, pp. 140-145.
Shashua et al., "Novel View Synthesis by Cascading Trilinear Tensors", IEEE Transactions on Visualization and Computer Graphics. vol. 4, No. 4, Oct.-Dec. 1998.
Shashua et al., "On Degeneracy of Linear Reconstruction from Three Views: Linear Line Complex and Applications", IEEE Transactions on Pattern Analysis and Machine Intelligence (PAMI), vol. 21 (3), 1999, pp. 244-251.
Shashua et al., "3D Reconstruction from Tangent-of-Sight", European Conference on Computer Vision (ECCV), Jun. 2000, Dublin, Ireland, pp. 220-234.
Shashua et al., "A Geometric Invariant for Visual Recognition and 3D Reconstruction From Two Perspective/Orthographic Views", Proceedings of the IEEE 2nd Qualitative Vision Workshop, Jun. 1993, New York, NY, pp. 107-117.
Shashua et al., "A Parallel Decomposition Solver for SVM: Distributed Dual Ascend using Fenchel Duality", Conf. on Computer Vision and Pattern Recognition (CVPR), Jun. 2008, Anchorage, Alaska.
Shashua et al., "A Unifying Approach to Hard and Probabilistic Clustering", International Conference on Computer Vision (ICCV), Beijing, China, Oct. 2005.
Shashua et al., "Affine 3-D Reconstruction from Two Projective Images of Independently Translating Planes", International Conference on Computer Vision (ICCV), Jul. 2001, Vancouver, Canada, pp. 238-244.
Shashua et al., "Algebraic Functions for Recognition", IEEE Transactions on Pattern Analysis and Machine Intelligence (PAMI) vol. 17(8), Jan. 1994 pp. 779-789.
Shashua et al., "Ambiguity from Reconstruction From Images of Six Points", International Conference on Computer Vision (ICCV), Jan. 1998, Bombay India, pp. 703-708.
Shashua et al., "Convergent Message-Passing Algorithms for reference over General Graphs with Convex Free Energies", Conf. on Uncertainty in AI (UAI), Helsinki, Jul. 2008.
Shashua et al., "Doubly Stochastic Normalization for Spectral Clustering", Advances in Neural Information Processing Systems (NIPS), Vancouver, Canada, Dec. 2006.
Shashua et al., "Duality of multi-point and multi-frame geometry: Fundamental shape matrices and tensors", European Conference on Computer Vision (ECCV), Apr. 1996, Cambridge United Kingdom, pp. 217-227.
Shashua et al., "Dynamic $P^n$ to $P^n$ Alignment", In Handbook of Computational Geometry for Pattern Recognition, Computer Vision. Neuro computing and Robotics. Eduardo Bayro-Corrochano (eds.), Springer-Verlag, 2004.
Shashua et al., "Feature Selection for Unsupervised and Supervised Inference: the Emergence of Sparsity in a Weight-based Approach", Journal of Machine Learning Research (JMLR), 6(11):1885-1887, 2005, pp. 1885-1887.
Shashua et al., "Grouping Contours by Iterated Pairing Network", Advances in Neural Information Processing Systems 3, (Proc. of NIPS '90), Morgan Kaufmann Publishers, CA, 1991, pp. 335-341.
Shashua et al., "Nomography Tensors: On Algebraic Entities That Represent Three Views of Static or Moving Planar Points", European Conference on Computer Vision (ECCV), Jun. 2000, Dublin, Ireland, pp. 163-177.
Shashua et al., "Join Tensors: on 3D-to-3D Alignment of Dynamic Sets", International Conference on Pattern Recognition (ICPR), Jan. 2000, Barcelona, Spain, pp. 99-102.

(56) References Cited

OTHER PUBLICATIONS

Shashua et al., "Kernel Feature Selection with Side Data using a Spectral Approach", Proc. of the European Conference on Computer Vision (ECCV), May 2004, Prague, Czech Republic.

Shashua et al., "Kernel Principal Angles for Classification Machines with Applications to Image Sequence Interpretation", IEEE Conference on Computer Vision and Pattern Recognition (CVPR), Jun. 2003, Madison.

Shashua et al., "Latent Model Clustering and Applications to Visual Recognition", International Conference on Computer Vision (ICCV), Rio, Brazil, Oct. 2007.

Shashua et al., "Learning over Sets using Kernel Principal Angles", Journal of Machine Learning Research, 2003, pp. 913-931.

Shashua et al., "Linear Image Coding for Regression and Classification using the Tensor-rank Principle", IEEE Conference on Computer Vision and Pattern Recognition (CVPR), Dec. 2001, Hawaii, pp. 42-49, Abstract.

Shashua et al., "Manifold Pursuit: A New Approach to Appearance Based Recognition", International Conference on Pattern Recognition (ICPR), Aug. 2002, Quebec, Canada.

Shashua et al., "Multi-frame Infinitesimal Motion Model for the Reconstruction of (Dynamic) Scenes with Multiple Linearly Moving Objects", International Conference on Computer Vision (ICCV), Jul. 2001,, Vancouver, Canada, pp. 592-599.

Shashua et al., "Multiple View Geometry of Non-planar Algebraic Curves", International Conference on Computer Vision (ICCV), Vancouver, Canada, Jul. 2001, pp. 181-186.

Shashua et al., "Structural Saliency: the Detection of Globally Salient Structures Using a Locally Connected Network", International Conference on Computer Vision (ICCV), Tarpon Springs, Florida, pp. 321-327, Jul. 1988.

Shashua et al., "The Study of 3D-from-2D using Elimination", International Conference on Computer Vision (ICCV), Jun. 1995, Boston, MA, pp. 473-479.

Shashua et al., "Multiple-view Geometry and Photometry, In Recent Progress in Computer Vision", Springer-Verlag, LNCS series, Invited papers of ACCV'95, Singapore Dec. 1995, 225-240, Abstract.

Shashua et al., "Multiple-view geometry of general algebraic curves", International Journal of Computer Vision (IJCV), 2004.

Shashua et al., "Multi-way Clustering Using Super-symmetric Non-negative Tensor Factorization", Proc. of the European Conference on Computer Vision (ECCV), Graz, Austria, May 2006.

Shashua et al., "Nonnegative Sparse PCA", Advances in Neural Information Processing Systems (NIPS), Vancouver, Canada, Dec. 2006.

Shashua et al., "Non-Negative Tensor Factorization with Applications to Statistics and Computer Vision", International Conference on Machine Learning (ICML), Bonn, Germany, Aug. 2005.

Shashua et al., "Norm-Product Belief Propagation: Primal-Dual Message-Passing for Approximate Inference", IEEE Trans. on Information Theory, Jun. 28, 2010.

Shashua et al., "Novel View Synthesis in Tensor Space", IEEE Conference on Computer Vision and Pattern Recognition (CVPR), Jun. 1997, pp. 1034-1040.

Shashua et al., "Off-road Path Following using Region Classification and Geometric Projection Constraints", IEEE Conference on Computer Vision and Pattern Recognition (CVPR), Jun. 2006, NY.

Shashua et al., "Omni-Rig Sensors: What Can be Done With a Non-Rigid Vision Platform?", Workshop on Applications of Computer Vision (W ACV), pp. 174-179, Princeton, Oct. 1998, pp. 174-179.

Shashua et al., "Omni-rig: Linear Self-recalibration of a Rig with Varying Internal and External Parameters," International Conference on Computer Vision (ICCV), Jul. 2001, Vancouver, Canada, pp. 135-141.

Shashua et al., "On calibration and reconstruction from planar curves", European Conference on Computer Vision (ECCV), pp. 256-270, Jun. 2000, Dublin, Ireland, pp. 256-270.

Shashua et al., "On Geometric and Algebraic Aspects of 3D Affine and Projective Structures from Perspective 2D Views", In Applications of Invariance in Computer Vision, Springer-Verlag LNCS No. 825, 1994, 127-143.

Shashua et al., "On Photometric Issues in 3D Visual Recognition from a Single 2D Image", International Journal of Computer Vision (IJCV), 21(1/2), 1997 pp. 99-122.

Shashua et al., "On Projection Matrices $P^k$-$P^2$, k=3, 6, and their Applications in Computer Vision", International Journal of Computer Vision (IJCV), 2002, pp. 53-67.

Shashua et al., "On the Reprojection of 3D and 2D Scenes Without Explicit Model Selection", European Conference on Computer Vision (ECCV), Jun. 2000, Dublin, Ireland, pp. 468-482.

Shashua et al., "On the Structure and Properties of the Quadrifocal Tensor", European Conference on Computer Vision (ECCV), Jun. 2000, Dublin, Ireland, pp. 354-368.

Shashua et al., "On the Synthesis of Dynamic Scenes from Reference Views", IEEE Conference on Computer Vision and Pattern Recognition (CVPR), Jun. 2000, pp. 133-139.

Shashua et al., "pLSA for Sparse Arrays With Tsallis Pseudo-Additive, Divergence: Noise Robustness and Algorithm", International Conference on Computer Vision (ICCV), Rio, Brazil, Oct. 2007.

Shashua et al., "Principal Component Analysis Over Continuous Subspaces and Intersection of Half-spaces", European Conference on Computer Vision (ECCV), May 2002, Copenhagen, Denmark, pp. 133-147.

Shashua et al., "Probabilistic Graph and Hypergraph Matching", Conf. on Computer Vision and Pattern Recognition (CVPR), Jun. 2008, Anchorage, Alaska.

Shashua et al., "Projective Structure from Uncalibrated Images: Structure from Motion and Recognition", IEEE Transactions on Pattern Analysis and Machine Intelligence (P AMI), (vol. 16(8), 1994, pp. 778-790.

Shashua et al., "Q-warping: Direct Computation of Quadratic Reference Surfaces", IEEE Transactions on Pattern Analysis and Machine Intelligence (P AMI), vol. 23(8), 2001, pp. 920-925.

Shashua et al., "Relative Affine Structure: Canonical Model for 3D from 2D Geometry and Applications," IEEE, Transactions on Pattern Analysis and Machine Intelligence (P AMI) vol. 18(9), pp. 873-883, Jun. 1994.

Shashua et al., "Relative Affine Structure: Theory and Application for 3D Reconstruction From Perspective Views," IEEE Conference on Computer Vision and Pattern Recognition (CVPR), Seattle, Washington, pp. 483-489, Jun. 1994.

Shashua et al., "Revisiting Single-view Shape Tensors: Theory and Applications," EP Conference on Computer Vision (ECCV), Copenhagen, DK, pp. 256-270, May 2002.

Shashua et al., "Robust Recovery of Camera Rotation from Three Frames," IEEE Conference on Computer Vision and Pattern Recognition (CVPR), San Francisco, CA, pp. 796-802, Jun. 1996.

Shashua et al., "Shape Tensors for Efficient and Learnable Indexing", Proceedings of the workshop on Scene Representations, Jun. 1995, Cambridge, MA, pp. 58-65.

Shashua et al., "ShareBoost: Efficient Multiclass Learning with Feature Sharing, Neural Information and Processing Systems (NIPS)", Dec. 2011.

Shashua et al., "Sparse Image Coding using a 3D Non-negative Tensor Factorization", International Conference on Computer Vision (ICCV), Beijing, China, Oct. 2005.

Shashua et al., "Taxonomy of Large Margin Principle Algorithms for Ordinal Regression Problems", Advances in Neural Information Processing Systems (NIPS), Vancouver, Canada, Dec. 2002.

Shashua et al., "Tensor Embedding of the Fundamental Matrix", Kluwer Academic Publishers, Boston, MA, 1998.

Shashua et al., "The Quadric Reference Surface: Applications in Registering Views of Complex 3D Objects", European Conference on Computer Vision (ECCV), May 1994, Stockholm, Sweden, pp. 407-416.

Shashua et al., "The Quadric Reference Surface: Theory and Applications", 1994.

(56) References Cited

OTHER PUBLICATIONS

Shashua et al., "The Rank 4 Constraint in Multiple (≥3) View Geometry", European Conference on Computer Vision (ECCV), Apr. 1996, Cambridge, United Kingdom, pp. 196-206.
Shashua et al., "The Semi-Explicit Shape Model for Multi-object Detection and Classification", Proc. of the European Conference on Computer Vision (ECCV), Crete, Greece, pp. 336-349, Sep. 2010.
Shashua et al., "Threading Fundamental Matrices", IEEE Transactions on Pattern Analysis and Machine Intelligence (PAMI), vol. 23(1), Jan. 2001, pp. 73-77.
Shashua et al., "Threading Kernel functions: on Bridging the Gap between Representations and Algorithms", Advances in Neural Information Processing Systems (NIPS), Vancouver, Canada, Dec. 2004.
Shashua et al., "Time-varying Shape Tensors for Scenes with Multiply Moving Points", IEEE Conference on Computer Vision and Pattern, pp. 623-630, Dec. 2001, Hawaii.
Shashua et al., "Trajectory Triangulation over Conic Sections", International Conference on Computer Vision (ICCV), Greece, 1999, pp. 330-337.
Shashua et al., "Trajectory Triangulation: 3D Reconstruction of Moving Points from a Monocular Image Sequence", IEEE Transactions on Pattern Analysis and Machine Intelligence (PAMI), vol. 22(4), 2000, pp. 348-357.
Shashua et al., "Trilinear Tensor: The Fundamental Construct of Multiple-view Geometry and its Applications", International Workshop on Algebraic Frames for the Perception Action Cycle (AFPAC97), Kiel Germany, Sep. 8-9, 1997. Proceedings appeared in Springer-Verlag, LNCS series, 1997, 190-206.
Shashua et al., "Trilinearity in Visual Recognition by Alignment", European Conference on Computer Vision (ECCV), May 1994, Stockholm, Sweden, pp. 479-484.
Shashua et al., "Projective Depth: A Geometric Invariant for 3D Reconstruction From Two Perspective/Orthographic Views and for Visual Recognition," International Conference on Computer Vision (ICCV), May 1993, Berlin, Germany, pp. 583-590.
Shashua et al., "The Quotient Image: Class Based Recognition and Synthesis Under Varying Illumination Conditions", IEEE Conference on Computer Vision and Pattern Recognition (CVPR), Jun. 1999, pp. 566-573.
Shashua et al., "The Quotient Image: Class Based Re-rendering and Recognition With Varying Illuminations", IEEE Transactions on Pattern Analysis and Machine Intelligence (PAMI), vol. 23(2), 2001, pp. 129-139.
Shashua et al., "Pedestrian Detection for Driving Assistance, Systems: Single-Frame Classification and System Level, Performance", IEEE Intelligent Vehicles Symposium, Jan. 1, 2004.
Shashua, "On the Relationship Between the Support Vector Machine for classification and Sparsified Fisher's Linear Discriminant," Neural Processing Letters, 1999, 9(2): 129-139.
Shimizu et al., "A moving image processing system for personal vehicle system", Nov. 9, 1992, Abstract.
Shirai, "Robot Vision", Future Generation Computer Systems, 1985.
Shladover et al., "Automatic Vehicle Control Developments in the PATH Program," IEEE Transaction on Vehicular Technology, vol. 40, No. 1, Feb. 1991, pp. 114-130.
Shladover, "Research and Development Needs for Advanced Vehicle Control Systems," Micro, IEEE, vol. 13, No. 1, Feb. 1993, pp. 11-19.
Shladover, "Highway Electrification and Automation," California Partners for Advanced Transit and Highways (PATH), Jan. 1, 1992.
Siala et al., "Moving shadow detection with support vector domain description in the color ratios space", Proceeding of IEEE International Conference on Pattern Recognition. vol. 4, 2004.
Siegle, "Autonomous Driving on a Road Network," Proceedings of the Intelligent Vehicles '92 Symposium Detroit, Michigan, ISBN 0/7803-0747-X; Jun. 29-Jul. 1, 1992.
Smith et al., "An Automotive Instrument Panel Employing Liquid Crystal Displays", SAE Paper No. 770274, published Feb. 1, 1977.
Smith et al., "Optical sensors for automotive applications", May 11, 1992.
Smith et al., "Vision sensing for intelligent vehicle and highway systems", Proceedings of the 1994 IEEE International Conference on Multisensor Fusion and Integration for Intelligent Systems, Las Vegas, NV, Oct. 5, 1994.
Soatto et al., "The Golem Group/University of California at Los Angeles Autonomous Ground Vehicle in the DARPA Grand Challenge", Journal of Field Robotics 23(8), 2006, pp. 527-553.
Solder et al., "Visual Detection of Distant Objects", Intelligent Robots and Systems' 93, IROS'93. Proceedings of the 1993 IEEE/RSJ International Conference on. vol. 2. IEEE, 1993, Abstract.
Sole et al., "Solid or not solid: vision for radar target validation", IEEE Intelligent Vehicles Symposium, 2004.
Sony Operating Manual CCD Color Video Camera Model: DXC-151A, 1993.
Sony Specifications Single Chip CCD Color Video Camera DXC-151A.
Sparks et al., "Multi-Sensor Modules with Data Bus Communication Capability" SAE Technical Paper 1999-01-1277, Mar. 1, 1999, doi: 10.4271/1999-01-1277, http://papers.sae.org/1999-01-1277/, Abstract.
Sridhar, "Multirate and event-driven Kalman filters for helicopter flight", IEEE Control Systems, Aug. 15, 1993.
Standard J2284/3, "High-Speed CAN (HSC) for Vehicle Applications at 500 Kbps," issued May 30, 2001.
Stauder et al., "Detection of moving cast shadows for object segmentation", IEEE Transactions on Multimedia, vol. 1, No. 1, Mar. 1999.
Stein et al., "A Computer Vision System on a Chip: a case study from the automotive domain", IEEE Computer Society Conference on Computer Vision and Pattern Recognition, 2005.
Stein et al., "Challenges and solutions for Bundling Multiple DAS Applications on a Single Hardware Platform", Procs. Vision 2008.
Stein et al., "Direct Methods for Estimation of Structure and Motion from three views", A.I. Memo No. 1594, MA Inst. of Tech., Nov. 1996.
Stein et al., "Internal Camera Calibration using Rotation and Geometric Shapes", Submitted to the Dept. of Electrical Engineering and Computer Science at MA Inst. of Tech., Masters Thesis, M.I.T., Feb. 1993.
Stein et al., "Model-based brightness constraints: on direct estimation of structure and motion," IEEE Transactions on Pattern Analysis and Machine Intelligence, vol. 22, Issue 9, Sep. 2000.
Stein et al., "Stereo-assist: Top-down stereo for driver assistance systems", IEEE Intelligent Vehicles Symposium, 2010.
Stein et al., "Vision-based ACC with a single camera: bounds on range and range rate accuracy", IEEE Intelligent Vehicles Symposium, 2003.
Stein et al., "A robust method for computing vehicle ego-motion", Proceedings of the IEEE Intelligent Vehicles Symposium, 2000.
Stein, "Accurate Internal Camera Calibration using Rotation, with Analysis of Sources of Error", Computer Vision, Proceedings Fifth International Conference on. IEEE, 1995.
Stein, "Geometric and photometric constraints: motion and structure from three views", Mass. Inst. of Tech., Doctoral Dissertation, 1998.
Stein, "Lens Distortion Calibration Using Point Correspondences", A.I. Memo No. 1595, M.I.T. Artificial Intelligence Laboratory, Nov. 1996.
Stein, "Tracking from multiple view points: Self-calibration of space and time", IEEE Computer Society Conference on Computer Vision and Pattern Recognition, Jun. 1999.
Stein et al., "Monitoring Activities from Multiple Video Streams: Establishing a Common Coordinate Frame," A.I. Memo No. 1655, M.I.T. Artificial Intelligence Laboratory, Apr. 1999.
Steiner et al., "Future applications or microsystem technologies in automotive safety systems" Advanced Microsystems for Automotive Applications '98, 1998, pp. 21-42.
Stengel et al., "Intelligent Guidance for Headway and Lane Control", Princeton University, Department of Mechanical and Aerospace Engineering, New Jersey, 1989.

(56) References Cited

OTHER PUBLICATIONS

Stickford, "Candid cameras come to Park", Grosse Pointe News, Mar. 7, 1996.
Stiller et al., "Multisensor obstacle detection and tracking", Image and Vision Computing 18, Elsevier, 2000, pp. 389-396.
Sukthankar, "RACCOON: A Real-time Autonomous Car Chaser Operating Optimally at Night", Oct. 1992.
Sun et al., "On-road vehicle detection using optical sensors: a review", 2004.
Sun et al., "A Real-time Precrash Vehicle Detection System", 2002.
Szeliski, "Image Mosaicing for Tele-Reality Applications", DEC Cambridge Research Laboratory, CRL 94/2, May 1994.
Taktak et al., "Vehicle detection at night using image processing and pattern recognition", Centre de Recherche en Automatique de Nancy, 1994.
Taylor, "CCD and CMOS Imaging Array Technologies: Technology Review," Xerox Research Centre Europe, Technical Report EPC-1998-106, 1998.
Thomanek et al., "Multiple object recognition and scene interpretation for autonomous road vehicle guidance" Oct. 1994.
Thomas, "Real-time vision guided navigation", Engineering Applications of Artificial Intelligence, Jan. 31, 1991, Abstract.
Thongkamwitoon et al., "An adaptive real-time background subtraction and moving shadows detection", Proceeding of IEEE International Conference on Multimedia and Expo. vol. 2, 2004.
Thorpe et al., "Perception for Outdoor Navigation First Year Report", Defense Advanced Research Projects Agency, Carnegie Mellong University, Dec. 31, 1990.
Thorpe, "Vision and Navigation for the Carnegie-Mellon Navlab", IEEE Transactions on Pattern Analysis and Machine Intelligence, vol. 10, No. 3, May 1998.
Thorpe, "1988 Year End Report for Road Following at Carnegie Mellon", Carnegie Mellon University, May 31, 1989.
Thorpe et al., "Toward autonomous driving: the CMU Navlab. I. Perception", IEEE Paper, Aug. 1991.
Thorpe et al., "The 1997 Automated Highway Free Agent Demonstration", 1997 pp. 496-501, 1997.
Tokimaru et al., "CMOS Rear-View TV System with CCD Camera", National Technical Report vol. 34, No. 3, pp. 329-336, Jun. 1988, Japan.
Toth et al., "Detection of moving shadows using mean shift clustering and a significance test", Proceedings of IEEE International Conference on Pattern Recognition, vol. 4, 2004.
Toyota Motor Corporation, "Present and future of safety technology development at Toyota." 2004.
Trainor et al., "Architectural Synthesis of Digital Signal Processing Algorithms Using 'IRIS'", Journal of VLSI Signal Processing Systems for Signal, Image and Video Technology, vol. 16, No. 1, 1997.
Tremblay et al., "High resolution smart image sensor with integrated parallel analog processing for multiresolution edge extraction", Robotics and Autonomous Systems 11, pp. 231-242, with abstract, 1993.
Tribe et al., "Collision Avoidance," Advances, Issue No. 4, May 1990.
Tribe et al., "Collision Avoidance," Lucas International Symposium, Paris, France, 1989.
Tribe et al., "Collision Warning," Autotech '93, Seminar 9, NEC Birmingham, UK, Nov. 1993.
Tribe, "Intelligent Autonomous Systems for Cars, Advanced Robotics and Intelligent Machines," Peter Peregrinus, Nov. 1994.
Trivdei et al., "Distributed Video Networks for Incident Detection and Management", Computer Vision and Robotics Research Laboratory, 2000.
Tsugawa et al., "An automobile with artificial intelligence," in Proc. Sixth IJCAI, 1979.
Tsugawa et al., "Vision-based vehicles in japan; machine vision systems and driving control systems", IEEE Transactions on Industrial Electronics, vol. 41, No. 4, Aug. 1994.
Tsutsumi et al., "Vehicle Distance Interval Control Technology" Mitsubishi Electric Advance, Technical Reports, vol. 78, pp. 10-12, Mar. 1997.
Turk et al., "VITS—A Vision System for Autonomous Land Vehicle Navigation," IEEE Transactions on Pattern Analysis and Machine Intelligence, vol. 10, No. 3, May 3, 1988.
Tzomakas and von Seelen, "Vehicle Detection in Traffic Scenes Using Shadows," Internal report, Institut Für Neuroinformatik Bochum, Internal Report 98-06.
Ulmer, "Vita II—active collision avoidance in real traffic" Proceedings of the Intelligent Vehicles '94 Symposium, Oct. 24-26, 1994, Abstract.
Valeo Infos News, "Valeo's revolutionary Lane Departure Warning System makes debut on Nissan Infiniti vehicles", 04.08 found at http://www.valeo.com/cwscontent/www.valeo.com/medias/fichiers/journalistes/en/CP/Idws_uk.pdf, Mar. 31, 2004.
Van Leeuwen et al., "Motion Estimation with a Mobile Camera for Traffic Applications", IEEE, US, vol. 1, pp. 58-63, Oct. 3, 2000.
Van Leeuwen et al., "Motion Interpretation for In-Car Vision Systems", IEEE, US, vol. 1,, p. 135-140, Sep. 30, 2002.
Van Leeuwen et al., "Real-Time Vehicle Tracking in Image Sequences", IEEE, US, vol. 3, pp. 2049-2054, XP010547308, May 21, 2001.
Van Leeuwen et al., "Requirements for Motion Estimation in Image Sequences for Traffic Applications", IEEE, pp. 354-359, XP002529773, 2000.
Van Leeuwen et al., "Requirements for Motion Estimation in Image Sequences for Traffic Applications", IEEE, US, vol. 1, pp. 145-150, XP010340272, May 24, 1999.
Vellacott, "CMOS in Camera," IEE Review, pp. 111-114, May 1994.
Vlacic et al., "Intelligent Vehicle Technologies, Theory and Applications", Society of Automotive Engineers Inc., edited by SAE International, 2001.
Vosselman et al., "Road traceing by profile matching and Kalman filtering", Faculty of Geodetic Engineering, 1995.
Wallace et al., "Progress in Robot Road-Following," Proceedings of the 1986 IEEE International Conference on Robotics and Automation, vol. 3, pp. 1615-1621, 1986.
Wan et al., "A New Edge Detector for Obstacle Detection with a Linear Stereo Vision System", Proceedings of the Intelligent Vehicles '95 Symposium, Abstract.
Wang et al., "CMOS Video Cameras", article, 4 pages, University of Edinburgh, UK, 1991.
Wang et al., "A probabilistic method for foreground and shadow segmentation", Proceeding of IEEE International Conference on Image Processing, Pattern Recognition, vol. 3, Oct. 2, 2003.
Wang, "Camera Calibration by Vanishing Lines for 3-D Computer Vision", IEEE Transactions on Pattern Analysis and Machine Intelligence, vol. 13, No. 4, Apr. 15, 1991.
Watec WAT-660D data sheet, found at http://www.wateccameras.com/products.php?prod_id=214.
Web page at http://www.glassrack.net/potrsp1919192.html?utm_source=googlepepla&utm_medium=adwords&id=116297830341.
Webpage: http://parts.royaloakschevy.com/showAssembly.aspx?makeName=pontiac&modelYear=1990&modelName=transsport&ukey_assembly=5888560&ukey_category=53643&assembly=921201mu10-009mu10-009.
Weisser et al., "Autonomous driving on vehicle test tracks: Overview, implementation and vehicle diagnosis" Intelligent Transportation Systems, pp. 62-67, Oct. 5-8, 1999, Abstract.
Wierwille et al., "Research on Vehicle-Based Driver Status/Performance Monitoring, Part III" Final Report, Sep. 1996.
Wilson, "Technology: A little camera with big ideas—The latest smart vision system," Financial Times, Jun. 17, 1993.
Wolberg, "Digital Image Warping", IEEE Computer Society Press, 1990.
Wolberg, "A Two-Pass Mesh Warping Implementation of Morphing," Dr. Dobb's Journal, No. 202, Jul. 1993.
Wördenweber, "Driver assistance through lighting." ESV: 17th International Technical Conference on the Enhanced Safety of Vehicles. Report. No. 476. 2001.

(56) References Cited

OTHER PUBLICATIONS

Wright, "Take your hands off that car!", Edn. vol. 42, No. 26, Dec. 18, 1997, Abstract.

Wüller et al., "The usage of digital cameras as luminance meters", Proc. SPIE 6502, Digital Photography III, 65020U, Feb. 20, 2007; doi:10.1117/12.703205.

Wyatt et al., "Analog VLSI systems for Image Acquisition and Fast Early Vision Processing", International Journal of Computer Vision, 8:3, pp. 217-223, 1992.

Xie et al., "Active and Intelligent Sensing of Road Obstacles: Application to the European Eureka-Prometheus Project", Fourth International Conference on Computer Vision, IEEE, 1993, Abstract.

Xu et al., "3 DOF modular eye for smart car" School of Mechanical & Production Engineering Nanyang Technologies University, Intelligent Transportation Systems, 1999. Proc., Oct. 5-8, 1999, pp. 501-505.

Xu et al., "Cast shadow detection in video segmentation", Pattern Recognition Letters, vol. 26, Nov. 4, 2003.

Yadid-Pecht et al., "Wide Intrascene Dynamic Range CMOS APS Using Dual Sampling," IEEE Transactions on Electron Devices, vol. 44, No. 10, Oct. 1997.

Yamada et al., "Wide Dynamic Range Vision Sensor for Vehicles," 1994 Vehicle Navigation & Information Systems Conference Proceedings, pp. 405-408, 1994.

Yazigi, "Technology: Promethean Plans for Next Generation of Cars", The New York Times, Sep. 13, 1992.

Yee, "Portable Camera Mount", Feb. 1986, Abstract.

Yeh et al., "Image-Based Dynamic Measurement for Vehicle Steering Control", Proceedings of the Intelligent Vehicles '94 Symposium, 1994, Abstract.

Yerazunis et al. "An inexpensive, all solid-state video and data recorder for accident reconstruction" Mitsubishi Technical Report TR-99-29 (Presented at the 1999 SAE International Congress and Exposition, Detroit, MI, Mar. 3, 1999.), Apr. 24, 1999.

Yoneyama et al., "Moving cast shadow elimination for robust vehicle extraction based on 2D joint vehicle/shadow models", Proceeding of IEEE International Conference on Advanced Video and Signal Based Surveillance, 2003.

Yoneyama et al., "Robust vehicle and traffic information extraction for highway surveillance", EURASIP Journal on Applied Signal Processing, pp. 2305-2321, 2005.

Young et al., "Cantata: Visual Programming Environment for the Khoros System, ACM SIGGRAPH Computer Graphics-Special focus: modular visualization environments (MVEs)", vol. 29, issue 2, Mar. 16, 1995.

Young et al., "Improved Obstacle Detection by Sensor Fusion", IEEE Colloquium on "Prometheus and Drive", Oct. 15, 1992, Abstract.

Yu et al., "Vehicles Recognition by Video Camera" 1995.

Yu, "Road tracking, lane segmentation and obstacle recognition by mathematical morphology," Intelligent Vehicles '92 Symposium, Proceedings of the IEEE 1992 Conference, p. 166-172.

Yuji et al., "Accidents and Near-Misses Analysis by Using Video Drive-Recorders in a Fleet Test", Proceedings of the 17th International Technical Conference on the Enhanced Safety of Vehicles (ESV) Conference, Jun. 4-7, 2001 Amsterdam, The Netherlands, National Highway Traffic Safety Administration, Washington, DC. HS 809 20, Jun. 2001.

Zheng et al., "An Adaptive System for Traffic Sign Recognition," IEEE Proceedings of the Intelligent Vehicles '94 Symposium, pp. 165-170, Oct. 1994.

Zidek, "Lane Position Tracking", Aerospace and Electronics Conference, National Proceedings of the IEEE 1994, Abstract.

Zigman, "Light Filters to Improve Vision", Optometry and Vision Science, vol. 69, No. 4, pp. 325-328, Apr. 15, 1992.

* cited by examiner

VISION SYSTEM FOR VEHICLE

CROSS REFERENCE TO RELATED APPLICATIONS

The present application is a continuation of U.S. patent application Ser. No. 15/463,296, filed Mar. 20, 2017, now U.S. Pat. No. 9,736,435, which is a continuation of U.S. patent application Ser. No. 15/249,557, filed Aug. 29, 2016, now U.S. Pat. No. 9,609,289, which is a continuation of U.S. patent application Ser. No. 14/942,089, filed Nov. 16, 2015, now U.S. Pat. No. 9,428,192, which is a continuation of U.S. patent application Ser. No. 14/678,146, filed Apr. 3, 2015, now U.S. Pat. No. 9,191,634, which is a continuation of U.S. patent application Ser. No. 14/467,296, filed Aug. 25, 2014, now U.S. Pat. No. 9,008,369, which is a continuation of U.S. patent application Ser. No. 14/082,577, filed Nov. 18, 2013, now U.S. Pat. No. 8,818,042, which is a continuation of U.S. patent application Ser. No. 13/689,796, filed Nov. 30, 2012, now U.S. Pat. No. 8,593,521, which is a continuation of U.S. patent application Ser. No. 13/335,125, filed Dec. 22, 2011, now U.S. Pat. No. 8,325,986, which is a continuation of U.S. patent application Ser. No. 13/107,318, filed May 13, 2011, now U.S. Pat. No. 8,090,153, which is a continuation of U.S. patent application Ser. No. 12/979,499, filed Dec. 28, 2010, now U.S. Pat. No. 7,949,152, which is a continuation of U.S. patent application Ser. No. 12/856,737, filed Aug. 16, 2010, now U.S. Pat. No. 7,873,187, which is a continuation of U.S. patent application Ser. No. 12/606,476, filed Oct. 27, 2009, now U.S. Pat. No. 7,792,329, which is a continuation of U.S. patent application Ser. No. 12/429,605, filed Apr. 24, 2009, now U.S. Pat. No. 7,616,781, which is a continuation of U.S. patent application Ser. No. 11/105,757, filed Apr. 14, 2005, now U.S. Pat. No. 7,526,103, which claims benefit of U.S. provisional applications, Ser. No. 60/644,903, filed Jan. 19, 2005; Ser. No. 60/642,227, filed Jan. 7, 2005; Ser. No. 60/607,963, filed Sep. 8, 2004; and Ser. No. 60/562,480, filed Apr. 15, 2004, which are hereby incorporated herein by reference in their entireties.

FIELD OF THE INVENTION

The present invention relates generally to an imaging system for a vehicle and, more particularly, to an imaging system that may display information to a driver of the vehicle and/or control an accessory in response to images captured by a camera or image capture device.

BACKGROUND OF THE INVENTION

It is known to provide an image capture device at a vehicle for capturing images of the scene occurring exteriorly of the vehicle, such as forwardly or rearwardly or sidewardly of the vehicle. The captured images may be processed by a processing system and the system may control the headlamps of the vehicle or may provide an image display to the driver of the vehicle or may provide other information or signals, depending on the particular application of the imaging system.

SUMMARY OF THE INVENTION

The present invention provides an imaging system for a vehicle that is operable to identify and read traffic control signage as the vehicle travels along a road. The system may provide an information display and/or alert to a driver of the vehicle in response to the images captured by a camera or imaging device of the vehicle. The imaging system of the present invention may also process captured images and control one or more accessories in response to such processing. For example, the imaging system of the present invention may control the headlamps or may adjust or control the direction of the headlamps in response to such image processing.

According to an aspect of the present invention, an imaging system for a vehicle includes an imaging device, a display device and an image processor. The imaging device has a field of view exteriorly and forward of the vehicle in its direction of travel and captures images representative of the exterior scene. The image processor processes the captured images and determines whether the captured image encompasses an image of a traffic control sign. If the image processor determines that the captured image encompasses a traffic control sign of interest, the image processor determines the numerals, characters or other information on the face of the sign. The image processor may control the display device in response to the determined characters or information and in response to a vehicle speed input that is indicative of the speed that the vehicle is traveling. The display device thus may display information to a driver of the vehicle in response to an output of the image processor and/or may generate at least one of a visible, audible or tactile/haptic signal to alert the driver that he or she has entered a different speed zone. Most preferably, the display information and/or alert differentiates and distinguishes from and is characteristic of an allowed increase in driving speed from one zone to another and a decrease in driving speed from one zone to another, whereby the driver is informed as to whether it is allowable to drive faster or is required to drive slower.

Preferably, the imaging device and the associated image processor are located within the interior cabin of the vehicle with a field of view through the vehicle windshield and, most preferably, the image processor is located at an interior rearview mirror assembly or at a windshield electronic module located at a central upper windshield location. Preferably, the imaging system can be multi-tasking, and thus may be part of or associated with other vehicle accessories or systems or may access or share components or circuitry of other vehicle accessories or systems. For example, the image processor may preferably derive further information from the processed captured images, such as a determination of location, intensity and type of oncoming headlamps or leading taillights being approached by the vehicle, rain or fog or the like present and detected within the forward field of view, a presence of obstacles or objects or vehicles in the forward field of view and/or the like, such as in connection with a headlamp control system, a precipitation sensor, an adaptive cruise control system, a lane departure warning system, a traffic lane control system and/or the like.

For example, the image processor may determine that a speed limit sign is within the captured image by analyzing the size, shape and location of a detected object. The image processor may then determine or recognize the characters or numbers or information on the face of the speed limit sign to determine the speed limit in the area through which the vehicle is traveling. The display device may display information to the driver of the vehicle in response to the determined characters and the vehicle speed. For example, if the vehicle speed is substantially greater than the posted and determined speed limit, the display device may display information to that effect or may provide a warning or alert signal to alert the driver of the excessive speed that the vehicle is traveling.

According to another aspect of the present invention, an imaging system for a vehicle includes an imaging device and an image processor. The imaging device has a field of view exteriorly and forward of the vehicle in its direction of travel. The imaging device is operable to capture images representative of the exterior scene. The image processor is operable to process the captured images in accordance with an algorithm. The algorithm comprises a sign recognition routine and a character recognition routine.

The algorithm may pass to the character recognition routine after the sign recognition routine. The image processor may process the captured image to determine whether the captured image encompasses an image of a traffic control sign of interest when in the sign recognition routine. The image processor may process the captured image to determine what the characters on the face of the sign represent when in the character recognition routine. The algorithm may proceed to the character recognition routine in response to the image processor determining that the captured image encompasses an image of a traffic control sign of interest.

The imaging system may include at least one of a visible alert, an audible alert and a tactile alert to a driver of the vehicle in response to an output of the image processor. The visible alert may display information indicative of at least one of the vehicle speed, a posted speed limit and a difference between the vehicle speed and the posted speed limit.

The imaging system may be also or otherwise operable to control a headlamp setting or headlamp beam direction of the vehicle in response to detected headlamps or taillights or other objects of interest along the path of travel of the vehicle. The imaging system may detect objects of interest, such as objects that may pose a threat to the vehicle or lane markers or other objects, and may display information regarding the objects or other information to the driver of the vehicle, such as at a video display screen or laser display or heads up display or the like.

Therefore, the present invention provides an imaging system that is operable to detect and recognize and read traffic control signage along the side (and/or above) the road along which the vehicle is traveling. The imaging system may then display information to the driver of the vehicle regarding the detected and recognized signage. The imaging system may provide a warning or alert signal to the driver if an unsafe or unwanted driving condition is encountered, such as when the vehicle is traveling at a speed that is substantially over the speed limit or is approaching a turn at too high a speed or the like.

These and other objects, advantages, purposes and features of the present invention will become apparent upon review of the following specification in conjunction with the drawings.

DESCRIPTION OF THE PREFERRED EMBODIMENTS

Figure 1:
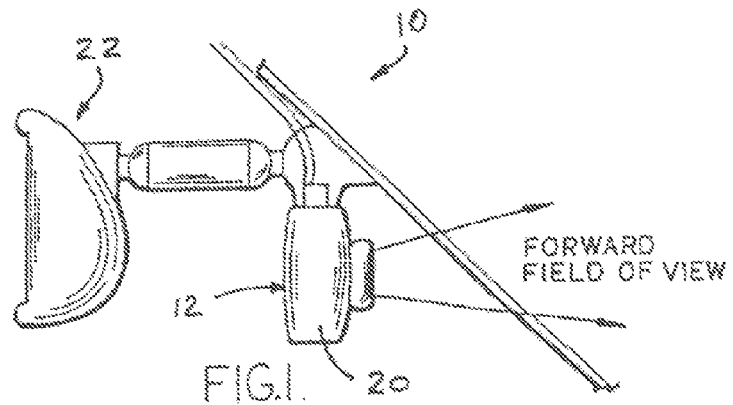
FIG. 1 is a side elevation of a portion of a vehicle embodying an imaging system in accordance with the present invention.
Figure 2:
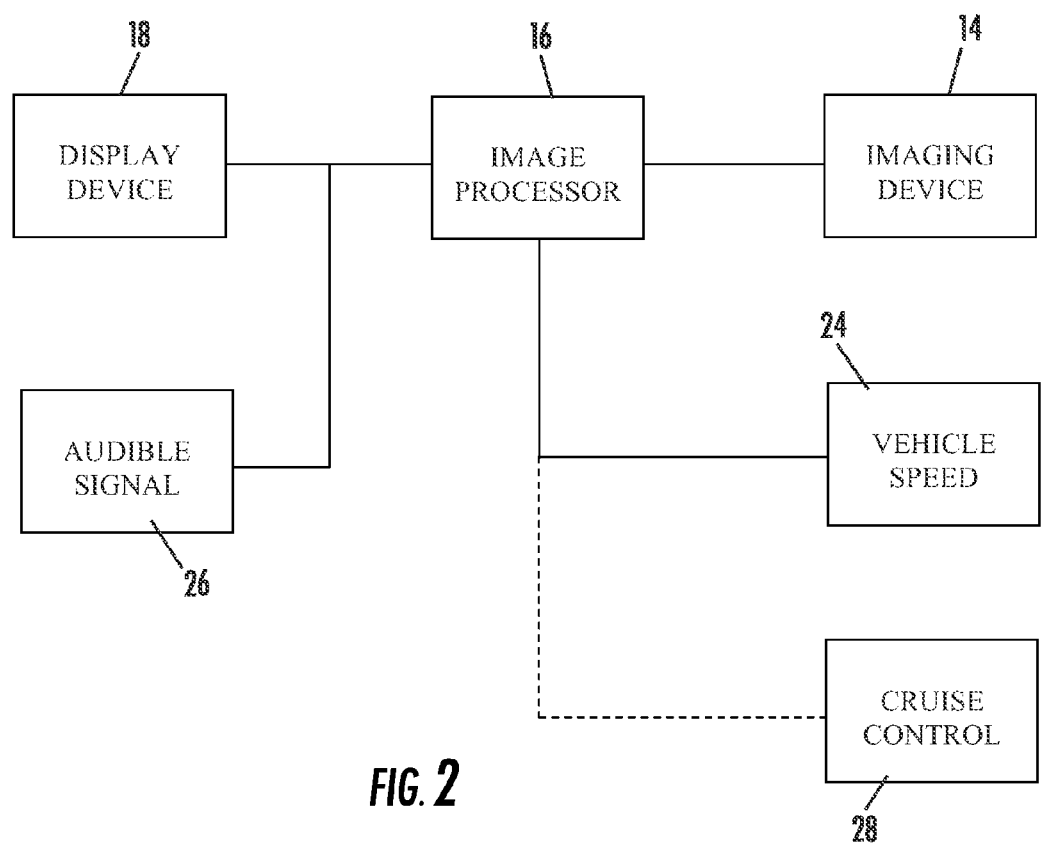
FIG. 2 is a block diagram of an imaging system in accordance with the present invention.

Referring now to the drawings and the illustrative embodiments depicted therein, a vehicle 10 includes an imaging system 12, which includes an imaging sensor or image capture device or camera 14, which captures images of a scene occurring exteriorly of the vehicle 10 (FIGS. 1 and 2). Imaging system 12 includes a control including an image processor 16, which receives data from imaging device 14. The image processor 16 processes the captured images or captured image data and may identify traffic control signage (such as stop signs, speed limit signs, exit signs and the like) and may identify the characters, numbers and/or information that is printed or formed or established on the faces of the signs and may generate an output signal in response to the identified characters/numbers/information. The imaging system 12 includes a display or display device 18, which may be positioned within the vehicle (such as at an interior rearview mirror assembly of the vehicle or at an accessory module (such as located at an upper portion of the windshield) of the vehicle or at an instrument panel of the vehicle or at an overhead console of the vehicle or the like) and which displays information in response to image processor 16 processing the captured images, as discussed below.

The imaging device 14 may comprise an imaging array sensor, such as a CMOS sensor or a CCD sensor or the like, such as described in U.S. Pat. Nos. 5,550,677; 5,670,935; 5,796,094; 6,498,620; 5,877,897; 6,396,397 and 6,313,454, and U.S. patent application Ser. No. 10/421,281, filed Apr. 23, 2003, now U.S. Pat. No. 7,004,606, which are hereby incorporated herein by reference. In a preferred embodiment, the imaging system 12 may include a lens element or optic between the imaging device 14 and the exterior scene. The optic may comprise an asymmetric optic, which focuses a generally central portion of the scene onto the imaging device, while providing classical distortion on the periphery of the scene or field of view.

In the illustrated embodiment, the imaging device 14 is mounted at or in an accessory module or pod 20 and is arranged to have a field of view forward of the vehicle. The imaging device 14 thus may capture images of a forward scene as the vehicle is traveling forwardly along a road or street or highway or the like. Optionally, the imaging device may be positioned elsewhere, such as at or in the interior rearview mirror assembly 22, or at or in an accessory module or windshield electronics module or the like (as discussed below), without affecting the scope of the present invention.

Display 18 of imaging system 12 may be positioned in the vehicle and may be readily viewable by the driver of the vehicle. For example, display 18 may be positioned in the interior rearview mirror assembly 22 and may be viewable at the reflective element of the mirror assembly or at or around the reflective element or bezel portion, such as at the chin or eyebrow region of the mirror assembly. Optionally, the display device 18 may be at or in or associated with an accessory module or windshield electronics module or the like at or near the interior rearview mirror assembly, such as an accessory module or windshield electronics module of the types described in U.S. patent application Ser. No. 10/355,454, filed Jan. 31, 2003, now U.S. Pat. No. 6,824,281; and Ser. No. 10/456,599, filed Jun. 6, 2003, now U.S. Pat. No. 7,004,593, and/or U.S. Pat. Nos. 6,690,268; 6,250,148; 6,341,523; 6,593,565 and 6,326,613, and/or in PCT Application No. PCT/US03/40611, filed Dec. 19, 2003, which are hereby incorporated herein by reference. Optionally, the display device may be at or in an overhead console (such as a console of the types described in PCT Application No. PCT/US03/40611, filed Dec. 19, 2003, which is hereby incorporated herein by reference) or elsewhere in the vehicle, such as in the instrument panel of the vehicle or the like, without affecting the scope of the present invention.

Display or display device 18 may comprise any type of display element or device or screen, without affecting the scope of the present invention. For example, display device 18 may comprise a backlit display, which may be laser-etched or otherwise formed on or placed on (such as via an appliqué or the like) the surface of the reflective element of the mirror assembly (such as via removing the reflective coating of the reflective element to form a desired port or icon or character and/or such as by utilizing aspects described in U.S. Pat. No. 4,882,565, issued to Gallmeyer, which is hereby incorporated herein by reference) to allow light from corresponding illumination sources or elements to pass through the reflective element to illuminate the appropriate port or icon or character for viewing by the driver or occupant of the vehicle, such as described in U.S. patent application Ser. No. 10/456,599, filed Jun. 6, 2003, now U.S. Pat. No. 7,004,593; and/or Ser. No. 11/029,695, filed Jan. 5, 2005, now U.S. Pat. No. 7,253,723, which are hereby incorporated herein by reference. Optionally, the display device may comprise a video screen (such as the types described in PCT Application No. PCT/US03/40611, filed Dec. 19, 2003, and/or U.S. provisional application Ser. No. 60/630,061, filed Nov. 22, 2004, which are hereby incorporated herein by reference), or may comprise a display on demand/transflective type of display or the like at the reflective element of the mirror assembly (where the presence of the display device or element may be substantially masked or not readily viewable unless powered, such as the types described in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; and/or Ser. No. 10/993,302, filed Nov. 19, 2004, now U.S. Pat. No. 7,338,177, which are all hereby incorporated herein by reference), or may comprise a heads up display that projects the display information for viewing in front of the driver of the vehicle, or may comprise any other type of display (such as the types described in U.S. Pat. Nos. 5,530,240 and/or 6,329,925, which are hereby incorporated herein by reference) or the like, without affecting the scope of the present invention. The display device may include one or more display elements, such as illumination sources, such as vacuum fluorescent (VF) elements, liquid crystal displays (LCDs), light emitting diodes (LEDs), such as inorganic LEDs or organic light emitting diodes (OLEDs), electroluminescent (EL) elements or the like, without affecting the scope of the present invention.

Figure 3:
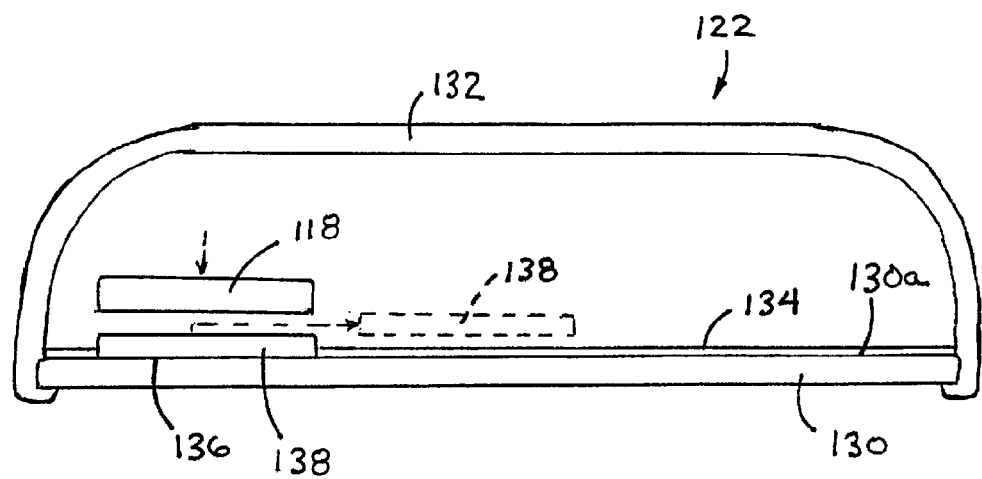
FIG. 3 is a sectional view of an interior rearview mirror assembly having a display device in accordance with the present invention.

Optionally, the display may comprise a video display screen that is selectively viewable, such as at or near the mirror assembly (such as a slide out display of the types described in PCT Application No. PCT/US03/40611, filed Dec. 19, 2003; and/or U.S. provisional application Ser. No. 60/630,061, filed Nov. 22, 2004, which are hereby incorporated herein by reference) or through the reflective element of the mirror assembly. For example, and with reference to FIG. 3, a mirror assembly 122 includes a reflective element 130 and a display device or element 118 positioned behind the reflective element 130 and within the mirror housing or casing 132. The reflective element 130 may comprise a fourth surface electro-optic reflective element assembly, such as a fourth surface electrochromic reflective element assembly, and has a reflective coating or paint layer 134 on the rear or fourth surface 130a of the reflective element assembly. Examples of such fourth surface reflective element assemblies are described in U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference. Optionally, the reflective element may comprise a prismatic reflective element with a reflective coating or paint layer on its rear surface. As shown in FIG. 3, the reflective coating 134 is removed or otherwise not present (such as by masking the reflective element surface during the coating process) at a display region 136. The mirror assembly 122 includes a movable reflector 138, such as a small mirror or reflective element or the like, that is selectively positionable at the display region 136 to provide a reflectant element at the display region, so that substantially the entire reflective element 130 reflects to the driver or occupant of the vehicle when the movable reflector 138 is positioned at the display region.

When it is desired to display information to the driver or occupant of the vehicle, movable reflector 138 may be selectively moved, such as by moving the reflector rearward of the rear surface of the reflective element 130 and then to a side of (or above or below) the display region 136. The display element 118 is positioned generally rearward of the display region 136 so that the display element 118 may be viewable through the display window or region when the movable reflector is removed from the display window or region. Optionally, the display element 118 may move toward the display region and may engage or contact the display region of the reflective element 130 to enhance viewing of the display information through the reflective element. When the display information is no longer desired or needed, the display element may move rearward of the reflective element and the movable reflector may move back to the initial position at the display region.

The display element may be operable to display information relating to a rear vision system of the vehicle, a navigation and/or compass system of the vehicle, a telematics system of the vehicle or any other vehicle system. The movable reflector may be selectively moved and the display element may be selectively activated and/or moved in response to a user input (such as a voice command or manual input at a button or switch or sensor or the like), or may be selectively activated and/or moved automatically, such as in response to a triggering event, such as when the vehicle is shifted into reverse for a backup system or when the vehicle approaches a waypoint for a navigational system (such as a navigational system of the types described in PCT Application No. PCT/US03/40611, filed Dec. 19, 2003; and/or U.S. provisional application Ser. No. 60/611,796, filed Sep. 21, 2004, which are hereby incorporated herein by reference), or other triggering events or the like.

The display element and/or movable reflector may be moved via actuation of an electromagnetic drive motor to move the element/reflector to the appropriate location.

Optionally, and particularly for applications where the mirror assembly includes compass circuitry for a compass system of the vehicle, the mirror assembly or system may include a control that may inhibit data sampling by the compass circuitry when the display element and/or movable reflector are moving. For example, the control or system may limit or inhibit data sampling by the compass circuitry when the display is activated or deactivated and/the movable reflector is moving (or when a slide out display is moving (such as a slide out display of the types described in PCT Application No. PCT/US03/40611, filed Dec. 19, 2003, and/or U.S. provisional application Ser. No. 60/630,061, filed Nov. 22, 2004, which are hereby incorporated herein by reference). The control or system thus may interact with the compass or compass circuitry or control to reduce or limit or substantially preclude magnetic interference of the compass system during operation of the drive motor (such as an electromagnetic motor) of the movable reflector or slide out display or the like, in order to limit or substantially preclude the capturing of corrupting data that may occur during operation of the electromagnetic motor of the display or movable reflector. The control or system may be operable to limit or inhibit operation of or data collection by the compass circuitry or system during operation of other electromagnetic components of the mirror assembly or accessory module or the like.

Figure 4:
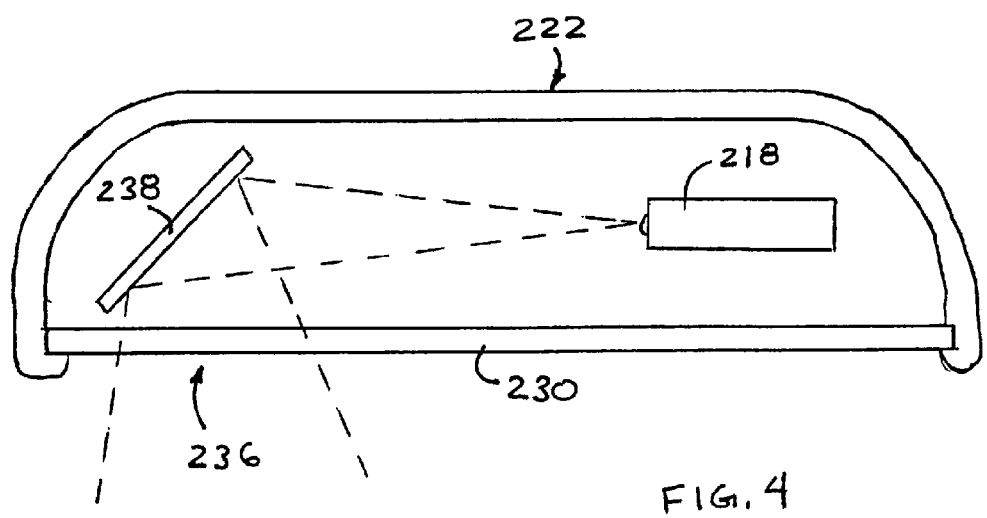
FIG. 4 is a sectional view of another interior rearview mirror assembly having another display device in accordance with the present invention.

Optionally, the display may comprise a steerable laser display positioned within an accessory module or with the interior rearview mirror assembly. For example, and with reference to FIG. 4, an interior rearview mirror assembly 222 includes a steerable laser display device 218, such as a controllable or programmable display device that is operable to project illumination in a controlled or programmed manner. The laser display device 218 may project illumination in a scanning movement, such as at about 30 frames per second, to project an image as the laser scans through multiple rows and/or columns at an image viewing area or display region. In the illustrated embodiment, the scanning display device 218 projects illumination onto an angled reflector 238, which reflects or directs the illumination through a display region 236 of the reflective element 230. The reflective element 230 may comprise a transflective electro-optic reflective element assembly, such that the display information may provide a display on demand display (such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; PCT Application No. PCT/US03/29776, filed Sep. 9, 2003; and/or PCT Application No. PCT/US03/40611, filed Dec. 19, 2003, which are all hereby incorporated herein by reference) that is projectable through the reflective element and viewable by the driver or occupant of the vehicle when the display element is activated, while the reflective element 230 provides sufficient reflectance in the display region when the display element is deactivated.

The laser scanning display element of the present invention thus provides a programmable display that may display text or graphics or indicia or the like. The display element provides information to the driver or occupant of the vehicle as a dynamic display. The display element also provides enhanced brightness over some known or conventional display elements and may be implemented at a lower cost than other known or conventional display elements or devices, such as multi-pixel display screens and the like.

Optionally, a variety of display types or screens can be utilized in conjunction with an interior rearview mirror assembly or windshield electronics module/accessory module of the present invention. For example, any of the liquid crystal type display or video screens (such as the types disclosed in PCT Application No. PCT/US03/40611, filed Dec. 19, 2003, and/or U.S. provisional application Ser. No. 60/630,061, filed Nov. 22, 2004, which are hereby incorporated herein by reference) can be utilized. Also, a microdisplay (such as is available from MicroVision Inc. of Bothell, Wash.), in which a single scanner is used to direct multiple light beams simultaneously into separate zones of an image so as to deliver a bright, high resolution, image over a wide field of view, can be used. Such a microdisplay may utilize conventional surface emitting or other types of light emitting diodes (LEDs) as light sources to provide an economical display with sharp resolution and high image brightness. For example, multiple red, green and blue LEDs or red, blue and green laser diodes can be used to write several million red, green, and blue spots that integrate to form a single high-fidelity image in a mega pixel display image. Such scanning display technologies can utilize a biaxial microelectromechanical scanner (MEMS) and other display/mechanical and electronic devices, such as are disclosed in U.S. Pat. Nos. 6,714,331; 6,795,221 and 6,762,867, which are hereby incorporated herein by reference, and can provide increased spatial resolution. Such displays can deliver an image with a full 30-degree horizontal field of view or more. Such a microdisplay/MEMS device can, for example, be placed in the mirror housing behind the mirror reflective element in an interior (or exterior) mirror assembly such that the image is projected onto the rear of the mirror reflective element, such as is disclosed in U.S. patent application Ser. No. 10/225, 851, filed Aug. 22, 2002, now U.S. Pat. No. 6,847,487, which is hereby incorporated herein by reference.

If the mirror reflector of the mirror element is of the transflective (substantially reflective and at least partially transmitting to light) type, the driver or other occupant in the interior cabin of the vehicle can view the image (being back-projected onto the rear of the mirror reflective element) by viewing the mirror reflective element. This is because the front surface of the reflective element will typically reflect about 4 percent of the light incident on the reflective element toward the driver of the vehicle. Thus, if the display illumination (projected through the reflective element from behind the reflective element and within the mirror casing) does not dominate or distinguish over the reflectance off of the front surface of the mirror reflective element, the display illumination and information may appear washed out due to the reflected image that is reflecting off of the front surface of the reflective element. Such washout may be particularly noticeable during high ambient lighting or daytime lighting conditions. Because back-projected microdisplays can have a very high image brightness (due to use of very high brightness LEDs or lasers as illuminators), image wash-out during driving under high ambient lighting conditions (such as on a sunny day) is reduced using such scanning image microdisplay technology compared to use, for example, of TFT LCD displays.

Also, such MEMS technology can be used in a heads-up-display (HUD) system, such as the MicroHUD™ head-up display system available from MicroVision Inc. of Bothell, Wash. (and such as described in U.S. patent application Ser. No. 11/029,695, filed Jan. 5, 2005, now U.S. Pat. No. 7,253,723, which is hereby incorporated herein by reference). This provides a compact heads-up display capable of meeting specific size and performance specifications. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving.

The high-resolution MicroHUD™ display may be completely reconfigurable, enabling virtually any content to be displayed, including video or animated icons and graphics. Advantageously, such a MicroHUD™ display unit may be included at or within an interior rearview mirror assembly or a windshield electronics module/accessory module so as to project its image therefrom onto the inner surface of the windshield. This unique packaging of a HUD or projection image displayer into an interior rearview mirror assembly or a windshield electronics module/accessory module has advantages over conventional placement of such HUD projectors into the dashboard of the vehicle. These advantages include that the HUD image projector need not find space in an already crowded dashboard (where, for example, a center information cluster may want space or where HVAC ducts/components may run). Also, incorporation of the HUD projector in the likes of the mounting portion of the interior mirror assembly or into a windshield electronics module/accessory module can allow a HUD display to be provided more readily as an optional accessory for the vehicle or as a dealership option or aftermarket device. A variety of images (such as, for example, iconistic or graphical or video or textural or alphanumerical or numerical or the like) can be displayed, such as information from a side object/blind spot monitoring system, such as the types described in U.S. Pat. No. 5,929,786, and/or U.S. patent application Ser. No. 10/427,051, filed Apr. 30, 2003, now U.S. Pat. No. 7,038,577; and/or Ser. No. 10/209,173, filed Jul. 31, 2002, now U.S. Pat. No. 6,882,287, and/or U.S. provisional application Ser. No. 60/638,687, filed Dec. 23, 2004, which are hereby incorporated herein by reference.

Also, a full video image captured by the likes of a reversing camera or a forward facing night vision camera or a sidelane-monitoring camera can be displayed on/via the vehicle windshield (or elsewhere) by the likes of a MicroHUD™ device and, conceptually, thus replacing the exterior mirrors with cameras. For example, a driver sidelane video image and a passenger sidelane video image, both preferably with graphic overlays thereon, can be displayed at respective sides of the vehicle windshield via a MEMS-based display system (such as via a MicroHUD™ HUD display device) and with the image visible to the driver by viewing the vehicle windshield (such as via an optical image combiner created on the inner glass surface of the windshield and/or onto the polymeric laminating interlayer (typically a sheet of polyvinyl butyral or of silicone or the like) utilized in the laminate windshield).

Optionally, a laser emitter or laser diode or the like may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent application Ser. No. 10/225,851, filed Aug. 22, 2002, now U.S. Pat. No. 6,847,487; and/or U.S. provisional applications, Ser. No. 60/607,963, filed Sep. 8, 2004; Ser. No. 60/642,227, filed Jan. 7, 2005; and Ser. No. 60/644,903, filed Jan. 19, 2005, which are all hereby incorporated herein by reference).

Such a laser scanning display device may provide enhanced display characteristics for enhanced viewing of the display at the reflective element by the driver of the vehicle. Typically, in order to use a laser to back light a display area (such as an area of about two cm square or thereabouts), the laser beam may be projected through an optic that broadens the beam to the desired size, whereby the intensity of the beam is reduced. An advantage of such scanning display technologies is the intensity of the display delivered, and thus its ability to be seen even under high ambient driving conditions (such as a sunny day). For example, should a standard backlit TFT LCD display be placed behind a transflective mirror element in the likes of an interior rearview mirror assembly, the front or first surface reflection off the front glass surface (typically around 4 percent of the light incident thereon) often far exceeds the intensity of the light transmitted through the transflective mirror reflective element used. Such transflective mirrors also reflect coincident with the reflection off the front surface, and thus further exasperate the washout of the display image being transmitted/emitted through the reflective element. Even if the reflective coating is locally fully removed to create a light transmitting window, reflectivity off the front glass surface often causes display washout and inability to appropriately read what is being viewed at the display. This is particularly problematic for video display (such as for the likes of a rear backup event or side lane maneuver event or the like).

Thus, one advantage of use of such a scanning display technology (such as described in further detail below) is that the full intensity of the laser is used, but by using the movable mirror/reflector of the microelectromechanical scanner (MEMS), the narrow point-like, super high intensity beam rapidly moves across the display image dimension at a rate that is faster than the eye/brain can register, such that the eye/brain perceives a continuous (or substantially continuous) super bright image. Thus, using the concepts of the present invention as described below, a full video image can effectively be projected through or on a surface of the rearview mirror reflective element in a manner not unlike what can be seen during outdoor laser displays or the like (such as when images and video is laser written on the sides of buildings or clouds or the like). Also, multiple lasers of the same color can be focused so that their beams coincide at roughly the same point on the MEMS reflector so that the intensity of any one image element as written is correspondingly enhanced.

Figure 5:
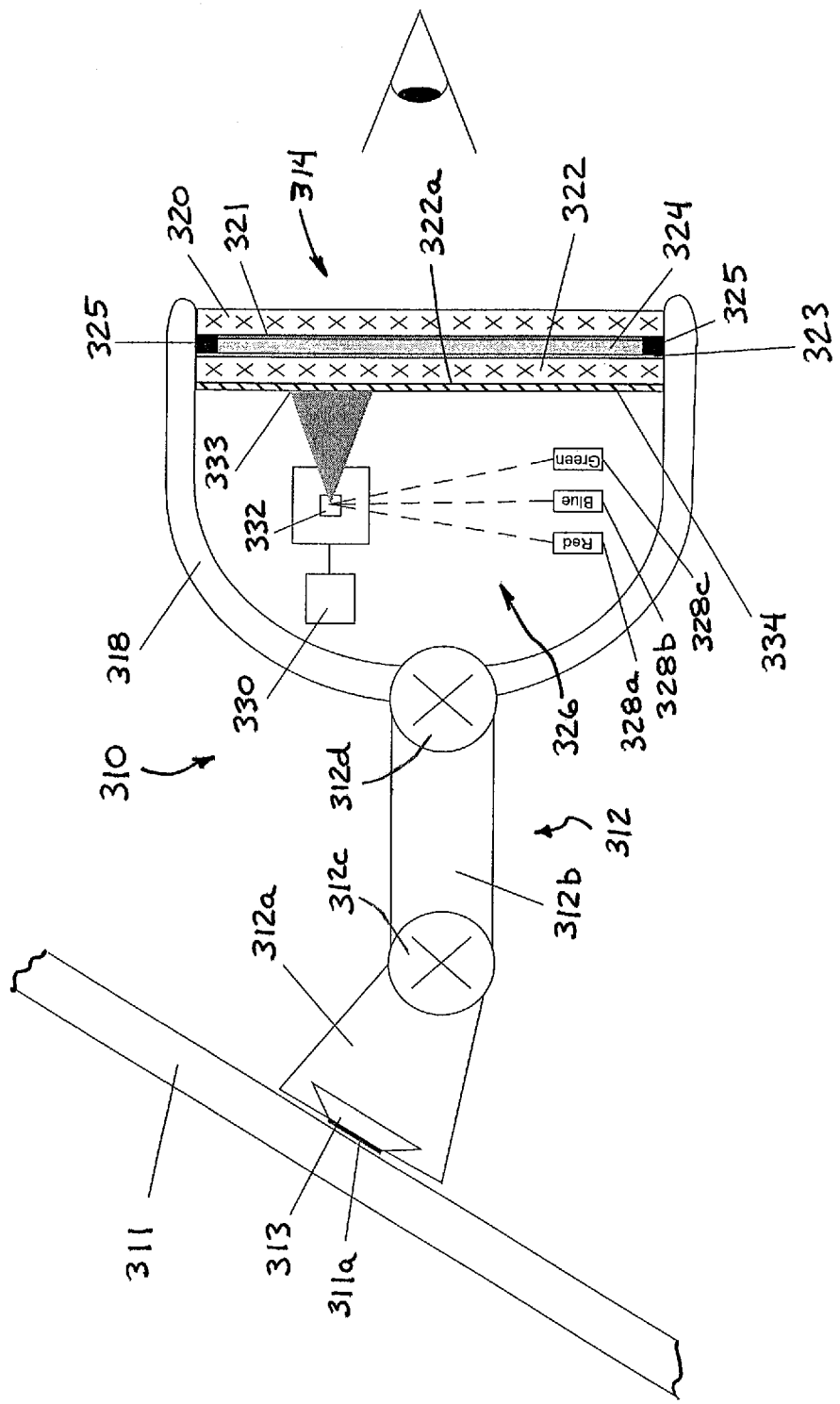
FIG. 5 is a sectional view of an interior rearview mirror assembly incorporating a laser display device in accordance with the present invention.

For example, and with reference to FIG. 5, an interior rearview mirror assembly 310 may be pivotally or adjustably mounted to an interior portion of a vehicle, such as via a double ball mounting or bracket assembly 312. For example, the bracket assembly 312 may include a mirror mount 312*a* that is mountable to a mounting button 313 adhered or bonded to an interior surface 311*a* of a vehicle windshield 311. The bracket assembly 312 may also include a mounting arm 312*b* that is pivotally attached to the mirror mount 312*a* at a first pivot joint 312*c* and that is pivotally attached to the mirror casing or mirror head at a second pivot joint 312*d*. Other means for adjustably mounting the mirror head to an interior portion of the vehicle may be implemented without affecting the scope of the present invention.

Mirror assembly 310 includes an electro-optic or electrochromic reflective element 314 supported at or in a housing or casing 318. The mirror assembly 310 includes a scanning display device 326 that is operable to display information (such as text, alphanumeric characters, icons, images, video images, or other indicia or information or the like) at the reflective element 314 for viewing by a driver of the vehicle.

Advantageously, display device 326 is housed behind (to the rear of) the mirror reflective element and thus is within mirror casing 318. Thus, the automaker may acquire and install mirror assembly 310 (with the scanning display capability included) across a variety of vehicle models and lines. Reflective element 314 includes a front substrate 320 and a rear substrate 322 and an electro-optic medium 324 disposed therebetween with a seal 325 encompassing the electro-optic medium, as is known in the electro-optic mirror arts. The front substrate 320 includes a transparent conductive coating or layer 321 at its rear surface (commonly referred to as the second surface of the reflective element), while the rear substrate 322 includes a conductive coating 323 at its front or forward surface (commonly referred to as the third surface of the reflective element).

The reflective element may comprise a transflective reflective element that allows light from the display device 326 to pass therethrough for viewing by the driver of the vehicle, such as by utilizing principles described in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; and/or Ser. No. 11/021,065, filed Dec. 23, 2004, now U.S. Pat. No. 7,255,451; and/or PCT Application No. PCT/US03/29776, filed Sep. 9, 2003; and/or PCT Application No. PCT/US03/35381, filed Nov. 5, 2003; and/or U.S. provisional applications, Ser. No. 60/630,061, filed Nov. 22, 2004; Ser. No. 60/629,926, filed Nov. 22, 2004; Ser. No. 60/531,838, filed Dec. 23, 2003; Ser. No. 60/553,842, filed Mar. 17, 2004; Ser. No. 60/563,342, filed Apr. 19, 2004; Ser. No. 60/644,903, filed Jan. 19, 2005; Ser. No. 60/667,049, filed Mar. 31, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004; and Ser. No. 60/609,642, filed Sep. 14, 2004, and/or PCT Application No. PCT/US03/40611, filed Dec. 19, 2003, which are all hereby incorporated herein by reference. Optionally, use of an elemental semiconductor mirror, such as a silicon metal mirror, such as disclosed in U.S. Pat. Nos. 6,286,965; 6,196,688; 5,535,056; 5,751,489 and 6,065,840, and/or in U.S. patent application Ser. No. 10/993,302, filed Nov. 19, 2004, now U.S. Pat. No. 7,338,177, which are all hereby incorporated herein by reference, can be advantageous because such elemental semiconductor mirrors (such as can be formed by depositing a thin film of silicon) can be greater than 50% reflecting in the photopic (SAE J964a measured), while being also substantially transmitting of light (up to 20% or even more). Such silicon mirrors also have the advantage of being able to be deposited onto a flat glass substrate and to be bent into a curved (such as a convex or aspheric) curvature, which is also advantageous since many passenger-side mirrors are bent or curved.

Display device 326 comprises a scanning beam display system that includes a plurality of laser light sources or diodes 328a, 328b, 328c, a controller 330 and a microelectromechanical scanner (MEMS) 332. The display device 326 is contained within the interior casing 318 of mirror assembly 310. The controller 330 receives and/or generates image signals that control the intensity, mix and on-time of the light output by the three laser diodes 328a, 328b, 328c. The controller 330 also establishes the coordinates for the movable elements of the MEMS assembly 332 so that the individual picture elements (pixels) of the displayed image (as displayed at the display area or region 333 at the reflective element 314) are created for view by the driver or other vehicular occupant. For monochrome (one-color) systems, only one laser diode source may be used. Optionally, for full-color displays, three light sources (e.g., red, green and blue) are modulated and merged to produce an image element of the appropriate color. Under the control of controller 330, a horizontal and vertical scanner or a single microelectromechanical scanner (MEMS) 332 directs the light beams received from laser diodes 328a, 328b, 328c, and projects them onto the rear of (and/or into the body of) mirror reflective element 314 to create the image viewed. Optics (not shown) may be included as desired to achieve the desired spatial and resolution dimensions displayed.

For example, mirrors and/or lens elements or other refractive or diffractive and/or reflective optical elements can be used to project the rapidly scanned beam or beams of light onto the rear of the mirror element (and/or into the body thereof) to create the image seen. Such a scanned-beam automotive mirror display can deliver very high resolution, very high intensity images, with the resolution being limited principally by diffraction and optical aberrations in the light sources used within the mirror casing. Optionally, the rear surface 322a of the rear substrate 322 of the reflective element 314 may include a diffuser coating or layer/combiner 334 or other diffuser means or the like, and the diffuser coating or layer or area may be over substantially the entire rear surface 322a or may be over only that portion of the rear or fourth surface rastered by light reflected off the MEMS 332 that creates the display image. Also, and optionally, diffuser coatings and/or layers/combiners may be included within the body of the mirror reflective element, such as on the third surface of the electro-optic reflective element.

Although illustrated as a transflective mirror element, the reflective coating may be locally removed from a non-transflective mirror element to create a window for viewing the display thereat or therethrough. The window region may include a diffuse coating and/or layer/combiner or the like, such as on the rear surface of the reflective element (such as if the reflective element is an electro-optic or electrochromic reflective element or a non-electro-optic or prismatic reflective element) or on the third surface (such as if the reflective element is an electro-optic or electrochromic reflective element), if desired.

The laser diodes may be rastered or scanned at a desired rate over the MEMS reflector so that a generally continuous image is created by reflection off the MEMS and onto/into and as viewed through the reflective element. In the illustrated embodiment, the laser diodes are positioned to project or emit or radiate their laser beams so that they are incident on the electromechanically moved portion of the MEMS and whereby the laser beams are reflected toward the reflective element by the MEMS reflector.

The MEMS 332 may be positioned within the casing and angled or oriented to reflect illumination or radiation from the laser diodes 328a, 328b, 328c toward the rear surface of the reflective element 314. The reflective surface of the MEMS 332 may be created on a chip, and may be adjusted to provide the desired projection or reflection angle through the reflective element 314 for viewing by a driver of the vehicle. The MEMS reflector may be electrically adjusted and/or electromechanically adjusted to provide the appropriate or desired information or icon or image for the laser beams to project onto and through the reflective element. The laser diodes 328a, 328b, 328c may comprise any laser diodes, such as, for example, laser diodes of the types commercially available from Cree Research Inc. of Durham, N.C., which offers different color laser diodes, such as visible red laser diodes and/or blue laser diodes, such as gallium nitride based blue lasers, and other colors as may be desired, such as, for example, green.

Because of the high intensity illumination provided by such laser diodes, the intensity at the display region of the reflective element will be sufficient to dominate the reflection of the rearward scene off of the front surface of the front substrate of the reflective element, and thus will not appear washed out, even during high ambient lighting conditions, such as on a sunny day or the like. Optionally, the intensity of the laser diodes may be adjusted, such as via manual adjustment and/or via automatic adjustment, such as in response to the ambient light levels in the cabin of the vehicle or in the vicinity of the display. The display information may be associated with any accessory or component or feature of the interior rearview mirror assembly or of the vehicle, such as point-to-point navigational instructions, status information for various functions, such as passenger side airbag status, tire pressure status and/or the like, or compass heading or temperature information or other information or the like.

Also, a video display and/or other information display may be located at the interior mirror assembly (or at a windshield electronics module/accessory module) that utilizes a Micro-Electro-Mechanical-Systems (MEMS) structure combined with thin film optics, such as is available Iridigm of San Francisco, Calif. under the tradename iMoD™ technology. This display technology (such as is described in U.S. Pat. Nos. 6,794,119; 6,741,377; 6,710,908; 6,680,792; 6,674,562; 6,650,455; 6,589,625; 6,574,033; 5,986,796 and 5,835,255, which are hereby incorporated herein by reference) is designed to deliver lower power consumption and excellent display image quality, and can withstand extreme temperatures and can be viewed in substantially any environment, including bright sunlight.

Although shown and described as being incorporated into an electro-optic or electrochromic interior rearview mirror assembly, it is envisioned that the scanning beam display system may be incorporated into a prismatic interior rearview mirror assembly or a transflective prismatic rearview mirror assembly (such as by utilizing principles described in PCT Application No. PCT/US03/29776, filed Sep. 19, 2003; U.S. patent application Ser. No. 11/021,065, filed Dec. 23, 2004, now U.S. Pat. No. 7,255,451; and/or Ser. No. 10/993, 302, filed Nov. 19, 2004, now U.S. Pat. No. 7,338,177, which are all hereby incorporated herein by reference). Optionally, the laser scanning beam display system may be incorporated into an exterior rearview mirror assembly without affecting the scope of the present invention. For exterior rearview mirror applications, the display system may function to display blind spot detection icons or information, or turn signals or security lights or the like, at the reflective element of the exterior rearview mirror assembly of the vehicle. For example, a non-electro-optic/fixed reflectivity reflector may use an elemental semiconductor mirror, such as a silicon metal mirror, such as disclosed in U.S. Pat. Nos. 6,286,965; 6,196,688; 5,535,056; 5,751,489 and 6,065, 840, and/or in U.S. patent application Ser. No. 10/993,302, filed Nov. 19, 2004, now U.S. Pat. No. 7,338,177, which are all hereby incorporated herein by reference, can be advantageous because such elemental semiconductor mirrors (such as can be formed by depositing a thin film of silicon) can be greater than 50% reflecting in the photopic (SAE J964a measured), while being also substantially transmitting of light (up to 20% or even more). Such silicon mirrors also have the advantage of being able to be deposited onto a flat glass substrate and to be bent into a curved (such as a convex or aspheric) curvature, which is also advantageous since many passenger-side mirrors are bent or curved.

Optionally, the display may comprise a laser emitter or laser diode or the like, which may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent application Ser. No. 10/225,851, filed Aug. 22, 2002, now U.S. Pat. No. 6,847,487; and/or U.S. provisional applications, Ser. No. 60/644,903, filed Jan. 19, 2005; Ser. No. 60/642, 227, filed Jan. 7, 2005; and/or Ser. No. 60/607,963, filed Sep. 8, 2004, which are hereby incorporated herein by reference).

The light emitting device, such as a laser diode or light emitting diode (LED) or the like (such as described in U.S. provisional applications, Ser. No. 60/644,903, filed Jan. 19, 2005; Ser. No. 60/642,227, filed Jan. 7, 2005; and/or Ser. No. 60/607,963, filed Sep. 8, 2004, which are hereby incorporated herein by reference), of the display may be controlled by a controller, which may modulate the intensity or on/off characteristic of the emitted light while the light emitting device or laser is rastered (or moved rapidly back and forth in generally horizontal or vertical scanning lines over a display area), in order to create the desired display via the points where the light emitting device is intensified or activated. Because the laser diode may be rastered at a high rate over substantially the entire display area but only activated/intensified at appropriate locations to form the desired display, the narrow point like, super high intensity beam (that is activated/intensified/modulated as the laser diode is rapidly moved across the display image dimension at a rate that is faster than the eye/brain can register) is perceived by the human eye/brain as a continuous (or substantially continuous) super bright image, even though only one light "dot" or beam may actually be present at a time at the display. A person viewing the display thus would see the display as the desired form or character and substantially constantly and brightly illuminated by the rastered and modulated laser diode.

Optionally, the light emitting device may be substantially constantly activated and directed/rastered toward a display window, such as a liquid crystal display (LCD) or the like, with a window established in the desired form, so that light emitted by the light emitting device (such as a laser diode, a light emitting diode (LED) or an organic light emitting diode (OLED) or the like) projects or shines through the display window/element, such that the display character or icon or information or video or the like is viewable at the reflective element by the driver of the vehicle. The display window may comprise a substantially transparent or translucent shape or character or icon or the like, with a darkened or substantially opaque area surrounding the window, such that light emitted by the light emitting device passes through or transmits through the window, but is substantially blocked or attenuated by the surrounding opaque area of the display. The LCD display may be operable to adjust the window and opaque regions to adjust or modulate or change or control the information being displayed by the light passing through the display. For applications where the light emitting device may be rastered at a high rate over substantially the entire display area (such as over the LCD), and with the illumination beam (such as the narrow point like, super high intensity beam of a laser emitting device) rapidly moving across the display image dimension at a rate that is faster than the eye/brain can register, the eye/brain perceives a continuous (or substantially continuous) bright image, even though only one light "dot" or beam may be present at a time through the display window. The light emitting device thus may be constantly or substantially constantly activated/energized, with the display being formed/created by the window through which the light passes as the light beam is rastered or scanned over the display device. A person viewing the display thus would see the display as the character of the display window as substantially constantly and brightly illuminated by the rastered laser diode or other light emitting device, such as an LED or OLED or the like.

Note that is desirable, and in many cases preferable, that the laser light source be only enabled when the MEMS unit is functioning and causing a rastering or the like of the reflected laser beam. This is to limit or substantially preclude or prevent the possibility of the laser beam being stationary for any prolonged period with a concomitant possibility of eye damage to viewer in the vehicle. Thus, the circuitry/software controlling activation/illumination of the laser light source can be tied to the circuitry/software controlling activation/movement of the movable reflector of the MEMS unit, such that should the system fail and the MEMS unit not move or cease rastering, then the laser source is extinguished/turned off so that danger to a viewer from laser eye burn or the like is obviated.

Optionally, a projected information display and/or virtual human machine interface (HMI) may be created at a surface of an interior mirror assembly or a windshield electronics module/accessory module utilizing a virtual data entry device system, such as is disclosed in U.S. Pat. Pub. No. 20020075240, published Jun. 20, 2002, which is hereby incorporated herein by reference. Thus, an optically generated image of a key-entry tablet or an input menu or user-actuation button/input or an icon or an informational message or the like can be projected, for example, onto a surface of the interior rearview mirror or elsewhere within the cabin of the vehicle. The projected image may include at least one input zone/user interface zone that is actuatable by an action performed thereon or thereat by a user. The system includes a sensor operative to sense the action performed on or at the at least one input zone, and to generate signals in response to the detected action. A control or processor in communication with the sensor is operable to process the signals for performing an operation associated with the at least one input zone.

For example, a template of the desired interface (such as a keyboard or input options or the like) may be projected onto an interface surface (such as the reflective element of the interior mirror assembly). The template is produced by illuminating an optical element (such as a holographic optical element) with a laser diode (such as a red laser diode or the like). Because the template functions only as a reference for the user and is not involved in the detection process, the template may optionally be printed at a desired surface, such as at a portion of the reflective element or casing of the mirror assembly (or at a casing or element of a windshield electronics module or accessory module or the like).

An infrared plane of light may be generated at and slightly spaced from and parallel to the interface surface. The light may be substantially invisible to the user and is positioned just a few millimeters away from the interface surface (such as along the first surface of the reflective element and a few millimeters toward the driver or toward the rear of the vehicle from the first surface of the reflective element). Accordingly, when a user touches a portion of the projected interface at the interface surface (for example, the first surface of the reflective element of the interior mirror assembly), light is reflected from the plane in the vicinity of the respective input or key that was "touched" and directed toward the sensor module.

The reflected light from the user interaction with the interface surface is received by or imaged onto an imaging array sensor, such as a CMOS image sensor or the like, in a sensor module. The reflected light may pass through an infrared filter before being imaged onto the CMOS sensor. The sensor control or processor or chip then may conduct a real-time determination of the location of the reflected light, and may be operable to track multiple reflection events substantially simultaneously, and can thus support both multiple inputs/keystrokes and overlapping cursor control inputs and the like. The micro-controller (which may be positioned in the sensor module) receives the positional information corresponding to the light flashes from the sensor control or processor, and interprets the events and communicates them through an appropriate interface to the appropriate external device or devices.

The projected interface and sensor system thus may provide a keypad or input interface at the reflective element for actuation/use by the driver or occupant of the vehicle. The keypad or input interface may be projected onto or at the reflective element only when it is desired to be used, such that the reflective element is substantially unaffected by the incorporation of the interface and sensor system at the interior rearview mirror assembly. The sensor may detect the input action performed/selected by the user and the control may then control or activate/deactivate or modulate or adjust the appropriate accessory or system or device of the vehicle.

The information or input interface that is projected may provide various inputs/actions, such as, for example, inputs for a video display of the vehicle (such as disclosed in U.S. Pat. Nos. 5,760,962 and/or 5,877,897; and/or PCT Application No. PCT/US03/40611, filed Dec. 19, 2003, and/or U.S. provisional applications, Ser. No. 60/630,061, filed Nov. 22, 2004; Ser. No. 60/628,709, filed Nov. 17, 2004; Ser. No. 60/614,644, filed Sep. 30, 2004; and/or Ser. No. 60/618,686, filed Oct. 14, 2004, which are hereby incorporated herein by reference), a communications system of the vehicle (such as disclosed in U.S. Pat. Nos. 6,717,524; 6,650,233; 6,243,003; 6,278,377 and/or 6,420,975, and/or PCT Application No. PCT/US03/30877, filed Oct. 1, 2003, which are hereby incorporated herein by reference), a navigational system of the vehicle (such as the types described in U.S. Pat. No. 6,477,464, and U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003, which are hereby incorporated herein by reference), light sources (such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253 and/or 5,669,698, and/or U.S. patent application Ser. No. 10/054,633, filed Jan. 22, 2002, now U.S. Pat. No. 7,195,381, which are hereby incorporated herein by reference) and/or the like. Optionally, different interfaces may be provided for different accessories or devices or functions, whereby the appropriate interface for a particular accessory or device or function may be selected by the user, and the desired particular function of that accessory or device may then be selected and activated or deactivated or controlled by "touching" the appropriate location at the surface (such as the first surface of the reflective element) upon which the interface keypad or input is projected.

Other types of displays or display elements or devices and controls for such displays or display elements or devices may be implemented with the imaging system of the present invention, without affecting the scope of the present invention.

The imaging system of the present invention may be utilized to identify particular traffic control signs or signage by their spectral signature as well as their geometric organization. For example, red octagons may be identified as stop signs, yellow triangles as caution signs, and the like, while black characters on a rectangular white background may be identified as a speed limit sign (in certain zones or regions or countries). These capabilities are a result of the present invention providing a significant reduction in the amount of data to be processed because the image forward of the vehicle is captured in a manner which preselects data. Preselection of data is accomplished by configuring the imaging device or sensor array, including the optics thereof, to consider the spatial, as well as the spectral, characteristics of light sources and objects in the captured images, such as via utilization of principles described in U.S. Pat. No. 5,796,094, which is hereby incorporated herein by reference.

More particularly, image processor 16 receives an input signal generated by imaging device 14 and interrogates or processes the imaging device output to detect traffic control signage in the captured image of the forward scene. The image processor 16 may identify what type of sign is in the captured image based on the geometrical shape of the sign, the size of the sign and the location of the sign relative to the vehicle or road. For example, the image processor may process the image to determine the location of the detected object or sign relative to the field of view of the imaging device or camera and, thus, relative to the vehicle and to the side of the road where such a sign is expected to be found (typically at the side of the vehicle that is opposite to the driver's side of the vehicle). The imaging processor may determine the shape, size, color and/or location of the detected sign or object via any suitable sign recognition and sign information delineation/discrimination algorithm/software utilized by the imaging system. Such software or algorithm may incorporate any suitable processing means, such as by utilizing aspects described in U.S. Pat. Nos. 5,550,677; 5,670,935; 5,796,094; 6,498,620; 5,877,897; 6,396,397; 6,353,392 and 6,313,454, and/or U.S. patent application Ser. No. 10/427,051, filed Apr. 30, 2003, now U.S. Pat. No. 7,038,577, which are hereby incorporated herein by reference. For example, the image processor may process the image via an edge detection algorithm or the like, such as described in U.S. Pat. Nos. 6,353,392 and 6,313,454, and/or U.S. patent application Ser. No. 10/427,051, filed Apr. 30, 2003, now U.S. Pat. No. 7,038,577, which are hereby incorporated herein by reference.

In a preferred embodiment, the imaging device comprises an imaging array sensor that is responsive to light and that includes colored filters or a filter array at or over the pixels of the sensor, such that the pixels are spectrally responsive to different colors of light, such as described in U.S. Pat. Nos. 5,550,677; 5,670,935; 5,796,094; 6,498,620; 5,877,897; 6,396,397 and 6,313,454, which are hereby incorporated herein by reference. The filters or filter array may be selected to provide enhanced recognition of colors within a selected spectral band or bands of light. The imaging device and the imaging system thus may have enhanced recognition of certain colors that may be expected to be used on the signs or signage of interest (or may have enhanced rejection of certain spectral bands that may not be used on signage of interest).

Such traffic control signage, such as speed limit signs, exit signs, warning signs, stop signs, yield signs and/or the like, is typically regulated and various types of these signs must have certain specified, standard geometric shapes (such as a triangle for a yield sign, an octagon for a stop sign and the like), and must be at a particular height and at a particular location at or distance from the side of the road, and must have a specific type/color of lettering on a specific colored background (for example, a speed limit sign is typically a predefined shape, such as rectangular or circular, and has alphanumeric characters or letters and/or numbers that are a contrast color to a background color, such as black letters/numbers on a white background, while an exit sign typically has a different shape and/or contrast colors, such as white lettering on a green background). The imaging device is arranged at the vehicle, preferably in the interior cabin and viewing through the windshield (and thus protected from the outdoor elements, such as rain, snow, etc.), with a field of view that encompasses the expected locations of such signage along the side of roads and highways and the image processor may process the captured image to determine if the captured images encompass an object or sign that is at the expected location and that has the expected size, color and/or shape or the like. Therefore, the imaging processor 16 may readily determine what type of sign is detected by its geometric shape, size, color, text/characters and its location relative to the imaging device and the vehicle.

Preferably, the image processing algorithm or software includes a sign recognition stage or step or portion or process or routine that processes the image to determine whether the detected sign or object is of interest and, if so, what type of sign is detected. Once the sign recognition stage is satisfied, the image processing algorithm or software proceeds or passes to a character recognition stage or step or portion or process or routine, where the image is processed further to determine or recognize the characters (such as alphanumeric characters, letters, numbers or icons or indicia or the like) printed or formed or established on the face of the sign, in order to determine the information conveyed by the characters or icons or indicia on the face of the sign. The processor involved thus may only be busied with the character recognition stage once the preceding sign recognition stage has recognized and determined that a speed limit sign (or other sign or signage of interest) within the field of view. The algorithm processed by the image processor may include false signal and/or error reduction routines and protection, whereby instances of errant or unintended/false readings of items or objects other than genuine signage are reduced or suppressed.

Once the type of sign is determined, the imaging system may process the characters (which may be alphanumeric characters or numbers or letters or icons or the like) printed or formed or established on the sign, and no further processing of the sign's size or shape or color or the like need be conducted. The imaging system thus may process the images only enough to determine the type of sign and to determine the characters or information on the face of the sign if necessary, such that reduced processing may be achieved in certain circumstances where the sign type is readily identifiable. For example, a stop sign may be readily identified by its shape and color, such that no further processing may be required to determine the sign type or the characters or information on the face of the sign.

It is further envisioned that the detected color of the characters and/or background may be compared to the regulation or specified sign colors for daytime and/or nighttime lighting conditions. For example, if the vehicle is traveling during high ambient light conditions (which may be determined by processing the output of the imaging device or via a separate ambient light sensor or the like), such as during the daytime, the imaging system may determine the type of sign detected in response to matching the detected sign color to the specified or regulated colors for the sign during daytime lighting conditions, while if the vehicle is traveling during low ambient light conditions, such as below approximately 200 lux or thereabouts, such as during nighttime, the imaging system may determine the type of sign detected by matching the detected sign color to the specified or regulated colors for the sign under headlamp or auxiliary lighting conditions such as typically occur at nighttime.

In different countries or regions, and even along different types of roads or highways, the signage regulations may be different, and the imaging processor may be adjusted accordingly to adapt to the different regulations. It is further envisioned that the imaging system may be automatically adjusted or adapted to the sign regulations in effect at the current location of the vehicle. The current location of the vehicle may be determined via a vehicular navigational system or global positioning system (GPS) or the like, such as the types described in U.S. Pat. Nos. 6,477,464; 5,924,212; 4,862,594; 4,937,945; 5,131,154; 5,255,442 and/or 5,632,092, and/or U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003, which are all hereby incorporated herein by reference.

Optionally, a user input may be provided to selectively input the location or zone or region of the vehicle to establish the appropriate setting for the imaging system. For example, a user may change from an "imperial" setting (such as used in the U.S.), where the numbers may be interpreted by the imaging system as being in miles per hour, to a "metric" setting, where the numbers may be interpreted by the imaging system as being in kilometers per hour, such as when the driver drives the vehicle from the U.S. to Canada. Optionally, if the vehicle has a global positioning system (GPS), the setting for a particular location or zone at which the vehicle is located may be automatically set to the appropriate units or setting in response to a signal from the global positioning system that is indicative of the current location or position of the vehicle. Other zones or regions may be selectively or manually input or automatically set to set or calibrate the imaging system for the particular zone or region or country in which the vehicle is traveling (where the numbers may be interpreted according to the units used in that zone or region or country and where the detected signs or objects are compared to the expected sign shapes, sizes, colors and the like of that zone or region or country).

Optionally, the expected or recognized or accepted sign size, shape, color, etc. may be looked up in a table or database or the like by the image processor, in order to determine if a detected sign or object is within the expected or specified parameters of a particular type of sign and, thus, to determine if the detected object or sign qualifies as a particular type of traffic control sign. For example, if the imaging system detects an object that is generally in the area and of the size of a traffic control sign, the system may further analyze the sign parameters in view of a table or listing or database of parameters of various signs along different types of roads or the like, in order to determine if the detected sign qualifies as one of the particular traffic control signs in the table or set of data. The imaging system thus may determine what type of sign has been detected by matching the parameters of the detected sign or object with the expected or specified parameters of one of the signs listed in the look-up table or database.

After the sign has been identified as a certain type of sign, further processing of the sign may commence to determine or read the characters or information on the face of the sign. The imaging processor 16 may further identify or read the characters on the detected sign via recognition of the shapes or geometries and arrangement of the characters on the sign, such as via utilization of the image processing and/or edge detection discussed above. For example, after the image processor has identified a detected sign as being representative of a speed limit sign, the image processor may determine what numbers are shown on the sign to determine the speed limit for the zone or area through which the vehicle is traveling. The imaging system knows that the characters "read" from the sign are for the speed limit (rather than for an exit number or a billboard advertisement or the like) based on the initial analysis of the sign's size/shape/color/location discussed above. The image processor then may generate an output to cause the display device to display information about the current speed limit as indicated by the detected sign and characters. For example, the display device may display the speed limit to the driver of the vehicle.

Optionally, the image processor 16 may receive an input signal from a vehicle speed sensor or sensing means 24, and may display the amount (such as in miles per hour or kilometers per hour or the like) that the vehicle is traveling in excess of (or under) the current speed limit. The speed sensor may comprise any type of sensor or sensing means for determining the speed of the vehicle, such as a wheel speed sensor, a global positioning system or the like. Optionally, the vehicle speed may be determined via processing of the images captured by the imaging device 14, such as via principles described in U.S. patent application Ser. No. 10/427,051, filed Apr. 30, 2003, now U.S. Pat. No. 7,038,577, and/or U.S. provisional application Ser. No. 60/638,687, filed Dec. 23, 2004, which are hereby incorporated herein by reference.

Optionally, a desirable display may comprise the actual vehicle speed shown at or near or adjacent to or side by side the actual posted and detected speed limit, in order to provide a visible display of the current speed and the posted or allowed speed limit. It is envisioned that the display may provide numbers or bars or icons or the like to indicate the vehicle speed and posted speed limit for such a display. The display may adjust the display of the speed and/or the posted speed limit (such as by increasing the intensity of the display or flashing the display or the like) if the vehicle speed is above (or below) the posted and detected speed limit by a threshold amount.

Optionally, one or both of the display elements may be highlighted or adjusted in a different manner depending on the driving condition encountered by the vehicle. For example, when the vehicle speed is within the specified threshold/tolerance of the posted speed limit, the display may be set at a particular intensity or color or the like (such as, for example, a green color), but when the vehicle speed is above the specified threshold or tolerance, the display may be adjusted to a different intensity (such as brighter) or color or the like (such as, for example, a red color). Similarly, when the vehicle speed is below the specified threshold/tolerance, the display may be adjusted to a different intensity or color or the like (such as, for example, a blue color). Other intensities or flashing or color changes or highlighting of one or more display elements may be implemented in response to the different driving/speed conditions encountered by the vehicle, without affecting the scope of the present invention.

Optionally, the image processor may provide an alert or warning to the driver when the vehicle speed exceeds a threshold amount over (or under) the posted (and recognized) speed limit. For example, the display device may flash or adjust the intensity of the displayed speed limit or the image processor may actuate an audible signaling device 26 to provide an audible warning, such as a beep or voice warning or the like, when the vehicle speed exceeds (or falls below) the posted and recognized speed limit by a threshold amount (such as approximately five or ten miles per hour above or below the posted limit or the like). For example, the imaging system may provide a higher pitch audible tone when the vehicle speed is above the posted speed limit (or at a threshold amount above the posted speed limit), and may provide a lower pitch audible tone when the vehicle speed is below the posted speed limit (or at a threshold amount below the posted speed limit). Other alerts or signals may be provided by the imaging system, such as tactile/haptic type alerts, such as a rumble or vibration of the seat or steering wheel or the like, without affecting the scope of the present invention. The desired threshold amount may be selectively entered by the driver, such as via a key pad, a touch pad, a voice receiver or the like, such that the imaging system may only provide such a warning when it may be desired by the particular driver of the vehicle. Optionally, it is envisioned that the operation of the vehicle may be influenced by the posted and detected speed limit, such as by a governor or the like that may limit the maximum speed of the vehicle to within a threshold amount above the posted speed limit.

Optionally, the image processor may provide an alert or warning when the detected and posted speed limit changes, such as when the vehicle moves from one speed zone (such as 55 miles per hour or the like) to another speed zone (such as 35 miles per hour or the like), so as to warn the driver to slow down (or to speed up if the later zone has a higher speed limit). For example, when a speed limit is detected that is lower (or higher) than the previously detected speed limit, the image processor may cause the display device to display the new speed limit, and may flash or otherwise change or enhance the display to draw the driver's attention to the display. Optionally, the display device may display a notice that the speed limit has changed, such as "Speed Limit Reduced—Slow Down" or the like. Optionally, the image processor may actuate an audible signaling device to provide a tone or beep or voice message to audibly communicate to the driver that the driving conditions have changed, or may actuate a tactile/haptic signaling device (or other type of signaling device) to provide a tactile or haptic signal (or other type of signal or alert) to the driver of the vehicle to communicate such changes in the driving conditions to the driver of the vehicle.

Optionally, the threshold amount over/under the posted and determined speed limit at which the alert is provided may be dynamic and thus may change depending on the determined speed limit. More particularly, the threshold amount over a posted speed limit may be greater for speed limit zones having higher speed limits, such as 55 miles per hour or above, while the threshold amount may be lower for speed limit zones having lower speed limits, such as 25 miles per hour or 35 miles per hour or less. For example, if the threshold amount is selected to be ten miles per hour over the speed limit when the speed limit is seventy miles per hour, the imaging system may dynamically adjust or reduce the threshold amount for lower speed limit zones, so that the threshold amount may be only, for example, three miles per hour for a 25 miles per hour zone. The imaging system thus may dynamically adapt to the driving conditions or speed limits or zones encountered by the vehicle, because what may be a safe and reasonable amount over a 65 miles per hour speed limit (such as five to ten miles per hour) may be much worse or less safe if applied to a slower zone, such as a 25 miles per hour zone or thereabouts.

The imaging system may also be operable to detect and recognize and read warning signs, such as at turns or hills or the like, or may detect and recognize and read other types of warning signage or the like. For example, the imaging system may detect a warning sign that indicates that a turn is approaching and that the safe speed of travel around the turn is reduced to a lower speed, such as, for example, 45 miles per hour for a turn located in a 55 miles per hour zone, or such as, for example, a reduced speed for an exit ramp off of a highway or freeway or the like. The imaging system may then display the reduced speed limit or reduced recommended speed to alert the driver of the slower speed zone and/or may then generate a warning signal or alert signal (such as a visible and/or audible and/or tactile/haptic signal) to the driver if the current vehicle speed is greater than the reduced or safe or posted speed (or substantially greater than the posted speed or at or above a threshold amount greater than the posted speed or the like). The driver may then be alerted to the potentially hazardous condition and may adjust the speed of the vehicle accordingly.

Optionally, the imaging system may be operable to detect and identify or recognize other types of signs. For example, the imaging system may be operable to detect and recognize a railroad crossing sign and to further recognize that the railroad crossing sign is activated (such as by distinguishing the flashing lights characteristic of a railroad crossing signal) due to an approaching train. The imaging system could then warn the driver that the vehicle is approaching a dangerous condition. Additionally, the imaging system may be operable to detect other signals, such as a school bus stopping signal or a pedestrian road crossing signal or the like. Optionally, the imaging system may be operable to detect road repair or road construction zone signs and may recognize such signs to distinguish when the vehicle is entering a road construction zone. The imaging system may display the reduced speed for the construction zone and/or may provide an alert to the driver of the vehicle that the vehicle is entering a construction zone and that the vehicle speed should be reduced accordingly. The imaging system thus may not only assist the driver in avoiding a speeding ticket, but may provide enhanced safety for the construction workers at the construction zone.

Optionally, the imaging system of the present invention may be associated with or cooperatively operable with an adaptive cruise control 28 (FIG. 2) of the vehicle, such that the cruise control speed setting may be adjusted in response to the imaging system. For example, an adaptive speed control system may reduce the set speed of the vehicle in response to the imaging system (or other forward facing vision system) detecting a curve in the road ahead of the vehicle (such as by detecting and recognizing a warning sign at or before such a curve). The vehicle speed may be reduced to an appropriate speed for traveling around the curve without the driver having to manually deactivate the cruise control. For example, the vehicle speed may be reduced to the amount of the reduced or safe limit shown on the warning sign or the like. The adaptive speed control may then resume the initial speed setting after the vehicle is through the turn or curve and is again traveling along a generally straight section of road.

Optionally, the adaptive speed control may adjust the speed setting of the vehicle in response to the imaging system recognizing and identifying a change in speed limit. For example, if the vehicle is initially traveling at seventy miles per hour in a 65 miles per hour zone, and the imaging system detects a reduced speed limit to 45 miles per hour, the adaptive speed control may reduce the speed setting to fifty miles per hour or thereabouts. The imaging system may also provide the alert or warning to the driver when the speed limit change is detected, as discussed above. The adaptive speed control may be any type of adaptive speed control, and may utilize aspects of the controls of the types described in U.S. patent application Ser. No. 10/427,051, filed Apr. 30, 2003, now U.S. Pat. No. 7,038,577, and/or U.S. provisional application Ser. No. 60/638,687, filed Dec. 23, 2004, which are hereby incorporated herein by reference, without affecting the scope of the present invention.

Although described above as being operable to determine the speed limit or reduced speed posted on a sign detected by the imaging system, the imaging system of the present invention may also process the captured images to determine characters on other types of signs as well, such as exit signs or the like. For example, the imaging system may be associated with or in communication with a navigational system, and may signal to the driver that the exit sign for a desired exit is approaching to limit or substantially preclude the possibility that the driver may miss the desired or targeted exit. The navigational system may comprise any type of navigational system, such as the types described in U.S. Pat. Nos. 6,477,464; 5,924,212; 4,862,594; 4,937,945; 5,131,154; 5,255,442 and/or 5,632,092, and/or U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003; and/or PCT Application No. PCT/US04/015424, filed May 18, 2004, which are all hereby incorporated herein by reference, without affecting the scope of the present invention.

Optionally, the imaging system may be operable to utilize data or information pertaining to a lane change and/or an exit sign or the like, and an adaptive cruise control system may adjust the speed of the vehicle or the acceleration of the vehicle in response to such lane divergent information and/or exit ramp information. For example, the imaging system may detect an exit sign along a freeway or the like, and may detect a lane change by the subject vehicle onto the exit ramp. The adaptive cruise control system may receive an input that is indicative of such detections and/or image processing, and may adjust the speed of the vehicle accordingly. For example, the adaptive cruise control system may decrease the speed of the vehicle and/or may inhibit acceleration of the vehicle in response to such detections/image processing, in order to limit or substantially preclude potentially hazardous conditions where the vehicle may accelerate to an unsafe speed on the exit ramp.

As discussed above, the imaging device and/or the display device may be positioned at or in an interior rearview mirror assembly of the vehicle. For example, the imaging device and/or the display device and/or the image processor may be positioned within a prismatic mirror assembly, such as a prismatic mirror assembly utilizing aspects described in U.S. Pat. Nos. 6,318,870; 5,327,288; 4,948,242; 4,826,289; 4,436,371 and 4,435,042, and PCT Pat. Application No. PCT/US04/015424, filed May 18, 2004, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003; U.S. patent application Ser. No. 10/709,434, filed May 5, 2004, now U.S. Pat. No. 7,420,756; and Ser. No. 10/993,302, filed Nov. 19, 2004, now U.S. Pat. No. 7,338,177, which are all hereby incorporated herein by reference, without affecting the scope of the present invention.

Alternately, for example, the interior rearview mirror assembly may comprise an electro-optic or electrochromic mirror assembly, which may utilize some of the principles described in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as described in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which is hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent application Ser. No. 10/054,633, filed Jan. 22, 2002, now U.S. Pat. No. 7,195,381; PCT Application No. PCT/US03/29776, filed Sep. 9, 2003; PCT Application No. PCT/US03/35381, filed Nov. 5, 2003; and/or PCT Application No. PCT/US03/40611, filed Dec. 19, 2003, which are all hereby incorporated herein by reference.

Optionally, the imaging device and/or display device and/or image processor may be positioned, for example, in or at or near an accessory module or windshield electronics module or console, such as the types described in U.S. patent application Ser. No. 10/355,454, filed Jan. 31, 2003, now U.S. Pat. No. 6,824,281; and Ser. No. 10/456,599, filed Jun. 6, 2003, now U.S. Pat. No. 7,004,593, and/or U.S. Pat. Nos. 6,690,268; 6,250,148; 6,341,523; 6,593,565 and 6,326,613, and/or in PCT Application No. PCT/US03/40611, filed Dec. 19, 2003, which are hereby incorporated herein by reference). Optionally, the imaging device may be positioned elsewhere in or at the vehicle, such as at or in the headliner of the vehicle or elsewhere at or in the vehicle, without affecting the scope of the present invention.

Optionally, the accessory module may include other accessories or circuitry therein, or may be associated with other accessories or circuitry of the interior rearview mirror assembly and/or of the vehicle. For example, the accessory module or mirror assembly may be associated with a proximity sensing device or antenna positioned along the interior surface of the windshield. The sensing device may detect the presence of an object, such as a raindrop or water droplets, at the exterior surface of the windshield and, thus, may function as a rain sensing device or rain sensor for sensing precipitation at the exterior surface of the windshield. The proximity sensing device may be positioned at an area of the windshield that is swept by the windshield wiper to clean the area.

The sensing device or antenna may detect the presence of moisture or precipitation when rain drops or condensation or the like are within its range of detection, and may generate an output signal in response to such a detection. The control may process the signals received from the sensing device to determine if an object indicative of rain drops or precipitation is detected or sensed at the windshield. The control may then actuate the windshield wipers of the vehicle in response to such indication. Optionally, the sensing device may sense the presence of objects, such as moisture, at the interior surface of the windshield and the control may process the signals to determine if the detected object is indicative of moisture at the windshield surface.

The control may actuate or control a blower motor or a control setting of a heating, ventilation and air conditioning (HVAC) system of the vehicle to defog the windshield and/or may close a sunroof or window of the vehicle when the control detects moisture on the surface of the windshield, such as by utilizing aspects of the rain sensors described in U.S. Pat. Nos. 6,516,664; 6,320,176; 6,353,392; 6,313,454; 6,341,523 and 6,250,148; and/or in U.S. patent application Ser. No. 10/355,454, filed Jan. 31, 2003, now U.S. Pat. No. 6,824,281; and Ser. No. 10/348,514, filed Jan. 21, 2003, now U.S. Pat. No. 6,968,736, which are hereby incorporated herein by reference. The proximity sensor may utilize the principles described in U.S. Pat. No. 5,594,222; and/or U.S. patent application Ser. No. 10/956,749, filed Oct. 1, 2004, now U.S. Pat. No. 7,446,924; and/or Ser. No. 10/933,842, filed Sep. 3, 2004, now U.S. Pat. No. 7,249,860; and/or PCT Application No. PCT/US03/40611, filed Dec. 19, 2003, which are hereby incorporated herein by reference.

Optionally, the proximity sensor may comprise a substantially transparent antenna or substantially transparent metallized antenna or substantially transparent conductor, such as a wire or wires embedded in the windshield or a conductive coating (such as indium tin oxide (ITO) or the like) on a window or panel surface, such as the interior surface of the windshield. The proximity sensor of the present invention thus may provide or span or interrogate a larger sensing area without obstructing the field of view of the driver or occupant of the vehicle. Optionally, the proximity sensor may comprise multiple sensors or sensing elements or a multi-element sensing array or matrix that is operable to interrogate the windshield surface over a large area of the windshield. By interrogating a large area of the windshield, the rain sensing system of the present invention may sample multiple small segments of the whole sensing area. Such samplings may enhance the system's ability to discern between large raindrops on the windshield and small raindrops or mist on the windshield and other non-precipitation items, such as dirt or dust or the like, on the windshield.

Optionally, the antenna or proximity sensor or sensors or sensing elements may be incorporated into or attached to or associated with a windshield electronics module or accessory module positioned generally at or against the interior surface of the windshield. For example, the sensing element or elements may be attached to or positioned at or molded in the wall of the module that opposes and/or engages the interior surface of the windshield. The sensing element or elements may be electrically connected to rain sensor or control circuitry within the accessory module or elsewhere within the vehicle, such as at an interior rearview mirror assembly or overhead console or instrument panel of the vehicle.

Alternately, the sensing element or elements may be attached to the interior surface of the windshield, such as via an adhesive, such as via an adhesive tape such as a double sided adhesive tape or the like. The sensing element or elements thus may be positioned along the windshield surface without having to press the sensing element against the windshield surface to optically couple the sensing element to the windshield surface, as is often required in connection with many known rain sensing imaging devices.

The sensing element or elements of the present invention thus may be readily attached to the windshield surface, or may be formed on the windshield surface or may be embedded into the windshield, or may be incorporated into a windshield electronics module or accessory module at the windshield, without having to press the sensing element against the windshield surface. The sensing element or elements may be substantially transparent or not readily discernible by a driver or occupant of the vehicle, so that the sensing elements may cover and/or interrogate a large area of the windshield to provide enhanced sensing capabilities, without obstructing the field of view of the driver or occupant of the vehicle. The sensing element or elements may be implemented in conjunction with a rain sensor control that is operable to process signals from the sensing elements and to control a windshield wiper of the vehicle or a blower of the vehicle or an HVAC system of the vehicle or a defogger of the vehicle or a window or sunroof of the vehicle (such as to close the window or sunroof when rain is detected) or the like, in response to the signal processing.

Optionally, the accessory module and/or the interior rearview mirror assembly may include a forward facing braking indicator that is actuatable in response to a braking of the subject vehicle. The forward facing braking indicator may be viewable by a driver or occupant of a leading vehicle and may indicate to the driver or occupant of the leading vehicle that the subject vehicle approaching them is braking. The indicator may be in communication with a brake system of the vehicle, such as to a brake switch at the brake pedal or the like, and thus may indicate when the brakes are applied by the driver of the subject vehicle. The indicator may be operable in conjunction with the brake system and/or independently of the brake system (such as in response to a deceleration sensor or the like), and may utilize the principles described in U.S. Pat. Nos. 6,124,647; 6,291,906 and 6,411,204, which are hereby incorporated herein by reference.

The indicator thus alerts the other drivers or people in front of the subject vehicle that the vehicle is braking and, thus, may be highly useful at intersections with two, three or four way stops or the like. The indicator may be at or near or associated with an accessory module or windshield electronics module or console or interior rearview mirror assembly or the like of the vehicle and may be readily viewable and discernible by a person outside of and forwardly of the subject vehicle. The control may adjust or modulate the indicator to enhance the viewability or discernibility of the indicator, such as flashing or increasing the intensity of the indicator, such as in response to rapid or hard braking or the like of the subject vehicle or in response to a proximity or distance sensor detecting that the subject vehicle is within a threshold distance of another vehicle and/or is approaching the other vehicle at or above a threshold speed, such as described in U.S. Pat. Nos. 6,124,647; 6,291,906 and 6,411,204, which are hereby incorporated herein by reference.

Optionally, the imaging device may be associated with an accessory control system, such as a headlamp control system or the like. The imaging device may capture images of the field of view forwardly of the vehicle and the control may process the images and adjust a headlamp setting in response to such processing. Examples of such automatic headlamp control systems are described in U.S. Pat. Nos. 5,796,094; 6,097,023 and 6,559,435, and U.S. patent application Ser. No. 10/421,281, filed Apr. 23, 2003, now U.S. Pat. No. 7,004,606.

Optionally, the headlamp control may adjust a direction of the headlamps in response to such image processing. For example, the control may process the captured images to identify headlamps of oncoming vehicles and/or taillights of leading vehicles and may adjust the downward angle of the headlamps in response to such identification. The headlamps may be adjusted based on the identification of the headlamps or taillights and a predetermined or learned knowledge of the location of headlamps or taillights on vehicles, in order to adjust the headlamps to a desired or appropriate downward angle.

Optionally, the headlamps may be adjusted to compensate for vehicle loading so that the headlamps are directed in a desired direction regardless of the forward pitch or angle of the vehicle. For example, a forward (or rearward) edge of the low headlamp beam in front of the vehicle (such as at the road surface in front of the vehicle) may be identified and, based on the location of the detected edge or distance to the detected edge, the control may determine the loading angle or pitch of the vehicle. The control may then raise or lower the headlamp angle accordingly, so that the headlamp angle is set to approximately the desired direction regardless of the pitch or angle of the vehicle.

Optionally, the control may be operable to process the captured images to determine undulations in the road on which the vehicle is traveling and may utilize the processed information to determine the angle of the vehicle and the valleys and peaks in the road. The control may then adjust the headlamp beam angle and/or direction according to the detected undulations in the road. The control may be operable in conjunction with a forward facing imaging device and/or a rearward facing imaging device and may be operable in conjunction with or may be incorporated in a lane change assist system or lane departure warning system or the like, such as the types described in U.S. Pat. Nos. 5,929,786 and/or 5,786,772, and/or U.S. patent application Ser. No. 10/427,051, filed Apr. 30, 2003, now U.S. Pat. No. 7,038,577; and Ser. No. 10/209,173, filed Jul. 31, 2002, now U.S. Pat. No. 6,882,287, which are hereby incorporated herein by reference.

Optionally, the control may process the captured images to detect headlamps of oncoming vehicles and to steer or direct the headlamp beams at least partially away from the detected oncoming vehicle. For example, the control may determine that an oncoming vehicle is approaching the subject vehicle in a lane that is to the left of the subject vehicle, and may steer the headlamp beams inboard or to the right to limit or reduce directing the headlamps into the eyes of the driver of the oncoming vehicle. The control thus may steer the headlamp beams inboard (or may steer the outboard or left headlamp beam inboard while keeping the right or opposite headlamp beam at the initial direction) when oncoming traffic is detected to limit glare to the drivers of the oncoming vehicles. In situations where the oncoming traffic is located to the right of the subject vehicle, the control may steer the headlamp beams (or the right headlamp beam while keeping the left or opposite headlamp beam unchanged) inboard or to the left to limit the glare to the drivers of the oncoming vehicle or vehicles. The steering of the headlamp beam or beams may be done in conjunction with the switching of the beams to a low beam setting, or may be done independently of the high/low beam setting of the headlamps.

Optionally, the control may process the captured images and may control or adjust a louver or filter or the like to direct the headlamp beams in a desired or appropriate direction. For example, a louver or baffle or slats or the like may be positioned in front of the headlamps, and the slats of the louver may be angled and adjusted to adjust the amount of light that passes through the louver. The louver slats thus may adjusted to an increased angle, such as a downward angle, relative to the headlamps to reduce the amount of light that passes through the louver (and thus that is visible in front of the vehicle) and thus to reduce the range of the headlamps. The louver control thus controls or adjusts the visible intensity and range of the headlamps, and may be operable to do this in response to a detection of oncoming traffic or a detection of leading traffic or any other input or detection, without affecting the scope of the present invention.

Optionally, the control may be operable to process the captured images to detect objects in front of the vehicle or forwardly of the vehicle and may control or adjust the display to indicate that an object is detected. For example, and particularly during nighttime driving conditions, the control may process the captured images captured by the forward facing imaging device to detect objects of interest that are in the forward field of view of the imaging device. The imaging device may utilize night vision principles, and may be operable in connection with an auxiliary light source or infrared radiation source to enhance the night vision capabilities of the imaging device. When an object of interest is detected, the control may process the image to extract the object data and may determine a distance to and location of the detected object relative to the vehicle and the projected path of the vehicle to further determine if the object is a threat to the subject vehicle, such as an animal moving toward or standing in the road ahead of the vehicle but not yet viewable/discernible to the driver of the vehicle.

If the detected object is also determined to be a threat or danger to the vehicle, such as a deer at the side of the road or on the road ahead of the vehicle but not yet viewable/ discernible by the driver of the vehicle, the control may adjust or actuate or control a display device or element to display the detected object to the driver or may otherwise alert the driver of the potentially hazardous condition ahead. Optionally, the control may extract the object data or image data of the object (without the image data of the rest of the captured image) and may present the object image to the driver, or may identify the object and present an icon or indicia or message that indicates to the driver what the particular detected object is that is ahead of the vehicle. The control may control a display at the interior rearview mirror assembly or at an accessory module or the like, or may control a heads up display (HUD) that is operable to display the object or indicia in front of the driver and in the driver's field of view, so that the driver is aware of the detected object. Preferably, the control may display only the detected object (such as an image of a detected deer that is extracted from the captured image) at a location in the driver's field of view that generally or substantially corresponds to the location at which the object is actually positioned in front of the vehicle. Because the other image data is not projected or displayed, the driver is only notified of or alerted to the particular detected object or objects which the control determines present a hazardous condition (such as in response to the size of the object, the location of the object, the speed of the vehicle and/or the object, the direction of travel of the vehicle and/or the object, and/or the like).

In order to properly position the image of the object in the driver's field of view, such as via a heads up display, the control may also be operable in conjunction with an occupant detection system or cabin imaging system or the like that is operable to detect and determine the head position of the driver of the vehicle. The cabin imaging system thus may detect the head position of the driver, and the control may determine the appropriate location for the object image in the heads up display in accordance with the driver's head position.

Optionally, the control may be operable in conjunction with or may be incorporated into a lane departure warning system or the like, and may detect and identify lane markers along the road lane in front of the vehicle. The imaging device may be operable to detect or capture images of the lane markers in situations where the driver may not readily do so, such as in darkened or nighttime conditions or when there is glare on the road surface. The control may identify the lane markers in the captured images and may extract (via image processing) the lane marker data from the captured images or captured image data, and may project the lane marker images via a heads up display so that the driver may view the lane markers in the heads up display, where the lane marker image in the heads up display in the driver's field of view substantially corresponds to the actual location of the lane markers on the road surface.

In order to properly position the image of the lane markers in the driver's field of view, the control may be operable in conjunction with an occupant detection system or cabin imaging system as described above to determine the driver's head location. It is further envisioned that the control may adjust the display of the lane markers to indicate a lane drift or departure by the vehicle. For example, the lane marker images may be flashed or enhanced, such as by increasing the intensity or changing the color of the lane marker images, when such a lane drift is detected. The driver of the vehicle thus may be alerted to a lane change or drift or departure by adjusting the heads up display of the lane markers to draw the driver's attention to the lane markers without providing other unnecessary information to the driver. The lane departure warning system may utilize the principles described in U.S. Pat. Nos. 5,929,786 and/or 5,786,772, and/or U.S. patent application Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or U.S. provisional application Ser. No. 60/638,687, filed Dec. 23, 2004, which are hereby incorporated herein by reference.

Figure 6:
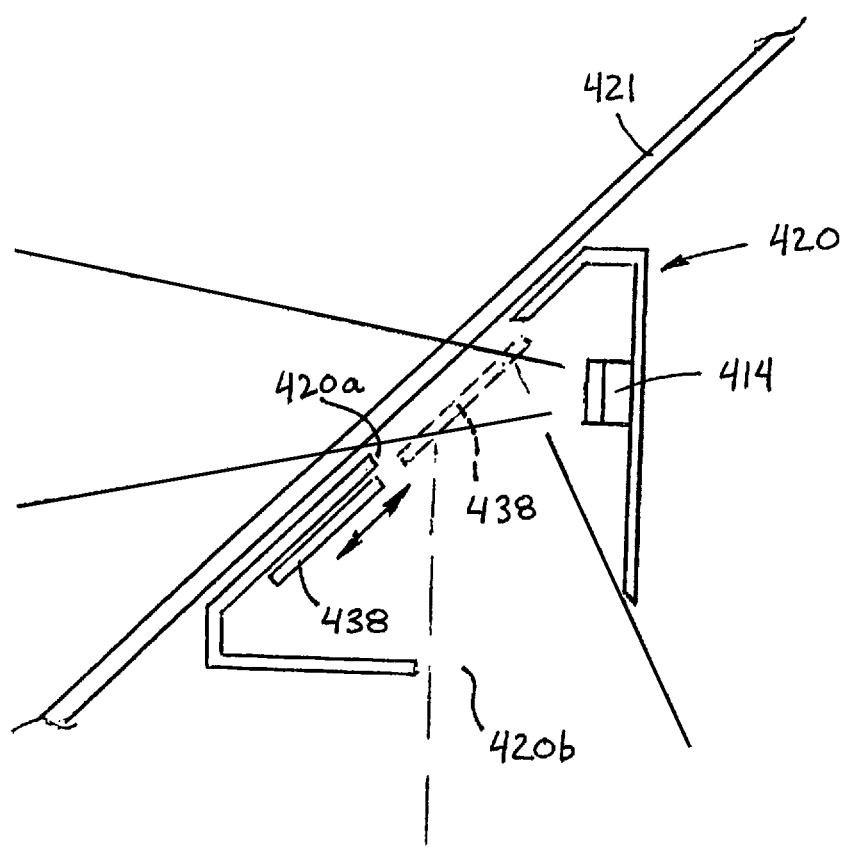
FIG. 6 is a sectional view of an accessory module having an imaging device in accordance with the present invention.

Optionally, the imaging device may be selectively operable to provide a forward facing field of view and a rearward facing field of view or cabin viewing field of view. For example, and with reference to FIG. 6, a forward facing imaging device 414 may be positioned within an accessory module or pod 420 and may be directed generally forwardly to provide a forward field of view through the windshield 421 of the vehicle. The accessory module 420 may include a movable reflector 438 that may be selectively moved relative to the imaging device 414, such as along the windshield and in front of the imaging device as shown in FIG. 6, to reflect an image of the cabin of the vehicle to the imaging plane or array of the imaging device. The accessory module may include a window or opening 420a at the windshield or toward the windshield for receiving images of the scene forwardly of the vehicle therethrough, and may also include a window or opening 420b along a lower or rearward side or portion of the module for receiving images of the scene occurring within the vehicle cabin therethrough. Although shown in FIG. 6 as reflecting an image from generally below the module to the imaging device, clearly, the angle of the movable reflector may be adjusted or selected to provide a more rearwardly directed field of view, depending on the application of the imaging system. For example, the angle may be selected to provide a generally rearward field of view for use with a backup aid or rear vision system, or the angle may be selected to reflect images from one side of the module, such as for use with an occupant detection system or a head position detection system or the like.

The movable reflector 438 may be selectively moved between a removed position (as shown in FIG. 6), where the imaging device has a forward field of view and is operable to capture images of the scene occurring forwardly of the vehicle (such as for headlamp control, rain sensing, object detection and the like), and a reflecting position (as shown in phantom in FIG. 6), where the imaging device receives the reflected image of a rearward view or of the cabin of the vehicle (such as for a backup aid or reverse imaging system or a cabin monitoring system or head position sensing system or the like). The movable reflector may be slidably moved along a portion of the accessory module or may be pivoted or otherwise moved between the removed position and reflecting position. The movable reflector may be moved between the positions automatically, such as in response to activation of a forward imaging system or a cabin imaging system or a backup aid, or may switch between the positions to provide the desired or appropriate head location data for use in conjunction with a forward imaging system and display, such as described above. Alternately, it is envisioned that the imaging device may be selectively movable to be directed forwardly through the windshield or toward a stationary reflector for capturing images of the cabin or rearward of the mirror assembly or accessory module, without affecting the scope of the present invention.

Optionally, the imaging system may be operable to determine the temperature at the imaging device, in order to determine or approximate the operating temperature of the imaging device. Although it is known to monitor the operating temperature of an imaging device in order to manage or allow for thermal shutdown of the imaging device to avoid overheating of the device, such systems or devices typically include separate temperature sensors positioned at or nearby the imaging sensor to determine the surrounding temperature. According to an aspect of the present invention, the imaging device, which comprises an imaging array having an array of photo-sensing pixels, may be operable to approximate the operating temperature based on the dark current of some of the pixels of the imaging array. More particularly, one or more pixels of the imaging array may be masked so that little or no light reaches the pixel. Because the changes in dark current (the current through the pixel when no light is received by the pixel) is generally proportionate to the changes in temperature of the pixel, a measurement of the dark current, in conjunction with a precalculation and/or relationship of the dark current and temperature, may provide an indication or approximation of the temperature at the pixelated array.

The control of the imaging system thus may be operable to shut down the imaging array sensor or shut down other electronic components of the control system or imaging system in response to the calculated or approximated or estimated temperature being greater than a predetermined threshold that is indicative of a temperature threshold for safe or effective operation of the imaging device and system. Optionally, the control may be operable to correct or adjust the sensor or system in response to detection or calculation of a threshold temperature, in order to correct or compensate for the increased temperature at the imaging sensor to enhance the performance of the imaging system or control system.

Optionally, the accessory module and/or interior rearview mirror assembly or system of the vehicle may include a hands free phone system, and thus may include the interface driver, microphone or microphones, user inputs, speech recognition system and/or the like. An example of such a system is described in PCT Application No. PCT/US03/40611, filed Dec. 19, 2003, which is hereby incorporated herein by reference. The audio signal from the system of the module or mirror assembly is preferably linked to the radio head, such as to a plug or connector at the radio head that accepts external audio signals and mute signals. The system thus may mute the audio and effectively take over the speakers when the phone is in use. This connection to the vehicle audio or radio or speaker system may utilize a communication link, such as a BLUETOOTH® communication protocol or link or the like. The signals from the mobile or cellular phone to the mirror assembly or accessory module may be communicated via a BLUETOOTH® link, while the signals from the mirror assembly or accessory module to the radio head may also be communicated via a BLUETOOTH® link. The mirror assembly or accessory module may also include a display, such as a transflective or display on demand display, to display at least some of the phone information, such as the number dialed, the incoming number, the status of the call, strength of signal, phone book, messages, and/or the like. Although described as utilizing a BLUETOOTH® communication link or protocol, other communication protocols or links may be implemented, such as other short/restricted range radio frequency (RF) or infrared (IR) communication protocol or link.

Optionally, a communication link between an accessory module or windshield electronics module and the interior rearview mirror assembly may be provided wirelessly and/or along and/or through the mounting arm of the mirror assembly. For example (and as described in U.S. patent application Ser. No. 10/456,599, filed Jun. 6, 2003, now U.S. Pat. No. 7,004,593, which is hereby incorporated herein by reference), the communication link may be via an infrared transmitter and receiver at the respective module and mirror assembly. Optionally (and as described in U.S. patent application Ser. No. 10/964,512, filed Oct. 13, 2004, now U.S. Pat. No. 7,308,341, which is hereby incorporated herein by reference), the communication link may be a two way link with the signals being communicated along the same wiring. Optionally, the mounting arm of the mounting assembly may include a passageway therethrough for routing an accessory wiring or the like through the arm to provide electrical communication between the circuitry or accessory of the mirror assembly and the circuitry or accessories or power source of the accessory module or of the vehicle. For example, the mounting assembly may utilize principles described in U.S. patent application Ser. No. 10/032,401, filed Dec. 20, 2001, now U.S. Pat. Publication No. US2002/0088916, published Jul. 11, 2002, now U.S. Pat. No. 6,877,709; and/or U.S. patent application Ser. No. 10/933,842, filed Sep. 3, 2004, now U.S. Pat. No. 7,249,860; and/or PCT Application No. PCT/US2004/015424, filed May 18, 2004; and/or U.S. provisional applications, Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference, or may utilize electrical connection principles of the type described in International Publication No. WO 2003/095269, published Nov. 20, 2003, which is hereby incorporated herein by reference. Optionally, the mounting arm passageway may allow for infrared or visible light to be transmitted along the tube or arm to communicate signals to or from the mirror assembly. In such applications, the arm or mounting assembly may include reflectors or mirrored surfaces to guide and reflect the light between the source and receiver, and may adjust the reflectors to accommodate adjustment of the mirror head assembly relative to the mounting base. The mounting arm thus may provide a light conduit or path or pipe for light signals to be communicated or guided or directed to provide communication between the accessory module or pod and the interior rearview mirror assembly. Other means for providing electrical power and/or control to the circuitry and/or accessories of the mirror assembly may be implemented without affecting the scope of the present invention.

Optionally, the vehicle or the rearview mirror assembly or accessory module of the vehicle may include a communication system or interface system that is operable to communicate with a remote or external control or base or center of a telematic system, such as ONSTAR®, TELEAID™, RESCU® or the like, or with any other remote computerized server or database or information provider or the like. The data captured by an imaging device of the vehicle (such as a rearward facing imaging device or a cabin monitoring imaging device or a forward facing imaging device or another vehicle-based imaging device or camera) may be communicated to the communication system (the communication system may be at the camera device or the signals may be communicated to the communication system remote from the camera, such as via vehicle wiring or via a local wireless communication or the like), whereby the communication system may communicate the image data to the external control of the telematic system. The image data may be processed by the processor at the external control and a signal indicative of such image processing may be communicated from the external control to the communication system of the vehicle, where the appropriate information may be displayed or otherwise communicated or conveyed to the driver or occupant of the vehicle.

In some known imaging systems for vehicles, image data is communicated from the vehicle camera to a microprocessor in the vehicle where the image data is processed. Such a system typically requires connection of the camera and microprocessor and display or alert device via wires or local wireless connections and requires in vehicle processing and connections. Such a system is typically not conducive for sharing information gathered from the image processing with other systems or devices or vehicles.

The communication system of the present invention receives the image data and uploads the image data to the external control for processing. Optionally, the vehicle communication system may conduct a data compression routine to compress the image data prior to uploading the data to the external control. For example, the vehicle communication system may compress the data and upload the compressed data using "burst" technology (where compressed data are transmitted or communicated to a satellite or the like in short (such as, for example, about twelve milliseconds or thereabouts) signals or bursts) to convey large amounts of data to the external control. The external control may then process the image data and extract the desired or relevant information from the image data and may communicate a signal back to the vehicle that is indicative of the extracted information.

The communication system and telematic system of the present invention thus may harness the processing power of the external control, which may be substantially greater than the processing power of a vehicle-based microprocessor. The external control may receive the image data and may recognize that the data is being communicated from a particular vehicle. In applications where the vehicle includes a global positioning system (GPS), the external control may receive and process the image data and may receive an input that is indicative of the vehicle location. The external control thus may process the image data and location data to extract information and provide an output that may be relevant to the location of the vehicle. For example, the external control may process the image data and may determine the speed limit signage information in the appropriate units based on the vehicle location, such as described above.

The external control may also receive location data from other vehicles and thus may know the location of other vehicles relative to the subject vehicle. For example, if the vehicle-based imaging device is for an adaptive cruise control system, the external control may receive the forward viewing image data and may receive data indicative of the vehicle location. The external control may also receive location data from other vehicles and thus may know the relative location and movements of other vehicles. If, for example, the subject vehicle is approaching a curve in the road and another vehicle is approaching in the opposite direction from around the curve, the external control may communicate a signal to the subject vehicle that is indicative of the location of the other vehicle. For example, the external control may provide a signal to the vehicle whereby an alert or warning or display device of the vehicle operates to alert or warn the driver of the subject vehicle as to the location of the approaching vehicle, in order to reduce or avoid vehicle collisions.

Optionally, the imaging system of the vehicle may be associated with an adaptive front lighting (AFL) system. The imaging system may also be associated with a lane departure warning system or side object detection system or lane change assist system or the like. The imaging device of the imaging system may be a forward facing imaging device or camera that is operable to capture images of a forward field of view. The control or microprocessor (or external control of a telematic system or the like) may process the image data to identify lane markers and other objects of interest in the forward field of view, such as by utilizing the principles described in U.S. Pat. No. 5,929,786, and/or U.S. patent application Ser. No. 10/427,051, filed Apr. 30, 2003, now U.S. Pat. No. 7,038,577; and/or Ser. No. 10/209,173, filed Jul. 31, 2002, now U.S. Pat. No. 6,882,287, and/or U.S. provisional application Ser. No. 60/638,687, filed Dec. 23, 2004, which are hereby incorporated herein by reference.

For example, the lane departure warning system may process the image data to detect the lane markers along the road surface in front of the vehicle. The lane departure warning system may detect a curvature in the road as the lane markers (or other characteristics, such as a curb or shoulder of the road) curve in front of the vehicle (such as by utilizing principles described in U.S. provisional application Ser. No. 60/638,687, filed Dec. 23, 2004, which is hereby incorporated herein by reference). Such road curvature information extracted from the image data may be used as an input or feed signal to the headlamp control system, which may adjust or control the headlamps to direct the headlamp beam toward one side or the other of the vehicle, in order to generally follow the curve of the road in front of the vehicle and, thus, to generally follow the anticipated path of the vehicle.

Typically, a lane departure warning system is interested in and may principally monitor the near field of view of the imaging device, such as, for example, about ten to twenty feet in front of the vehicle, while an intelligent headlamp control system and/or an adaptive front lighting system may principally monitor a further or far field of view of the imaging device. The processor thus may process different areas of the captured image data for the different applications. For example, the processor may process the captured image data in a frame-by-frame manner, and may process different areas of the image to extract different information for some of the frames (such as by utilizing the principles described in U.S. provisional applications, Ser. No. 60/630,061, filed Nov. 22, 2004; Ser. No. 60/628,709, filed Nov. 17, 2004; Ser. No. 60/614,644, filed Sep. 30, 2004; and/or Ser. No. 60/618,686, filed Oct. 14, 2004, which are hereby incorporated herein by reference).

Thus, if the imaging device captures frames at a rate of about thirty frames per second (or other frame rate depending on the particular application and system capabilities and the like), the processor may process different frames for different functions or systems or the processor may selectively process a given frame or frames for more than one functionality or feature. For example, every third frame may be processed for the lane departure warning system, while every fifth frame may be processed for the adaptive front lighting system, while every second frame may be processed for the intelligent headlamp control system. Alternatively, any one frame or sets of frames may be processed for intelligent headlamp control only, while other frames or sets of frames may be processed for lane departure warning and/or adaptive front lighting. The microprocessor thus may process different portions or areas of the image data for different functions or systems of the vehicle. The less relevant image data from the particular sets of frames thus may be processed less by the microprocessor so that the microprocessor has reduced or focused processing of the image data sets that is focused on the particular area of the image data that is relevant to the particular system or function for that particular frame or set of frames. Optionally, different processors may process the image data or may process different frames of image data captured by the imaging device or camera. Optionally, the reduced processed frame data may accumulate over several frames to provide a history and/or content/background for a given functionality, such as for an adaptive front lighting system.

Thus, a single camera and optical system can provide at least triple functionality, such as intelligent headlamp control, lane departure warning, and adaptive front lighting. For example, the image data captured by a single forward facing camera and associated lens and optical system can be processed and the information extracted can be used to control the headlamps on/off or high beam/low beam settings, to detect and monitor lane markers, and to provide an input or feed to a headlamp controller that may adjust or redirect the headlamp beam for an adaptive front lighting system.

Desirably, the system may intelligently process the image data and harness the processing power and frame rate to provide enhanced dynamic processing of image data depending on the particular lighting conditions. For example, the system may bias the processing toward extracting information from the image data for the headlamp control when the ambient lighting conditions are reduced, such as at nighttime, and may bias the processing toward extracting information from the image data for the lane departure warning system when the ambient lighting conditions are increased, such as during daytime or other conditions when it is less likely that headlamp control is needed. The processor or imaging system thus provides dynamic processing of the captured image data to enhance the performance of the associated headlamp control function, adaptive front lighting function and lane departure warning function.

Optionally, a rearview mirror and/or accessory module or windshield electronics module of a vehicle may include or may be associated with a storage medium for storing digital data or the like. For example, the mirror or module may include circuitry or accessories to record data (such as music from an iPod or MP3 player or the like) to a memory card and/or disc or other storage medium, such as a mini hard drive, or the like. For example, the rearview mirror assembly or accessory module may include a hard disc drive (HDD) electronic mass storage device, such as a HDD microdrive, such as a one-inch (or smaller) HDD, such as the types developed by Hitachi Global Storage Technologies, Inc. (HGST) of the United States, Hoya Corp. of Japan, and Seagate Technology LLC, and such as described in U.S. patent application Ser. No. 10/933,842, filed Sep. 3, 2004, now U.S. Pat. No. 7,249,860, which is hereby incorporated herein by reference. The data that is stored in the storage medium may then be "played" by the system and streamed through the speakers of the vehicle to play the music or playback the recording or the like that is stored in the storage medium. Optionally, the memory or storage medium may be removed from the mirror or accessory module and plugged into or connected to the iPod or MP3 player or the like (and vice versa), in order to playback the music or information stored on the storage medium with the different playback devices.

Optionally, the driver or other occupant of the vehicle may bring his or her digital audio player (such as an iPod or similar MP3 or other device) and dock at an interior mirror location (such as at a video slide-out mirror) or at a windshield electronics module (WEM) location (such as is disclosed, for example, in U.S. Pat. Nos. 6,428,172; 6,501,387 and 6,329,925, which are hereby incorporated herein by reference). Information relating to the audio device (such as track number or song title or index or the like) may be displayed at the interior mirror assembly (such as using display-on-demand transflective mirror reflector technology as described herein), or may be displayed on a video slide-out mirror screen (such as disclosed in PCT Application No. PCT/US03/40611, filed Dec. 19, 2003, and/or U.S. provisional application Ser. No. 60/630,061, filed Nov. 22, 2004, which are hereby incorporated herein by reference) or may be displayed at a WEM. Also, controls to operate the consumer portable device, such as an iPod or the like, may be included at the interior mirror assembly and/or at a WEM. While docking has the added advantage of providing electrical current from the vehicle battery/ignition system to recharge the portable device, such as an iPod or similar MP3 player, the iPod device optionally need not dock and can be in wireless communication with the interior mirror and/or WEM via a short range wireless communication protocol, such as BLUETOOTH® or the like. Of course, if desired, wired connection can also be used.

Optionally, a docking station can be provided other than at the interior mirror or WEM. For example, an iPod or a similar audio device or a video playback device (such as a DVD player) can dock at a docking cradle located between the front seats and can be in wireless communication (such as via BLUETOOTH®) and/or optionally can be in wired communication with the interior mirror and/or WEM, where the aforementioned displays and/or controls may be readily available to the driver or other occupant of the vehicle. The music or other audio or data files stored on the iPod or similar MP3 player or data storage device may be played via the audio system of the vehicle, and the driver or other front seat occupant can readily access the displays/controls at the interior mirror or WEM location.

Optionally, the data may be automatically recorded and stored on the storage medium incorporated into an interior mirror assembly and/or a WEM and/or an exterior mirror assembly or may be selectively stored on the storage medium. For example, a user may connect or plug in their iPod or MP3 player or cellular telephone or portable telephone or the like into a receiver or socket (such as at an interior mirror or at a WEM) and the data may be transferred or streamed onto the storage medium of that vehicular location so that the recording may be played back through the vehicle speakers of the vehicle audio system. Optionally, the data transfer may be accomplished wirelessly, such as via an IR and/or an RF wireless link. Optionally, the user may selectively record information or music from radio signals (such as signals broadcast to an AM/FM radio of the vehicle or to an XM satellite radio or the like), or the user may selectively record information or music from wireless INTERNET signals or the like (such as from a music download website or the like) where the transmitted or broadcast information may be transferred or streamed to the storage medium or disc or the like of the mirror assembly or accessory module of the vehicle. Optionally, the stored data or information or music may be transferred or streamed from the storage medium of the mirror or WEM to a portable device, such as an iPod or MP3 player or cellular telephone or portable telephone or the like for playback at a different time and remote from the vehicle.

Optionally, the recording or playback system of the vehicle may be voice activated, such that a user may provide a voice command to record or playback a particular track. For example, a user may select a specific track or tracks stored on a storage medium (such as the storage medium of the mirror or accessory module or the like or a storage medium of an MP3 player or iPod device or the like), and the track or tracks may be played accordingly. The system of the present invention thus may provide for voice activation of an MP3 player, such as via, preferably, a microphone or microphones located at the interior mirror assembly or at a WEM or the like, when the player is plugged into or connected to or in communication with the recording and/or playback system of the present invention.

It is further envisioned that the recording and/or playback system of the present invention may provide delayed playback of a recording that is made generally at the same time that it is being played back. For example, it may be desirable to remove commercial content from a radio (such as satellite radio or XM radio) transmission, since some satellite radio transmissions or broadcasts or signals or outputs now may include commercial content. If desired, the recording and/or playback system of the present invention could selectively record a transmission and begin playing the transmission back with a time delay. While the system plays the delayed output, the system may identify and remove commercial content (or other undesirable content) and continue playing the output without interruption. The user thus may select a record and play mode and hear substantially continuous output without the commercial content or otherwise undesired content.

Although shown and described as being positioned so as to have a forward field of view, it is also envisioned that the imaging device may be directed to have a field of view generally rearwardly or sidewardly of the vehicle to capture images of a rearward or sideward scene, without affecting the scope of the present invention. For example, the imaging device may be positioned at a rearward portion of the vehicle and/or may be used in connection with a rear vision system or the like, such as the types described in U.S. Pat. Nos. 5,550,677; 5,760,962; 5,670,935; 6,201,642 and/or 6,717,610, and/or in U.S. patent application Ser. No. 10/010,862, filed Dec. 6, 2001, now U.S. Pat. No. 6,757,109; Ser. No. 10/418,486, filed Apr. 18, 2003, now U.S. Pat. No. 7,005,974, which are hereby incorporated herein by reference.

Optionally, the imaging device may be positioned at or near or at least partially within a door handle of a side door of the vehicle. The imaging device thus may provide a sideward field of view, such as for a side object detection system or lane change assist system or for a security system or the like.

The imaging device of the imaging system of the present invention thus is operable to capture multiple images or frames of the scene as the vehicle travels along the road, and may detect and recognize various street and/or traffic signs via processing of the captured images. If a detected sign is determined to be a speed limit sign or other traffic control sign of interest (such as a warning sign or the like), the imaging system may be operable to further process the images to determine or recognize the speed limit numbers on a speed limit sign and to provide an alert or warning signal to the driver of the vehicle if the vehicle exceeds the posted and recognized speed limit by a predetermined amount. The imaging system may have an interface (such as a user actuatable input or button, a voice receiver, a touch screen and/or the like) that would set a personal threshold for over-speed warning. The imaging device and/or imaging system may be multi-tasking and, thus, may be operable to detect headlamps and taillights and/or precipitation and/or objects and/or the like for or in connection with other accessories or systems, such as a headlamp control system, a precipitation sensor system, an adaptive speed control system, a lane departure warning system, a traffic lane control system and/or the like.

Changes and modifications in the specifically described embodiments can be carried out without departing from the principles of the present invention, which is intended to be limited only by the scope of the appended claims as interpreted according to the principles of patent law.

What is claimed is:

1. A vision system for a vehicle, said vision system comprising:
a forward viewing camera disposed at a windshield of a vehicle equipped with said vision system;
wherein said forward viewing camera views forward through the windshield of the equipped vehicle and is operable to capture image data;
said forward viewing camera comprising an imaging array sensor and a lens;
an image processor operable to process image data captured by said forward viewing camera;
wherein, responsive at least in part to processing by said image processor of image data captured by said forward viewing camera, at least one road characteristic of a road along which the equipped vehicle is travelling is detected;
wherein, responsive at least in part to processing by said image processor of image data captured by said forward viewing camera, other vehicles exterior the equipped vehicle are detected;
wherein, responsive at least in part to processing by said image processor of image data captured by said forward viewing camera, road curvature of the road along which the equipped vehicle is traveling is determined;
wherein data derived from image data captured by said forward viewing camera is wirelessly communicated from the equipped vehicle to a remote data receiver located remote from the equipped vehicle; and
wherein the road along which the equipped vehicle is traveling comprises a freeway, and wherein, responsive at least in pert to processing by said image processor of image data captured by said forward viewing camera detecting an exit sign announcing an exit ramp ahead off the freeway the equipped vehicle is traveling on, at least one of (i) speed of the equipped vehicle and (i) acceleration of the equipped vehicle is adjusted so that the equipped vehicle enters the exit ramp at a safe speed.

2. The vision system of claim 1, wherein said at least one road characteristic comprises a curb.

3. The vision system of claim 2, wherein said at least one road characteristic comprises a road shoulder.

4. The vision system of claim 1, wherein data derived from captured image data received from the equipped vehicle is processed at said remote data receiver to extract information relevant to the geographic location at which the equipped vehicle is located when wirelessly transmitting the data to said remote data receiver.

5. The vision system of claim 4, wherein said remote data receiver receives location data from other vehicles.

6. The vision system of claim 5, wherein, based at least in part on received location data, movement of other vehicles relative to the equipped vehicle is determined.

7. The vision system of claim 6, wherein, responsive at least in part to said determination of movement of other vehicles relative to the equipped vehicle, said remote data receiver communicates to the equipped vehicle that another vehicle is approaching the equipped vehicle from a direction opposite to the direction of travel of the equipped vehicle.

8. The vision system of claim 7, wherein, responsive at least in part to said determination of movement of other vehicles relative to the equipped vehicle, a speed control system of the equipped vehicle is controlled.

9. The vision system of claim 8, wherein said speed control system comprises an adaptive cruise control system of the equipped vehicle.

10. The vision system of claim 6, wherein, responsive at least in part to said determination of movement of other vehicles relative to the equipped vehicle, a lighting system of the equipped vehicle is controlled.

11. The vision system of claim 6, wherein, responsive at least in part to said determination of movement of other vehicles relative to the equipped vehicle, a speed control system of the equipped vehicle is dynamically controlled.

12. The vision system of claim 1, wherein, responsive at least in part to processing by said image processor of image data captured by said forward viewing camera, speed of the equipped vehicle is reduced responsive to approach by the equipped vehicle to a road curve of the road along which the equipped vehicle is traveling.

13. The vision system of claim 12, wherein, upon the equipped vehicle having travelled around the curve, speed of the equipped vehicle automatically increases.

14. A vision system for a vehicle, said vision system comprising:

a forward viewing camera disposed at a windshield of a vehicle equipped with said vision system;

wherein said forward viewing camera views forward through the windshield of the equipped vehicle and is operable to capture image data;

said forward viewing camera comprising an imaging array sensor and a lens;

an image processor operable to process image data captured by said forward viewing camera;

wherein, responsive at least in part to processing by said image processor of image data captured by said forward viewing camera, at least one road characteristic of a road along which the equipped vehicle is traveling is detected;

wherein, responsive at least in part to processing by said image processor of image data captured by said forward viewing camera, other vehicles exterior the equipped vehicle are detected;

wherein, responsive at least in part to processing by said image processor of image data captured by said forward viewing camera, road curvature of the road along which the equipped vehicle is travelling is determined;

wherein data derived from image data captured by said forward viewing camera is wirelessly communicated from the equipped vehicle to a remote data receiver located remote from the equipped vehicle; and wherein the road along which the equipped vehicle is traveling comprises a freeway, and wherein, responsive at least in part to processing by said image processor of image data captured by said forward viewing camera detecting an exit sign announcing an exit ramp ahead off the freeway the equipped vehicle is traveling on and responsive at least in part to determining characters on the detected exit sign, a driver of the equipped vehicle Is alerted that a desired exit ramp off the freeway is ahead.

15. The vision system of claim 14, wherein, responsive at least in part to processing by said Image processor of Image data captured by said forward viewing camera, characters on the detected exit sign are determined.

16. A vision system for a vehicle, said vision system comprising:

a forward viewing camera disposed at a windshield of a vehicle equipped with said vision system;

wherein said forward viewing camera views forward through the windshield of the equipped vehicle and is operable to capture image data;

said forward viewing camera comprising an imaging array sensor and a lens;

an image processor operable to process image data captured by said forward viewing camera;

wherein, responsive at least in part to processing by said Image processor of image data captured by said forward viewing camera, at least one road characteristic of a road along which the equipped vehicle is traveling is detected;

wherein, responsive at least in part to processing by said Image processor of image data captured by said forward viewing camera, other vehicles exterior the equipped vehicle are detected;

wherein, responsive at least in part to processing by said image processor of Image data captured by said forward viewing camera, road curvature of the road along which the equipped vehicle is traveling is determined;

wherein the road along which the equipped vehicle is traveling comprises a freeway; and wherein, responsive at least in part to processing by said Image processor of Image data captured by said forward viewing camera detecting an exit sign announcing an exit ramp ahead off the freeway the equipped vehicle is traveling on, speed of the equipped vehicle and acceleration of the equipped vehicle are adjusted so that the equipped vehicle enters the exit ramp at a safe speed.

17. The vision system of claim 16, wherein, responsive at least in part to processing by said image processor of image data captured by said forward viewing camera, characters on the detected exit sign are determined.

18. The vision system of claim 17, wherein, responsive to determination of characters on the detected exit sign by processing by said Image processor of captured image data, a driver of the equipped vehicle is alerted that a desired exit ramp off the freeway is ahead.

19. The vision system of claim 16, wherein data derived from image data captured by said forward viewing camera is wirelessly communicated from the equipped vehicle to a remote data receiver located remote from the equipped vehicle, and wherein data derived from captured image data received from the equipped vehicle Is processed at said remote data receiver to extract information relevant to the geographic location at which the equipped vehicle Is located when wirelessly transmitting the data to said remote data receiver.

20. The vision system of claim 19, wherein said remote data receiver receives location data from other vehicles, and wherein, based at least in part on received location data, movement of other vehicles relative to the equipped vehicle is determined.

21. The vision system of claim 20, wherein, responsive at least in part to said determination of movement of other vehicles relative to the equipped vehicle, a speed control system of the equipped vehicle is controlled.

22. The vision system of claim 21, wherein said speed control system of the equipped vehicle is dynamically controlled.

23. The vision system of claim 22, wherein said speed control system comprises an adaptive cruise control system of the equipped vehicle.

24. The vision system of claim 22, wherein said at least one road characteristic comprises a road shoulder.

25. A vision system for a vehicle, said vision system comprising:

a forward viewing camera disposed at a windshield of a vehicle equipped with said vision system;

wherein said forward viewing camera views forward through the windshield of the equipped vehicle and is operable to capture image data;

said forward viewing camera comprising an imaging array sensor and a lens;

an image processor operable to process image data captured by said forward viewing camera;

wherein, responsive at least in part to processing by said image processor of image data captured by said forward viewing camera, at least one road characteristic of a road along which the equipped vehicle is travelling is detected;

wherein, responsive at least in part to processing by said image processor of image data captured by said forward viewing camera, other vehicles exterior the equipped vehicle are detected;

wherein, responsive at least in part to processing by said image processor of image data captured by said forward viewing camera, road curvature of the road along which the equipped vehicle is travelling is determined;

wherein, responsive at least in part to processing by said image processor of image data captured by said forward viewing camera, speed of the equipped vehicle is reduced responsive to approach by the equipped vehicle to a road curve of the road along which the equipped vehicle is traveling; and wherein the road along which the equipped vehicle Is traveling comprises a freeway, and wherein, responsive at least in part to processing by said Image processor of Image data captured by said forward viewing camera detecting an exit sign announcing an exit ramp ahead off the freeway the equipped vehicle is traveling on, speed of the equipped vehicle Is adjusted so that the equipped vehicle enters the exit ramp at a safe speed, and wherein, responsive at least in part to processing by said image processor of image data captured by said forward viewing camera, characters on the detected exit sign are determined.

26. The vision system of claim 25, wherein, responsive to determination of characters on the detected exit sign by processing by said Image processor of captured Image data, a driver of the equipped vehicle is alerted that a desired exit ramp off the freeway is ahead.

27. The vision system of claim 25, wherein, responsive to determination of characters on the detected exit sign by processing by said image processor of captured image data, speed of the equipped vehicle and acceleration of the equipped vehicle are adjusted so that the equipped vehicle enters the exit ramp at a safe speed.

28. The vision system of claim 25, wherein data derived from Image data captured by said forward viewing camera is wirelessly communicated from the equipped vehicle to a remote data receiver located remote from the equipped vehicle, and wherein data derived from captured Image data received from the equipped vehicle is processed at said remote data receiver to extract Information relevant to the geographic location at which the equipped vehicle Is located when wirelessly transmitting the data to said remote data receiver.

29. The vision system of claim 28, wherein said remote data receiver receives location data from other vehicles, and wherein, based at least in part on received location data, movement of other vehicles relative to the equipped vehicle Is determined.

30. The vision system of claim 29, wherein, responsive at least in part to said determination of movement of other vehicles relative to the equipped vehicle, a speed control system of the equipped vehicle is controlled.

31. The vision system of claim 30, wherein said speed control system of the equipped vehicle is dynamically controlled.

32. The vision system of claim 25, wherein said at least one road characteristic comprises a curb.

33. The vision system of claim 25, wherein said at least one road characteristic comprises a road shoulder.

* * * * *

UNITED STATES PATENT AND TRADEMARK OFFICE
CERTIFICATE OF CORRECTION

PATENT NO.         : 9,948,904 B2
APPLICATION NO.    : 15/675921
DATED              : April 17, 2018
INVENTOR(S)        : Kenneth Schofield et al.

It is certified that error appears in the above-identified patent and that said Letters Patent is hereby corrected as shown below:

In the Claims

Column 38
Line 27, Claim 1, "pert" should be --part--
Line 31, Claim 1, "vehicle and (i)" should be --vehicle and (ii)--

Column 39
Line 50, Claim 14, "Is" should be --is--
Line 53, Claim 15, "Image" in both instances should be --image--

Column 40
Line 2, Claim 16, "Image" should be --image--
Line 7, Claim 16, "Image" should be --image--
Line 11, Claim 16, "Image" should be --image--
Line 17, Claim 16, "Image" in both instances should be --image--
Line 30, Claim 17, "Image" should be --image--
Line 38, Claim 19, "Is" should be --is--
Line 40, Claim 19, "Is" should be --is--

Column 41
Line 24, Claim 25, "Is" should be --is--
Line 26, Claim 25, "Image" should be --image--
Line 27, Claim 25, "Image" should be --image--
Line 30, Claim 25, "Is" should be --is--
Line 38, Claim 26, "Image" in both instances should be --image--

Column 42
Line 10, Claim 28, "Image" should be --image--
Line 13, Claim 28, "Image" should be --image--
Line 15, Claim 28, "Information" should be --information--

Signed and Sealed this
Twenty-third Day of October, 2018

Andrei Iancu
*Director of the United States Patent and Trademark Office*

CERTIFICATE OF CORRECTION (continued)
U.S. Pat. No. 9,948,904 B2

Line 16, Claim 28, "Is" should be --is--
Line 23, Claim 29, "Is" should be --is--